US008694663B2

(12) United States Patent
Zou et al.

(10) Patent No.: US 8,694,663 B2
(45) Date of Patent: *Apr. 8, 2014

(54) SYSTEM FOR TRANSFERRING DIGITAL DATA AT A HIGH RATE BETWEEN A HOST AND A CLIENT OVER A COMMUNICATION PATH FOR PRESENTATION TO A USER

(75) Inventors: Qiuzhen Zou, La Jolla, CA (US); George Alan Wiley, San Diego, CA (US); Brian Steele, Lafayette, CO (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/836,891

(22) Filed: Jul. 15, 2010

(65) Prior Publication Data
US 2011/0013681 A1    Jan. 20, 2011

Related U.S. Application Data

(62) Division of application No. 10/236,657, filed on Sep. 6, 2002.

(51) Int. Cl.
*G06F 13/00* (2006.01)

(52) U.S. Cl.
USPC .......................................................... 709/230

(58) Field of Classification Search
USPC .......................................................... 709/230
See application file for complete search history.

(56) References Cited

U.S. PATENT DOCUMENTS

| 3,594,304 A | 7/1971 | Seitzer |
| 4,042,783 A | 8/1977 | Gindi |
| 4,363,123 A | 12/1982 | Grover |
| 4,393,444 A | 7/1983 | Weinberg |
| 4,491,943 A | 1/1985 | Iga et al. |
| 4,660,096 A | 4/1987 | Arlan et al. |

(Continued)

FOREIGN PATENT DOCUMENTS

| AU | 2005309686 | 6/2006 |
| AU | 2005309680 | 3/2010 |

(Continued)

OTHER PUBLICATIONS

European Search Report—EP05852048, Search Authority—The Hague Patent Office, Nov. 18, 2010.

(Continued)

*Primary Examiner* — Robert B Harrell
(74) *Attorney, Agent, or Firm* — Nicholas J. Pauley; Peter Michael Kamarchik; Joseph Agusta

(57) ABSTRACT

A data Interface for transferring digital data between a host and a client over a communication path using packet structures linked together to form a communication protocol for communicating a pre-selected set of digital control and presentation data. The signal protocol is used by link controllers configured to generate, transmit, and receive packets forming the communications protocol, and to form digital data into one or more types of data packets, with at least one residing in the host device and being coupled to the client through the communications path. The interface provides a cost-effective, low power, bi-directional, high-speed data transfer mechanism over a short-range "serial" type data link, which lends itself to implementation with miniature connectors and thin flexible cables which are especially useful in connecting display elements such as wearable micro-displays to portable computers and wireless communication devices.

3 Claims, 48 Drawing Sheets

| Packet Length | Packet Type = 0xff | Unique word = 0x005a3b | Sub-frame Length | Protocol Version | Sub-frame Count | Media-frame Count | CRC |
|---|---|---|---|---|---|---|---|
| 2 bytes | 1 byte | 3 bytes | 4 bytes | 2 bytes | 2 bytes | 3 bytes | 2 bytes |

0x005a3bff

(56) References Cited

U.S. PATENT DOCUMENTS

| | | |
|---|---|---|
| 4,764,805 A | 8/1988 | Rabbani et al. |
| 4,769,761 A | 9/1988 | Downes et al. |
| 4,812,296 A | 3/1989 | Schmelz et al. |
| 4,821,296 A | 4/1989 | Cordell |
| 4,891,805 A | 1/1990 | Fallin |
| 5,079,693 A | 1/1992 | Miller |
| 5,111,455 A | 5/1992 | Negus |
| 5,131,012 A | 7/1992 | Dravida |
| 5,138,616 A | 8/1992 | Wagner, Jr. et al. |
| 5,155,590 A | 10/1992 | Beyers, II et al. |
| 5,167,035 A | 11/1992 | Mann et al. |
| 5,224,213 A | 6/1993 | Dieffenderfer et al. |
| 5,227,783 A | 7/1993 | Shaw et al. |
| 5,231,636 A | 7/1993 | Rasmussen |
| 5,331,642 A | 7/1994 | Valley et al. |
| 5,345,542 A | 9/1994 | Wye |
| 5,359,595 A | 10/1994 | Weddle et al. |
| 5,377,188 A | 12/1994 | Seki |
| 5,396,636 A | 3/1995 | Gallagher et al. |
| 5,418,452 A | 5/1995 | Pyle |
| 5,418,952 A | 5/1995 | Morley et al. |
| 5,420,858 A | 5/1995 | Marshall et al. |
| 5,422,894 A | 6/1995 | Abe et al. |
| 5,430,486 A | 7/1995 | Fraser et al. |
| 5,477,534 A | 12/1995 | Kusano |
| 5,483,185 A | 1/1996 | Scriber et al. |
| 5,490,247 A * | 2/1996 | Tung et al. ............. 345/501 |
| 5,502,499 A | 3/1996 | Birch et al. |
| 5,510,832 A | 4/1996 | Garcia |
| 5,513,185 A | 4/1996 | Schmidt |
| 5,519,830 A | 5/1996 | Opoczynski |
| 5,521,907 A | 5/1996 | Ennis, Jr. et al. |
| 5,524,007 A | 6/1996 | White et al. |
| 5,530,704 A | 6/1996 | Gibbons et al. |
| 5,535,336 A | 7/1996 | Smith et al. |
| 5,543,939 A | 8/1996 | Harvey et al. |
| 5,546,121 A | 8/1996 | Gotanda et al. |
| 5,550,489 A | 8/1996 | Raab |
| 5,559,459 A | 9/1996 | Back et al. |
| 5,559,952 A | 9/1996 | Fujimoto |
| 5,560,022 A | 9/1996 | Dunstan et al. |
| 5,565,957 A | 10/1996 | Goto |
| 5,575,951 A | 11/1996 | Anderson |
| 5,604,450 A | 2/1997 | Borkar et al. |
| 5,619,650 A | 4/1997 | Bach et al. |
| 5,621,664 A | 4/1997 | Phaal |
| 5,646,947 A | 7/1997 | Cooper et al. |
| 5,664,948 A | 9/1997 | Dimitriadis et al. |
| 5,680,404 A | 10/1997 | Gray |
| 5,726,990 A | 3/1998 | Shimada et al. |
| 5,732,352 A | 3/1998 | Gutowski et al. |
| 5,733,131 A | 3/1998 | Park |
| 5,734,118 A | 3/1998 | Ashour et al. |
| 5,751,445 A | 5/1998 | Masunaga |
| 5,751,951 A * | 5/1998 | Osborne et al. ............. 709/250 |
| 5,777,999 A | 7/1998 | Hiraki et al. |
| 5,790,551 A | 8/1998 | Chan |
| 5,798,720 A | 8/1998 | Yano |
| 5,802,351 A | 9/1998 | Frampton |
| 5,815,507 A | 9/1998 | Vinggaard et al. |
| 5,816,921 A | 10/1998 | Hosokawa |
| 5,818,255 A | 10/1998 | New et al. |
| 5,822,603 A | 10/1998 | Hansen et al. |
| 5,844,918 A | 12/1998 | Kato |
| 5,847,752 A | 12/1998 | Sebestyen |
| 5,862,160 A | 1/1999 | Irvin et al. |
| 5,864,546 A | 1/1999 | Campanella |
| 5,867,501 A | 2/1999 | Horst et al. |
| 5,867,510 A | 2/1999 | Steele |
| 5,881,262 A | 3/1999 | Abramson et al. |
| 5,903,281 A | 5/1999 | Chen et al. |
| 5,935,256 A | 8/1999 | Lesmeister |
| 5,953,378 A | 9/1999 | Hotani et al. |
| 5,958,006 A | 9/1999 | Eggleston et al. |
| 5,963,557 A | 10/1999 | Eng |
| 5,963,564 A | 10/1999 | Petersen et al. |
| 5,963,979 A | 10/1999 | Inoue |
| 5,969,750 A | 10/1999 | Hsieh et al. |
| 5,982,362 A | 11/1999 | Crater et al. |
| 5,983,261 A | 11/1999 | Riddle |
| 5,990,852 A | 11/1999 | Szamrej |
| 5,990,902 A | 11/1999 | Park |
| 5,995,512 A | 11/1999 | Pogue, Jr. |
| 6,002,709 A | 12/1999 | Hendrickson |
| 6,014,705 A | 1/2000 | Koenck et al. |
| 6,047,380 A | 4/2000 | Nolan et al. |
| 6,049,837 A | 4/2000 | Youngman |
| 6,055,247 A | 4/2000 | Kubota et al. |
| 6,064,649 A | 5/2000 | Johnston |
| 6,078,361 A | 6/2000 | Reddy |
| 6,081,513 A | 6/2000 | Roy |
| 6,091,709 A | 7/2000 | Harrison et al. |
| 6,092,231 A | 7/2000 | Sze |
| 6,097,401 A | 8/2000 | Owen et al. |
| 6,101,601 A | 8/2000 | Matthews et al. |
| 6,118,791 A | 9/2000 | Fichou et al. |
| 6,151,067 A | 11/2000 | Suemoto et al. |
| 6,151,320 A | 11/2000 | Shim |
| 6,154,156 A | 11/2000 | Tagato |
| 6,154,466 A | 11/2000 | Iwasaki et al. |
| 6,185,601 B1 | 2/2001 | Wolff |
| 6,192,230 B1 | 2/2001 | Van Bokhorst et al. |
| 6,198,752 B1 | 3/2001 | Lee |
| 6,199,169 B1 | 3/2001 | Voth |
| 6,222,677 B1 | 4/2001 | Budd et al. |
| 6,236,647 B1 | 5/2001 | Amalfitano |
| 6,242,953 B1 | 6/2001 | Thomas |
| 6,243,596 B1 | 6/2001 | Kikinis |
| 6,243,761 B1 | 6/2001 | Mogul et al. |
| 6,246,876 B1 | 6/2001 | Hontzeas |
| 6,252,526 B1 | 6/2001 | Uyehara |
| 6,252,888 B1 | 6/2001 | Fite, Jr. et al. |
| 6,256,509 B1 | 7/2001 | Tanaka et al. |
| 6,288,739 B1 | 9/2001 | Hales et al. |
| 6,297,684 B1 | 10/2001 | Uyehara et al. |
| 6,308,239 B1 | 10/2001 | Osakada et al. |
| 6,335,696 B1 | 1/2002 | Aoyagi et al. |
| 6,359,479 B1 | 3/2002 | Oprescu |
| 6,363,439 B1 | 3/2002 | Battles et al. |
| 6,393,008 B1 | 5/2002 | Cheng et al. |
| 6,397,286 B1 | 5/2002 | Chatenever et al. |
| 6,400,392 B1 | 6/2002 | Yamaguchi et al. |
| 6,400,654 B1 | 6/2002 | Sawamura et al. |
| 6,400,754 B2 | 6/2002 | Fleming et al. |
| 6,421,735 B1 | 7/2002 | Jung et al. |
| 6,429,867 B1 | 8/2002 | Deering |
| 6,430,196 B1 | 8/2002 | Baroudi |
| 6,430,606 B1 | 8/2002 | Haq |
| 6,434,187 B1 | 8/2002 | Beard et al. |
| 6,438,363 B1 | 8/2002 | Feder et al. |
| 6,457,090 B1 | 9/2002 | Young |
| 6,475,245 B2 | 11/2002 | Gersho et al. |
| 6,477,186 B1 | 11/2002 | Nakura et al. |
| 6,480,521 B1 | 11/2002 | Odenwalder et al. |
| 6,483,825 B2 | 11/2002 | Seta |
| 6,487,217 B1 | 11/2002 | Baroudi |
| 6,493,357 B1 | 12/2002 | Fujisaki |
| 6,493,713 B1 | 12/2002 | Kanno |
| 6,493,824 B1 | 12/2002 | Novoa et al. |
| 6,545,979 B1 | 4/2003 | Poulin |
| 6,549,538 B1 | 4/2003 | Beck et al. |
| 6,549,958 B1 | 4/2003 | Kuba |
| 6,574,211 B2 | 6/2003 | Padovani et al. |
| 6,583,809 B1 | 6/2003 | Fujiwara |
| 6,594,304 B2 | 7/2003 | Chan |
| 6,609,167 B1 | 8/2003 | Bastiani et al. |
| 6,611,221 B1 | 8/2003 | Soundarapandian et al. |
| 6,611,503 B1 | 8/2003 | Fitzgerald et al. |
| 6,618,360 B1 | 9/2003 | Scoville et al. |
| 6,621,809 B1 | 9/2003 | Lee et al. |
| 6,621,851 B1 | 9/2003 | Agee et al. |
| 6,636,508 B1 | 10/2003 | Li et al. |
| 6,636,922 B1 | 10/2003 | Bastiani et al. |
| 6,662,322 B1 | 12/2003 | Abdelilah et al. |

(56) References Cited

U.S. PATENT DOCUMENTS

| | | |
|---|---|---|
| 6,690,201 B1 | 2/2004 | Simkins et al. |
| 6,714,233 B2 | 3/2004 | Chihara et al. |
| 6,715,088 B1 | 3/2004 | Togawa |
| 6,728,263 B2 | 4/2004 | Joy et al. |
| 6,738,344 B1 | 5/2004 | Bunton et al. |
| 6,745,364 B2 | 6/2004 | Bhatt et al. |
| 6,754,179 B1 | 6/2004 | Lin |
| 6,760,722 B1 | 7/2004 | Raghunandan |
| 6,760,772 B2 | 7/2004 | Zou et al. |
| 6,760,882 B1 | 7/2004 | Gesbert |
| 6,765,506 B1 | 7/2004 | Lu |
| 6,771,613 B1 | 8/2004 | O'Toole et al. |
| 6,778,493 B1 | 8/2004 | Ishii |
| 6,782,039 B2 | 8/2004 | Alamouti et al. |
| 6,784,941 B1 | 8/2004 | Su et al. |
| 6,791,379 B1 | 9/2004 | Wakayama et al. |
| 6,797,891 B1 | 9/2004 | Blair et al. |
| 6,804,257 B1 | 10/2004 | Benayoun et al. |
| 6,810,084 B1 | 10/2004 | Jun et al. |
| 6,813,638 B1 | 11/2004 | Sevanto et al. |
| 6,816,929 B2 | 11/2004 | Ueda |
| 6,831,685 B1 | 12/2004 | Ueno et al. |
| 6,836,469 B1 | 12/2004 | Wu |
| 6,850,282 B1 | 2/2005 | Makino et al. |
| 6,865,240 B1 | 3/2005 | Kawataka |
| 6,865,609 B1 | 3/2005 | Gubbi et al. |
| 6,865,610 B2 | 3/2005 | Bolosky et al. |
| 6,867,668 B1 | 3/2005 | Dagostino et al. |
| 6,882,361 B1 | 4/2005 | Gaylord |
| 6,886,035 B2 | 4/2005 | Wolff |
| 6,892,071 B2 | 5/2005 | Park et al. |
| 6,894,994 B1 | 5/2005 | Grob et al. |
| 6,895,410 B2 | 5/2005 | Ridge |
| 6,897,891 B2 | 5/2005 | Itsukaichi |
| 6,906,762 B1 | 6/2005 | Witehira et al. |
| 6,927,746 B2 | 8/2005 | Lee et al. |
| 6,944,136 B2 | 9/2005 | Kim et al. |
| 6,947,436 B2 | 9/2005 | Harris et al. |
| 6,950,428 B1 | 9/2005 | Horst et al. |
| 6,956,829 B2 | 10/2005 | Lee et al. |
| 6,973,039 B2 | 12/2005 | Redi et al. |
| 6,973,062 B1 | 12/2005 | Han |
| 6,975,145 B1 | 12/2005 | Vadi et al. |
| 6,990,549 B2 | 1/2006 | Main et al. |
| 6,993,393 B2 | 1/2006 | Von Arx et al. |
| 6,999,432 B2 | 2/2006 | Zhang et al. |
| 7,003,796 B1 | 2/2006 | Humpleman |
| 7,010,607 B1 | 3/2006 | Bunton |
| 7,012,636 B2 | 3/2006 | Hatanaka |
| 7,015,838 B1 | 3/2006 | Groen et al. |
| 7,023,924 B1 | 4/2006 | Keller et al. |
| 7,030,796 B2 | 4/2006 | Shim et al. |
| 7,036,066 B2 | 4/2006 | Weibel et al. |
| 7,042,914 B2 | 5/2006 | Zerbe et al. |
| 7,047,475 B2 | 5/2006 | Sharma et al. |
| 7,051,218 B1 | 5/2006 | Gulick et al. |
| 7,062,264 B2 | 6/2006 | Ko et al. |
| 7,062,579 B2 | 6/2006 | Tateyama et al. |
| 7,068,666 B2 | 6/2006 | Foster et al. |
| 7,095,435 B1 | 8/2006 | Hartman et al. |
| 7,110,420 B2 | 9/2006 | Bashirullah et al. |
| 7,126,945 B2 | 10/2006 | Beach |
| 7,138,989 B2 | 11/2006 | Mendelson et al. |
| 7,143,177 B1 | 11/2006 | Johnson et al. |
| 7,143,207 B2 | 11/2006 | Vogt |
| 7,145,411 B1 | 12/2006 | Blair et al. |
| 7,151,940 B2 | 12/2006 | Diao et al. |
| 7,158,536 B2 | 1/2007 | Ching et al. |
| 7,158,539 B2 | 1/2007 | Zhang et al. |
| 7,161,846 B2 | 1/2007 | Padaparambil |
| 7,165,112 B2 | 1/2007 | Battin et al. |
| 7,178,042 B2 | 2/2007 | Sakagami |
| 7,180,951 B2 | 2/2007 | Chan |
| 7,184,408 B2 | 2/2007 | Denton et al. |
| 7,187,738 B2 | 3/2007 | Naven et al. |
| 7,191,281 B2 | 3/2007 | Bajikar |
| 7,219,294 B2 | 5/2007 | Vogt |
| 7,231,402 B2 | 6/2007 | Dickens et al. |
| 7,251,231 B2 | 7/2007 | Gubbi |
| 7,257,087 B2 | 8/2007 | Grovenburg |
| 7,260,087 B2 | 8/2007 | Bao et al. |
| 7,269,153 B1 | 9/2007 | Schultz et al. |
| 7,274,652 B1 | 9/2007 | Webster et al. |
| 7,278,069 B2 | 10/2007 | Abrosimov et al. |
| 7,284,181 B1 | 10/2007 | Venkatramani |
| 7,301,968 B2 | 11/2007 | Haran et al. |
| 7,310,535 B1 | 12/2007 | MacKenzie et al. |
| 7,315,265 B2 | 1/2008 | Wiley et al. |
| 7,315,520 B2 | 1/2008 | Xue et al. |
| 7,317,754 B1 | 1/2008 | Remy et al. |
| 7,327,735 B2 | 2/2008 | Robotham et al. |
| 7,336,139 B2 | 2/2008 | Blair et al. |
| 7,336,667 B2 | 2/2008 | Allen, Jr. et al. |
| 7,340,548 B2 | 3/2008 | Love |
| 7,349,973 B2 | 3/2008 | Saito et al. |
| 7,373,155 B2 | 5/2008 | Duan et al. |
| 7,383,350 B1 | 6/2008 | Moore et al. |
| 7,383,399 B2 | 6/2008 | Vogt |
| 7,392,541 B2 | 6/2008 | Largman et al. |
| 7,403,487 B1 | 7/2008 | Foladare et al. |
| 7,403,511 B2 | 7/2008 | Liang et al. |
| 7,405,703 B2 | 7/2008 | Qi et al. |
| 7,412,642 B2 | 8/2008 | Cypher |
| 7,430,001 B2 | 9/2008 | Fujii |
| 7,447,953 B2 | 11/2008 | Vogt |
| 7,451,362 B2 | 11/2008 | Chen et al. |
| 7,487,917 B2 | 2/2009 | Kotlarsky et al. |
| 7,508,760 B2 | 3/2009 | Akiyama et al. |
| 7,515,705 B2 | 4/2009 | Segawa et al. |
| 7,526,323 B2 | 4/2009 | Kim et al. |
| 7,536,598 B2 | 5/2009 | Largman et al. |
| 7,543,326 B2 | 6/2009 | Moni |
| 7,557,633 B2 | 7/2009 | Yu |
| 7,574,113 B2 | 8/2009 | Nagahara et al. |
| 7,595,834 B2 | 9/2009 | Kawai et al. |
| 7,595,835 B2 | 9/2009 | Kosaka |
| 7,634,607 B2 | 12/2009 | Honda |
| 7,643,823 B2 | 1/2010 | Shamoon et al. |
| 7,729,720 B2 | 6/2010 | Suh et al. |
| 7,800,600 B2 | 9/2010 | Komatsu et al. |
| 7,813,451 B2 | 10/2010 | Binder et al. |
| 7,831,127 B2 | 11/2010 | Wilkinson |
| 7,835,280 B2 | 11/2010 | Pang et al. |
| 7,844,296 B2 | 11/2010 | Yuki |
| 7,868,890 B2 | 1/2011 | Ludwin et al. |
| 7,873,343 B2 | 1/2011 | Gollnick et al. |
| 7,876,821 B2 | 1/2011 | Li et al. |
| 7,877,439 B2 | 1/2011 | Gallou et al. |
| 7,912,503 B2 | 3/2011 | Chang et al. |
| 7,945,143 B2 | 5/2011 | Yahata et al. |
| 7,949,777 B2 | 5/2011 | Wallace et al. |
| 8,031,130 B2 | 10/2011 | Tamura |
| 8,077,634 B2 | 12/2011 | Maggenti et al. |
| 8,325,239 B2 | 12/2012 | Kaplan et al. |
| 2001/0005385 A1 | 6/2001 | Ichiguchi et al. |
| 2001/0012293 A1 | 8/2001 | Petersen et al. |
| 2001/0032295 A1 | 10/2001 | Tsai et al. |
| 2001/0047450 A1 | 11/2001 | Gillingham et al. |
| 2001/0047475 A1 | 11/2001 | Terasaki |
| 2002/0011998 A1 | 1/2002 | Tamura |
| 2002/0140845 A1 | 10/2002 | Yoshida et al. |
| 2002/0188907 A1 | 12/2002 | Kobayashi |
| 2002/0193133 A1 | 12/2002 | Shibutani |
| 2003/0028647 A1 | 2/2003 | Grosu |
| 2003/0034955 A1 | 2/2003 | Gilder et al. |
| 2003/0039212 A1 | 2/2003 | Lloyd et al. |
| 2003/0061431 A1 | 3/2003 | Mears et al. |
| 2003/0081557 A1 | 5/2003 | Mettala et al. |
| 2003/0091056 A1 | 5/2003 | Walker et al. |
| 2003/0125040 A1 | 7/2003 | Walton et al. |
| 2003/0144006 A1 | 7/2003 | Johansson et al. |
| 2003/0185220 A1 | 10/2003 | Valenci |
| 2003/0191809 A1 | 10/2003 | Mosley et al. |
| 2003/0194018 A1 | 10/2003 | Chang |

(56) References Cited

U.S. PATENT DOCUMENTS

| | | |
|---|---|---|
| 2003/0235209 A1 | 12/2003 | Garg et al. |
| 2004/0008631 A1 | 1/2004 | Kim |
| 2004/0024920 A1 | 2/2004 | Gulick et al. |
| 2004/0028415 A1 | 2/2004 | Eiselt |
| 2004/0049616 A1 | 3/2004 | Dunstan et al. |
| 2004/0082383 A1 | 4/2004 | Muncaster et al. |
| 2004/0128563 A1 | 7/2004 | Kaushik et al. |
| 2004/0140459 A1 | 7/2004 | Haigh et al. |
| 2004/0176065 A1 | 9/2004 | Liu |
| 2004/0184450 A1 | 9/2004 | Omran |
| 2004/0199652 A1 | 10/2004 | Zou et al. |
| 2004/0221315 A1 | 11/2004 | Kobayashi |
| 2004/0260823 A1 | 12/2004 | Tiwari et al. |
| 2005/0012905 A1 | 1/2005 | Morinaga |
| 2005/0020279 A1 | 1/2005 | Markhovsky et al. |
| 2005/0021885 A1 | 1/2005 | Anderson et al. |
| 2005/0033586 A1 | 2/2005 | Savell |
| 2005/0055399 A1 | 3/2005 | Savchuk |
| 2005/0088939 A1 | 4/2005 | Hwang et al. |
| 2005/0091593 A1 | 4/2005 | Peltz |
| 2005/0117601 A1 | 6/2005 | Anderson et al. |
| 2005/0120079 A1 | 6/2005 | Anderson et al. |
| 2005/0120208 A1 | 6/2005 | Dobson et al. |
| 2005/0125840 A1 | 6/2005 | Anderson et al. |
| 2005/0135390 A1 | 6/2005 | Anderson et al. |
| 2005/0144225 A1 | 6/2005 | Anderson et al. |
| 2005/0154599 A1 | 7/2005 | Kopra et al. |
| 2005/0163085 A1 | 7/2005 | Cromer et al. |
| 2005/0163116 A1 | 7/2005 | Anderson et al. |
| 2005/0184993 A1 | 8/2005 | Ludwin et al. |
| 2005/0204057 A1 | 9/2005 | Anderson et al. |
| 2005/0213593 A1 | 9/2005 | Anderson et al. |
| 2005/0216421 A1 | 9/2005 | Barry et al. |
| 2005/0216599 A1 | 9/2005 | Anderson et al. |
| 2005/0216623 A1 | 9/2005 | Dietrich et al. |
| 2005/0248685 A1 | 11/2005 | Seo et al. |
| 2005/0259670 A1 | 11/2005 | Anderson et al. |
| 2005/0265333 A1 | 12/2005 | Coffey et al. |
| 2005/0271072 A1 | 12/2005 | Anderson et al. |
| 2005/0286466 A1 | 12/2005 | Tagg et al. |
| 2006/0034301 A1 | 2/2006 | Anderson et al. |
| 2006/0034326 A1 | 2/2006 | Anderson et al. |
| 2006/0120433 A1 | 6/2006 | Baker et al. |
| 2006/0161691 A1 | 7/2006 | Katibian et al. |
| 2006/0164424 A1 | 7/2006 | Wiley et al. |
| 2006/0168496 A1 | 7/2006 | Steele et al. |
| 2006/0171414 A1 | 8/2006 | Katibian et al. |
| 2006/0179164 A1 | 8/2006 | Katibian et al. |
| 2006/0274031 A1 | 12/2006 | Yuen et al. |
| 2006/0288133 A1 | 12/2006 | Katibian et al. |
| 2007/0008897 A1 | 1/2007 | Denton et al. |
| 2007/0073949 A1 | 3/2007 | Fredrickson et al. |
| 2007/0098002 A1 | 5/2007 | Liu et al. |
| 2007/0274434 A1 | 11/2007 | Arkas et al. |
| 2008/0036631 A1 | 2/2008 | Musfeldt |
| 2008/0088492 A1 | 4/2008 | Wiley et al. |
| 2008/0129749 A1 | 6/2008 | Wiley et al. |
| 2008/0147951 A1 | 6/2008 | Love |
| 2009/0055709 A1 | 2/2009 | Anderson et al. |
| 2009/0070479 A1 | 3/2009 | Anderson et al. |
| 2009/0290628 A1 | 11/2009 | Matsumoto |
| 2010/0128626 A1 | 5/2010 | Anderson et al. |
| 2010/0260055 A1 | 10/2010 | Anderson et al. |
| 2011/0022719 A1 | 1/2011 | Anderson et al. |
| 2011/0199383 A1 | 8/2011 | Anderson et al. |
| 2011/0199931 A1 | 8/2011 | Anderson et al. |
| 2012/0008642 A1 | 1/2012 | Katibian et al. |

FOREIGN PATENT DOCUMENTS

| | | |
|---|---|---|
| CN | 88101302 A | 10/1988 |
| CN | 1234709 A | 11/1999 |
| CN | 1310400 A | 8/2001 |
| CN | 1377194 A | 10/2002 |
| CN | 1467953 A | 1/2004 |
| CN | 1476268 A | 2/2004 |
| EP | 0594006 A1 | 4/1994 |
| EP | 0850522 A2 | 7/1998 |
| EP | 0872085 A1 | 10/1998 |
| EP | 0896318 | 2/1999 |
| EP | 0969676 | 1/2000 |
| EP | 1217602 A2 | 6/2002 |
| EP | 1309151 | 5/2003 |
| EP | 1423778 A2 | 6/2004 |
| EP | 1478137 A1 | 11/2004 |
| EP | 1544743 A2 | 6/2005 |
| EP | 1580964 A1 | 9/2005 |
| EP | 1630784 | 3/2006 |
| FR | 2729528 A1 | 7/1996 |
| GB | 2250668 A | 6/1992 |
| GB | 2265796 A | 10/1993 |
| JP | 53131709 A | 11/1978 |
| JP | 62132433 A | 6/1987 |
| JP | 64008731 U | 1/1989 |
| JP | H01129371 A | 5/1989 |
| JP | 1314022 A | 12/1989 |
| JP | H0465711 A | 3/1992 |
| JP | 4167715 A | 6/1992 |
| JP | 4241541 | 8/1992 |
| JP | 5199387 A | 8/1993 |
| JP | 5219141 A | 8/1993 |
| JP | 5260115 A | 10/1993 |
| JP | 6037848 A | 2/1994 |
| JP | 06053973 | 2/1994 |
| JP | 06317829 | 11/1994 |
| JP | 7115352 A | 5/1995 |
| JP | 08037490 | 2/1996 |
| JP | H0854481 A | 2/1996 |
| JP | 8274799 A | 10/1996 |
| JP | 9006725 A | 1/1997 |
| JP | H0923243 A | 1/1997 |
| JP | 09230837 | 9/1997 |
| JP | 09261232 | 10/1997 |
| JP | 09270951 | 10/1997 |
| JP | 9307457 A | 11/1997 |
| JP | 10200941 | 7/1998 |
| JP | 10234038 A | 9/1998 |
| JP | 10312370 A | 11/1998 |
| JP | 11017710 | 1/1999 |
| JP | 11032041 A | 2/1999 |
| JP | 11122234 A | 4/1999 |
| JP | 11163690 A | 6/1999 |
| JP | 11225182 A | 8/1999 |
| JP | 11225372 A | 8/1999 |
| JP | 11249987 A | 9/1999 |
| JP | 11282786 A | 10/1999 |
| JP | 11341363 A | 12/1999 |
| JP | 11355327 A | 12/1999 |
| JP | 2000188626 | 7/2000 |
| JP | 2000216843 A | 8/2000 |
| JP | 2000236260 A | 8/2000 |
| JP | 2000278141 A | 10/2000 |
| JP | 2000295667 | 10/2000 |
| JP | 2000324135 A | 11/2000 |
| JP | 2000358033 A | 12/2000 |
| JP | 200144960 | 2/2001 |
| JP | 200194542 | 4/2001 |
| JP | 2001094524 | 4/2001 |
| JP | 2001177746 | 6/2001 |
| JP | 2001222474 A | 8/2001 |
| JP | 2001282714 A | 10/2001 |
| JP | 2001292146 A | 10/2001 |
| JP | 2001306428 A | 11/2001 |
| JP | 2001319745 A | 11/2001 |
| JP | 2001320280 A | 11/2001 |
| JP | 2001333130 A | 11/2001 |
| JP | 2002500855 A | 1/2002 |
| JP | 2002503065 T | 1/2002 |
| JP | 2002062990 A | 2/2002 |
| JP | 2002208844 A | 7/2002 |
| JP | 2002281007 A | 9/2002 |
| JP | 2002300229 A | 10/2002 |
| JP | 2002300299 A | 10/2002 |

(56) References Cited

FOREIGN PATENT DOCUMENTS

| | | |
|---|---|---|
| JP | 2003006143 A | 1/2003 |
| JP | 2003009035 A | 1/2003 |
| JP | 2003044184 A | 2/2003 |
| JP | 2003046595 | 2/2003 |
| JP | 2003046596 A | 2/2003 |
| JP | 2003058271 A | 2/2003 |
| JP | 2003069544 A | 3/2003 |
| JP | 2003076654 A | 3/2003 |
| JP | 2003098583 A | 4/2003 |
| JP | 2003111135 A | 4/2003 |
| JP | 2003167680 | 6/2003 |
| JP | 2003198550 A | 7/2003 |
| JP | 2003303068 A | 10/2003 |
| JP | 2004005683 A | 1/2004 |
| JP | 2004007356 A | 1/2004 |
| JP | 2004021613 | 1/2004 |
| JP | 2004046324 A | 2/2004 |
| JP | 2004153620 | 5/2004 |
| JP | 2004246023 A | 9/2004 |
| JP | 2004297660 A | 10/2004 |
| JP | 2004531916 | 10/2004 |
| JP | 2004309623 A | 11/2004 |
| JP | 2004363687 A | 12/2004 |
| JP | 2005107683 A | 4/2005 |
| JP | 2005536167 A | 11/2005 |
| JP | 2005539464 A | 12/2005 |
| KR | 19990061245 | 7/1999 |
| KR | 0222225 | 10/1999 |
| KR | 1019990082741 | 11/1999 |
| KR | 1020000039224 | 7/2000 |
| KR | 19990058829 | 1/2001 |
| KR | 20010019734 A | 3/2001 |
| KR | 20020071226 | 9/2002 |
| KR | 20030061001 | 7/2003 |
| KR | 20040014406 | 2/2004 |
| KR | 1020047003852 | 5/2004 |
| KR | 200469360 | 8/2004 |
| KR | 20060056989 | 5/2006 |
| KR | 1020060053050 | 5/2006 |
| RU | 2111619 | 5/1998 |
| RU | 2150791 C1 | 6/2000 |
| RU | 2337497 | 10/2008 |
| TW | 459184 B | 10/2001 |
| TW | 466410 | 12/2001 |
| TW | 488133 B | 5/2002 |
| TW | 507195 | 10/2002 |
| TW | 513636 | 12/2002 |
| TW | 515154 | 12/2002 |
| TW | 529253 | 4/2003 |
| TW | 535372 | 6/2003 |
| TW | 540238 B | 7/2003 |
| TW | 542979 B | 7/2003 |
| TW | 200302008 | 7/2003 |
| TW | 546958 | 8/2003 |
| TW | 552792 B | 9/2003 |
| TW | 200304313 | 9/2003 |
| TW | 563305 B | 11/2003 |
| TW | 569547 B | 1/2004 |
| TW | 595116 B | 6/2004 |
| WO | WO9210890 | 6/1992 |
| WO | WO9410779 A1 | 5/1994 |
| WO | WO9619053 A1 | 6/1996 |
| WO | WO 9642158 A1 * | 12/1996 |
| WO | WO 9802988 A2 * | 1/1998 |
| WO | WO9915979 | 4/1999 |
| WO | 9923783 A2 | 5/1999 |
| WO | WO0130038 A1 | 4/2001 |
| WO | WO0137484 A2 | 5/2001 |
| WO | WO0138970 A2 | 5/2001 |
| WO | WO0138982 A1 | 5/2001 |
| WO | WO0158162 | 8/2001 |
| WO | WO0249314 A2 | 6/2002 |
| WO | WO02098112 | 12/2002 |
| WO | WO03023587 A2 | 3/2003 |
| WO | WO03039081 A1 | 5/2003 |
| WO | WO03040893 A2 | 5/2003 |
| WO | WO03061240 A1 | 7/2003 |
| WO | WO2005096594 | 10/2003 |
| WO | WO2004015680 | 2/2004 |
| WO | WO2004110021 | 12/2004 |
| WO | WO2005018191 A2 | 2/2005 |
| WO | 2005073955 A1 | 8/2005 |
| WO | WO2005088939 | 9/2005 |
| WO | WO2005091593 | 9/2005 |
| WO | WO2005122509 | 12/2005 |
| WO | WO2006008067 | 1/2006 |
| WO | WO2006058045 A2 | 6/2006 |
| WO | WO2006058050 A2 | 6/2006 |
| WO | WO2006058051 | 6/2006 |
| WO | WO2006058052 A2 | 6/2006 |
| WO | WO2006058053 A2 | 6/2006 |
| WO | WO2006058067 A2 | 6/2006 |
| WO | WO2006058173 A2 | 6/2006 |
| WO | WO2007051186 | 5/2007 |

OTHER PUBLICATIONS

European Search Report—EP10172872, Search Authority—Munich Patent Office, Dec. 17, 2010.
European Search Report—EP10172878, Search Authority—Munich Patent Office, Dec. 17, 2010.
European Search Report—EP10172882, Search Authority—Munich Patent Office, Dec. 29, 2010.
European Search Report—EP10172885, Search Authority—Munich Patent Office, Dec. 23, 2010.
Hopkins, J. et al.: "Display Power Management," IP.com Journal; IP.com Inc., West Henrietta, NY (Mar. 1, 1995), XP013103130, ISSN: 1533-0001, vol. 38 No. 3 pp. 425-427.
IEEE STD 1394B; IEEE Standard for High Performance Serial Bus-Amendment 2(Dec. 2002).
Liptak, "Instrument Engineer's Handbook, Third Edition, vol. Three: Process Software and Digital Networks, Section 4.17, Proprietary Networks, pp. 624-637, Boca Raton" CRC Press, Jun. 26, 2002.
Masnik, B. et al.: "On Linear Unequal Error Protection Codes," IEEE Transations on Information Theory, vol. IT-3, No. 4, (Oct. 1, 1967), pp. 600-607.
Plug and Display Standard Video Electronics Standards Association—VESA, Ver 1, Jun. 11, 1997 XP002123075.
Sevanto, J., "Multimedia messaging service for GPRS and UMTS", IEEE on WCNC, Sep. 1999, pp. 1422-1426, vol. 3.
STMicroelectronics: "STV0974 Mobile Imaging DSP Rev.3", Datasheet internet, (Nov. 30, 2004), XP002619368. Retrieved from the Internet: URL: http://pdf1.alldatasheet.com/datasheet-pdf/view/ 112376/STMICROELECTRONICS/STV0974.html [retrieved on Jan. 27, 2011], pp. 1-69.
Supplementary European Search Report—EP05849651, Search Authorty—The Hague Patent Office, Jan. 31, 2011.
Supplementary European Search Report—EP05852044—Search Authority—The Hague—May 17, 2011.
Taiwan Search Report—TW093127510—TIPO—Apr. 1, 2011.
Translation of Office Action in Chinese application 201010183254.3 corresponding to U.S. Appl. No. 11/008,024.
"Transmission and Multiplexing; High Bit Rate Digital Subscriber Line (HDSL) Transmission System on Metallic Local Lines; HDSL Core Specification and Applications for 2 048 Kbit/S Based Access Digital Sections; ETR 152" European Telecommunications Standard, Dec. 1996, pp. 1-164.
"Universal Serial Bus Specification—Revision 2.0: Chapter 9—USB Device Framework," Universal Serial Bus Specification, Apr. 27, 2000, pp. 239-274, XP002474828.
"V4400," Product Brochure, May 31, 2004.
VESA Mobile Display Digital Interface, Proposed Standard, Version 1P Draft 10, Aug. 13, 2003, pp. 76-151.
VESA Mobile Display Digital Interface. Proposed Standard,'Version 1P, Draft 11, Sep. 10, 2003, pp. 76-150.
VESA Mobile Display Digital Interface, Proposed Standard,'Version 1P, Draft, 14, Oct. 29, 2003, pp. 76-158.
VESA Mobile Display Digital Interface, Proposed Standard: Version 1P, Draft 10, August 13, 2003, pp. 1-75.

(56) References Cited

OTHER PUBLICATIONS

VESA Mobile Display Digital Interface, Proposed Standard: Version 1P, Draft 13, Oct. 15, 2003, pp. 76-154.
VESA Mobile Display Digital Interface, Proposed Standard: Version 1P, Draft 15, Nov. 12, 2003, pp. 1-75.
VESA Mobile Display Digital Interface, Proposed Standard: Version 1P, Draft 15, Nov. 12, 2003, pp. 76-160.
VESA Mobile Display Digital Interface, Proposed Standard; Version 1P, Draft 11, Sep. 10, 2003, pp. 1-75.
VESA Mobile Display Digital Interface, Proposed Standard:'Version 1P, Draft 13, Oct. 15, 2003. pp. 1-75.
VESA Mobile Display Digital Interface, Proposed Standard: Version 1P, Draft 14, Oct. 29, 2003, pp. 1-75.
VESA: "VESA Mobile Display Digital Interface Standard: Version 1." Milpitas, CA (Jul. 23, 2004), pp. 87-171.
Video Electronics Standards Association (VESA) "Mobile Display Digital Interface Standard (MDDI)," Jul. 2004.
3GPP2 C.S0047-0. "Link-Layer Assisted Service Options for Voice-over-IP: Header Remover (SO60) and Robust Header Compression (SO61)," Version 1.0, Apr. 14, 2003, pp. 1-36.
"Nokia 6255", Retrieved from the Internet: URL: http://nokiamuseum.com/view.php?model=6522 [retrieved on Feb. 4, 2012].

\* cited by examiner

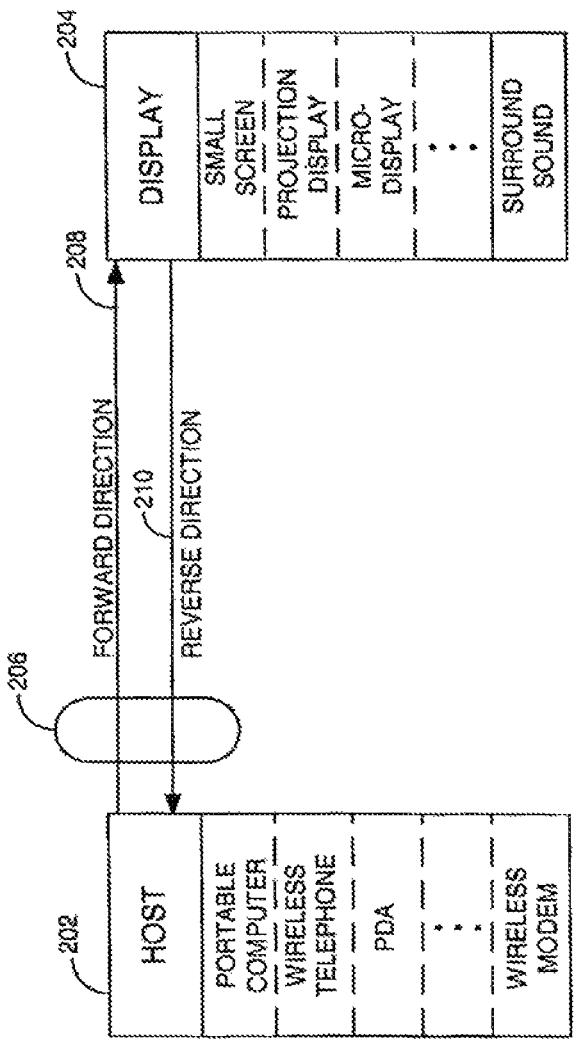
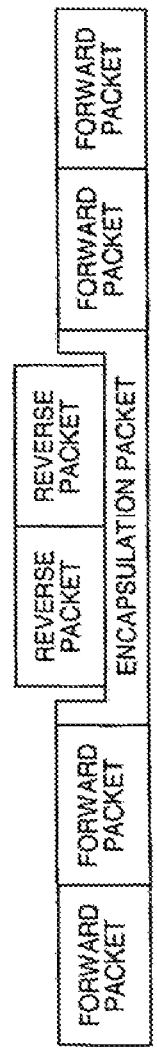
FIG. 2
FIG. 3

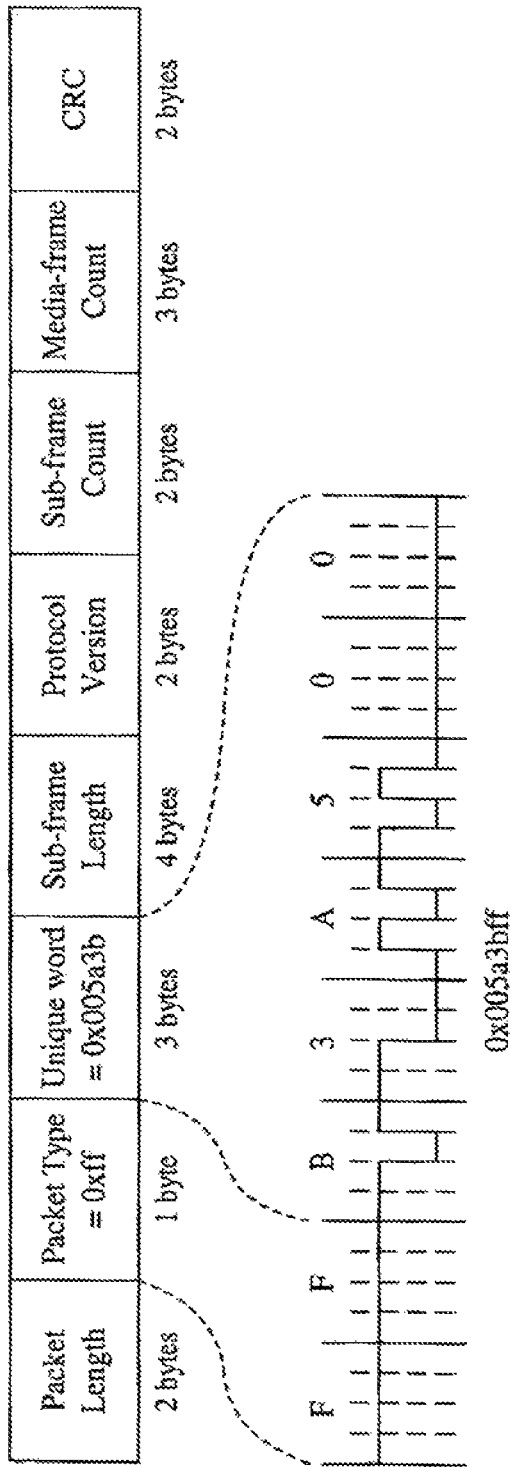

| Packet Length | Packet Type = 2 | Audio Channel ID | Audio Sample Count | Bits per Sample and Packing | Audio Sample Rate | Parameter CRC | Digital Audio Data | Audio Data CRC |
|---|---|---|---|---|---|---|---|---|
| 2 bytes | 1 byte | 1 byte | 2 bytes | 1 byte | 1 byte | 2 bytes | Packet Length - 10 bytes | 2 bytes |

FIG. 13

| Packet Length | Packet Type = 56 to 63 | Stream ID Number | Stream Parameters | Parameter CRC | Stream Data | Stream Data CRC |
|---|---|---|---|---|---|---|
| 2 bytes | 1 byte | 2 bytes | | 2 bytes | | 2 bytes |

FIG. 15

| Packet Length | Packet Type = 64 | Color Map Data Size | Color Map Offset | Parameter CRC | Color Map Data | Data CRC |
|---|---|---|---|---|---|---|
| 2 bytes | 1 byte | 2 bytes | 2 bytes | 2 bytes | (Packet_Length - 9) bytes | 2 bytes |

FIG. 16

| Packet Length | Packet Type = 67 | Keyboard Data | CRC |
|---|---|---|---|
| 2 bytes | 1 byte | (Packet_Length - 3) bytes | 2 bytes |

FIG. 19

| Packet Length | Packet Type = 68 | Pointing Device Data | CRC |
|---|---|---|---|
| 2 bytes | 1 byte | (Packet_Length - 3) bytes | 2 bytes |

FIG. 20

| Packet Length | Packet Type = 69 | CRC |
|---|---|---|
| 2 bytes | 1 byte | 2 bytes |

FIG. 21

| Packet Length | Packet Type = 70 | Reverse Link Request | CRC Error Count | Capability Change | CRC |
|---|---|---|---|---|---|
| 2 bytes | 1 byte | 3 bytes | 1 byte | 1 byte | 2 bytes |

FIG. 22

| Packet Length | Packet Type = 71 | Upper Left X Value | Upper Left Y Value | Window Width | Window Height | Window X Movement | Window Y Movement | CRC |
|---|---|---|---|---|---|---|---|---|
| 2 bytes | 1 byte | 2 bytes | 2 bytes | 2 bytes | 2 bytes | 2 bytes | 2 bytes | 2 bytes |

FIG. 23

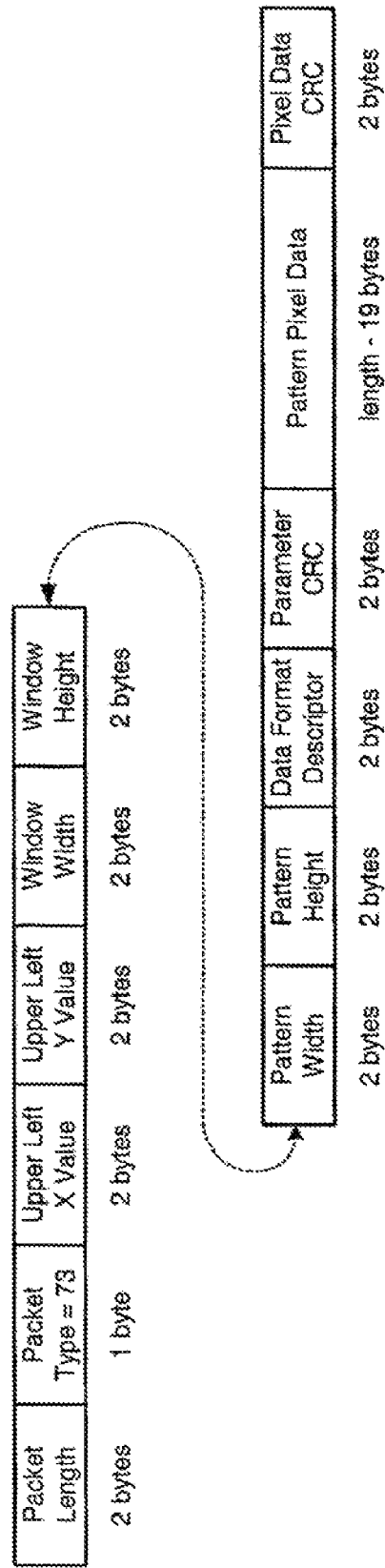

| Packet Length | Packet Type = 74 | Parameter CRC | Communication Link Data | Comm. Data CRC |
|---|---|---|---|---|
| 2 bytes | 1 byte | 2 bytes | length - 5 bytes | 2 bytes |

FIG. 26

| Packet Length | Packet Type = 75 | Interface Type | CRC |
|---|---|---|---|
| 2 bytes | 1 byte | 1 byte | 2 bytes |

FIG. 27

| Packet Length | Packet Type = 76 | Interface Type | CRC |
|---|---|---|---|
| 2 bytes | 1 byte | 1 byte | 2 bytes |

FIG. 28

| Packet Length | Packet Type = 77 | Interface Type | CRC |
|---|---|---|---|
| 2 bytes | 1 byte | 1 byte | 2 bytes |

FIG. 29

| Packet Length | Packet Type = 78 | Audio Channel Enable Mask | CRC |
|---|---|---|---|
| 2 bytes | 1 byte | 1 byte | 2 bytes |

FIG. 30

| Packet Length | Packet Type = 79 | Audio Sample Rate | CRC |
|---|---|---|---|
| 2 bytes | 1 byte | 1 byte | 2 bytes |

FIG. 31

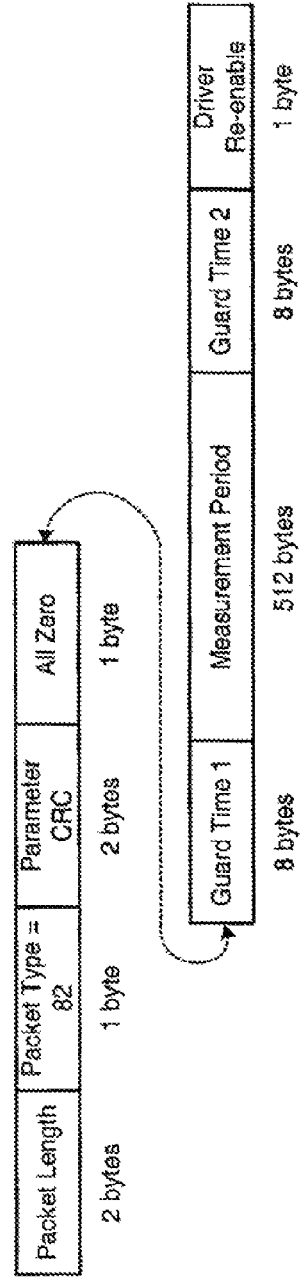

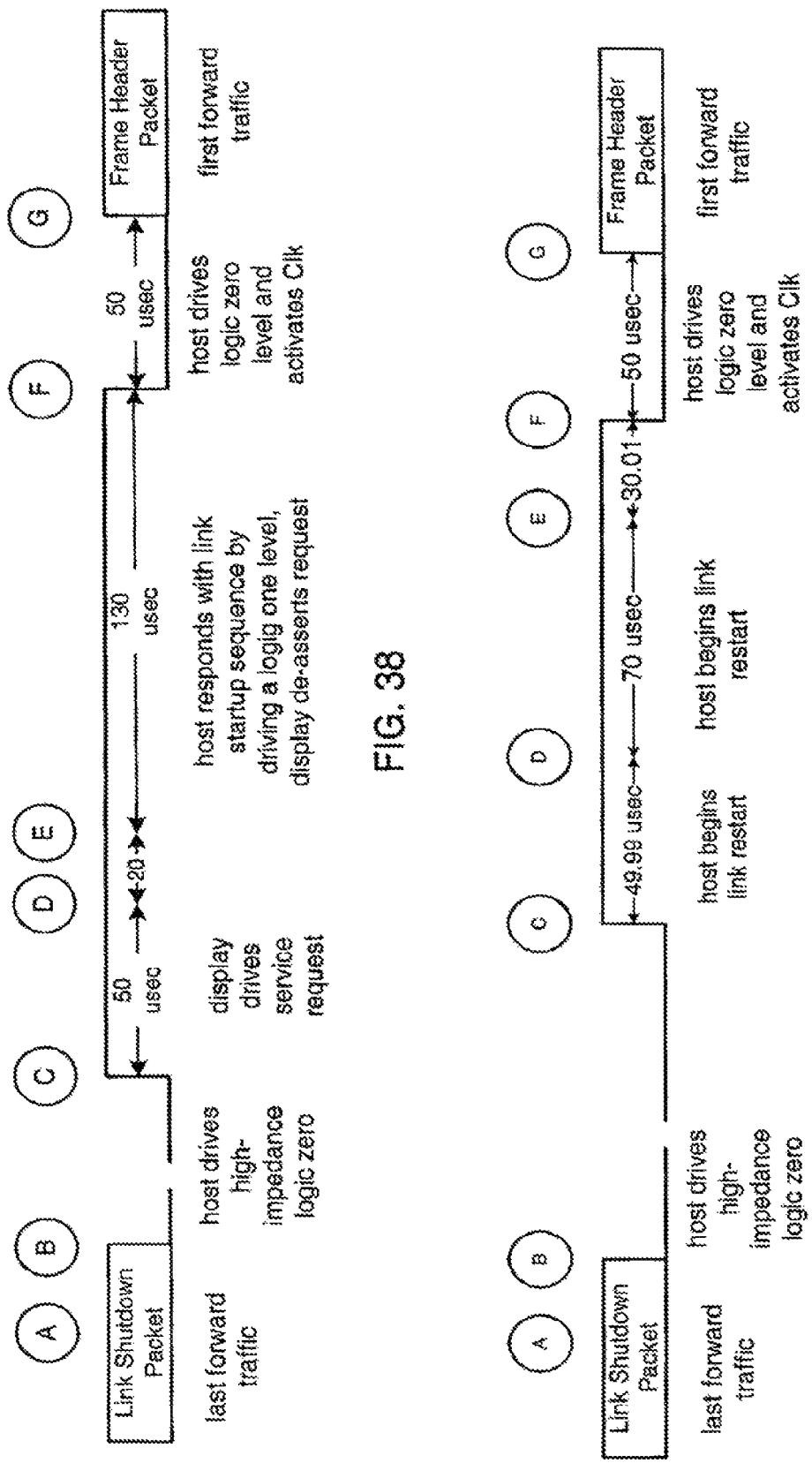

cond 1 = frame header packet & good CRC at frame boundary, Frame Length > 0
cond 2 = no sync pattern or bad CRC at frame boundary
cond 3 = found sync pattern, Frame Length = 0
cond 4 = received link shutdown packet
cond 5 = found sync pattern, Frame Length > 0
cond 6 = frame header packet & good CRC, Frame Length > 0

| Packet Length | Packet Type = 83 | Parameter CRC | Calibration Data Sequence |
|---|---|---|---|
| 2 bytes | 1 byte | 2 bytes | 512 bytes |

FIG. 56

SYSTEM FOR TRANSFERRING DIGITAL DATA AT A HIGH RATE BETWEEN A HOST AND A CLIENT OVER A COMMUNICATION PATH FOR PRESENTATION TO A USER

CLAIM OF PRIORITY UNDER 35 U.S.C. §120

The present Application for patent is a Divisional of and claims priority to U.S. patent application Ser. No. 10/236,657, filed Sep. 6, 2002, which is related to patent application Ser. No. 10/020,520, filed Dec. 14, 2001, now U.S. Pat. No. 6,760,772, and which claims priority to U.S. Provisional Patent Application No. 60/317,858, filed Sep. 6, 2001, and U.S. Provisional Patent Application No. 60/356,892, filed Feb. 13, 2002, which applications are incorporated herein by reference in their entirety.

BACKGROUND OF THE INVENTION

I. Field of the Invention

The present invention relates to a digital signal protocol and process for communicating signals between a host communications device and a client audio/visual presentation device at high data rates. More specifically, the present invention relates to a technique for transferring multimedia and other types of digital signals from a wireless device to a micro-display unit or other presentation device using a low power high data rate transfer mechanism.

II. Related Art

Computers, electronic game related products, and various video technologies (for example DVD's and High Definition VCRs) have advanced significantly over the last few years to provide for presentation of increasingly higher resolution still, video, video-on-demand, and graphics images, even when including some types of text, to end users of such equipment. These advances in turn mandated the use of higher resolution electronic viewing devices such as high definition video monitors, HDTV monitors, or specialized image projection elements. Combining such visual images with high-definition or -quality audio data, such as when using CD type sound reproduction, DVDs, and other devices also having associated audio signal outputs, is used to create a more realistic, content rich, or true multimedia experience for an end user. In addition, highly mobile, high quality sound systems and music transport mechanisms, such as MP3 players, have been developed for audio only presentations to end users.

In a typical video presentation scenario, video data is typically transferred using current techniques at a rate that could be best termed as slow or medium, being on the order of one to tens of kilobits per second. This data is then either buffered or stored in transient or longer-term memory devices, for delayed (later) play out on a desired viewing device. For example, images may be transferred "across" or using the Internet using a program resident on a computer having a modem or internet connection device, to receive or transmit data useful in digitally representing an image. A similar transfer can take place using wireless devices such as portable computers equipped with wireless modems, or wireless Personal Data Assistants (PDAs), or wireless telephones.

Once received, the data is stored locally in memory elements, circuits, or devices, such as RAM or flash memory, including external storage devices, for playback. Depending on the amount of data and the image resolution, the playback might begin relatively quickly, or be presented with longer-term delay. That is, in some instances, image presentation allows for a certain degree of real time playback for very small or low resolution images not requiring much data, or using some type of buffering, so that after a small delay, some material is presented while more material is being transferred. Provided there are no interruptions in the transfer link, once the presentation begins the transfer is reasonably transparent to the end user of the viewing device.

The data used to create either still images or motion video are often compressed using one of several well known techniques such as those specified by the Joint Photographic Experts Group (JPEG), the Motion Picture Experts Group (MPEG), and other well known standards organizations or companies in the media, computer, and communications industries to speed the transfer of data over a communication link. This allows transferring images or data faster by using a smaller number of bits to transfer a given amount of information.

Once the data is transferred to a "local" device such as a computer or other device, the resulting information is uncompressed (or played using special decoding players) and prepared for appropriate presentation based on the corresponding available presentation resolution and control elements. For example, a typical computer video resolution in terms of a screen resolution of X by Y pixels typically ranges from as low as 480×640, through 600×800 to 1024×1024, although a variety of other resolutions are generally possible, either as desired or needed.

Image presentation is also affected by the image content and the ability of given video controllers to manipulate the image in terms of certain predefined color levels or color depth (bits per pixel used to generate colors) and intensities, and any additional overhead bits being employed. For example, a typical computer presentation would anticipate anywhere from around 8 to 32, or more, bits per pixel to represent various colors (shades and hues), although other values are encountered.

From the above values, one can see that a given screen image is going to require the transfer of anywhere from 2.45 Megabits (Mb) to around 33.55 Mb of data over the range from the lowest to highest typical resolutions and depth, respectively. When viewing video or motion type images at a rate of 30 frames per second, the amount of data required is around 73.7 to 1,006 Megabits of data per second (Mbps), or around 9.21 to 125.75 Megabytes per second (MBps). In addition, one may desire to present audio data in conjunction with images, such as for a multimedia presentation, or as a separate high resolution audio presentation, such as CD quality music. Additional signals dealing with interactive commands, controls, or signals may also be employed. Each of these options adding even more data to be transferred. In any case, when one desires to transfer high quality or high resolution image data and high quality audio information or data signals to an end user to create a content rich experience, a high data transfer rate link is required between presentation elements and the source or host device that is configured to provide such types of data.

Data rates of around 115 Kilobytes (KBps) or 920 Kilobits per second (Kbps) can be routinely handled by modern serial interfaces. Other interfaces such as USB serial interfaces, can accommodate data transfers at rates as high as 12 MBps, and specialized high speed transfers such as those configured using the Institute of Electrical and Electronics Engineers (IEEE) 1394 standard, can occur at rates on the order of 100 to 400 MBps. Unfortunately, these rates fall short of the desired high data rates discussed above which are contemplated for use with future wireless data devices and services for providing high resolution, content rich, output signals for driving portable video displays or audio devices. In addition, these interfaces require the use of a significant amount of host or system and client software to operate. Their software protocol stacks also create an undesirably large amount of overhead, especially where mobile wireless devices or telephone applications are contemplated. Furthermore, some of these interfaces utilize bulky cables which are too heavy and unsatisfactory for highly aesthetic oriented mobile applications, complex connectors which add cost, or simply consume too much power.

There are other known interfaces such as the Analog Video Graphics Adapter (VGA), Digital Video Interactive (DVI) or Gigabit Video Interface (GVIF) interfaces. The first two of these are parallel type interfaces which process data at higher transfer rates, but also employ heavy cables and consume large amounts of power, on the order of several watts. Neither of these characteristics are amenable to use with portable consumer electronic devices. Even the third interface consumes too much power and uses expensive or bulky connectors.

For some of the above interfaces, and other very high rate data systems/protocols or transfer mechanisms associated with data transfers for fixed installation computer equipment, there is another major drawback. To accommodate the desired data transfer rates also requires substantial amounts of power and/or operation at high current levels. This greatly reduces the usefulness of such techniques for highly mobile consumer oriented products.

Generally, to accommodate such data transfer rates using alternatives such as say optical fiber type connections and transfer elements, also requires a number of additional converters and elements that introduce much more complexity and cost, than desired for a truly commercial consumer oriented product. Aside from the generally expensive nature of optical systems as yet, their power requirements and complexity prevents general use for lightweight, low power, portable applications.

What is lacking in the industry for portable or mobile applications, is a technique to provide a high quality presentation experience, whether it be audio, video, or multimedia based, for highly mobile end users. That is, when using portable computers, wireless phones, PDAs, or other highly mobile communication devices or equipment, the current video and audio presentation systems or devices being used simply cannot deliver output at the desired high quality level. Often, the perceived quality that is lacking is the result of unobtainable high data rates needed to transfer the high quality presentation data. Therefore, a new transfer mechanism is needed to increase data throughput between host devices providing the data and client display devices or elements presenting an output to end users.

SUMMARY

The above drawback, and others, existent in the art are addressed by embodiments of the current invention in which a new protocol and data transfer mechanism has been developed for transferring data between a host device and a recipient client device at high data rates.

An advantage of embodiments of the invention is that a technique is provided for data transfer that is low in complexity, low cost, has high reliability, fits well within the environment of use, and is very robust, while remaining very flexible.

Embodiments for the invention are directed to a Mobile Display Digital Interface (MDDI) for transferring digital data at a high rate between a host device and a client device over a communication path which employs a plurality or series of packet structures linked together to form a communication protocol for communicating a pre-selected set of digital control and presentation data between the host and client devices. The signal communications protocol or link layer is used by a physical layer of host or client link controllers. At least one link controller residing in the host device is coupled to the client device through the communications path or link, and is configured to generate, transmit, and receive packets forming the communications protocol, and to form digital presentation data into one or more types of data packets. The interface provides for bi-directional transfer of information between the host and client.

In further aspects of embodiments of the invention, at least one client link controller, or client receiver, is disposed in the client device and is coupled to the host device through the communications path or link. The client link controller is also configured to generate, transmit, and receive packets forming the communications protocol, and to form digital presentation data into one or more types of data packets. Generally, the host or link controller employs a state machine for processing data packets used in commands or certain types of signal preparation and inquiry processing, but can use a slower general purpose processor to manipulate data and some of the less complex packets used in the communication protocol. The host controller comprises one or more differential line drivers; while the client receiver comprises one or more differential line receivers coupled to the communication path.

The packets are grouped together within media frames that are communicated between the host and client devices having a pre-defined fixed length with a pre-determined number of packets having different variable lengths. The packets each comprise a packet length field, one or more packet data fields, and a cyclic redundancy check field. A Sub-frame Header Packet is transferred or positioned at the beginning of transfers of other packets from the host link controller. One or more Video Stream type packets and Audio Stream type packets are used by the communications protocol to transfer video type data and audio type data, respectively, from the host to the client over a forward link for presentation to a client device user. One or more Reverse Link Encapsulation type packets are used by the communications protocol to transfer data from the client device to the host link controller.

Filler type packets are generated by the host link controller to occupy periods of forward link transmission that do not have data. A plurality of other packets are used by the communications protocol to transfer video information. Such packets include Color Map, Bit Block Transfer, Bitmap Area Fill, Bitmap Pattern Fill, and Transparent Color Enable type packets. User-Defined Stream type packets are used by the communications protocol to transfer interface-user defined data. Keyboard Data and Pointing Device Data type packets are used by the communications protocol to transfer data to or from user input devices associated with said client device. A Link Shutdown type packet is used by the communications protocol to terminate the transfer of data in either direction over said communication path.

The communication path generally comprises or employs a cable having a series of four or more conductors and a shield. In some embodiments the link controllers comprise a USB data interface and the cable uses a USB type interface along with the other conductors. In addition, printed wires or flexible conductors can be used, as desired.

The host link controller requests display capabilities information from the client device in order to determine what type of data and data rates said client is capable of accommodating through said interface. The client link controller communicates display or presentation capabilities to the host link controller using at least one Display Capability type packet. Multiple transfer modes are used by the communications protocol with each allowing the transfer of different maximum numbers of bits of data in parallel over a given time period, with each mode selectable by negotiation between the host and client link controllers. These transfer modes are dynamically adjustable during transfer of data, and the same mode need not be used on the reverse link as is used on the forward link.

In other aspects of some embodiments of the invention, the host device comprises a wireless communications device, such as a wireless telephone, a wireless PDA, or a portable computer having a wireless modem disposed therein. A typical client device comprises a portable video display such as a micro-display device, and/or a portable audio presentation system. Furthermore, the host may use storage means or elements to store presentation or multimedia data to be transferred to be presented to a client device user.

BRIEF DESCRIPTION OF THE DRAWINGS

Further features and advantages of the invention, as well as the structure and operation of various embodiments of the invention, are described in detail below with reference to the accompanying drawings. In the drawings, like reference numbers generally indicate identical, functionally similar, and/or structurally similar elements or processing steps, and the drawing in which an element first appears is indicated by the leftmost digit(s) in the reference number.

FIG. 2 illustrates the overall concept of a Mobile Digital Data Interface with a host and client interconnection.

FIG. 3 illustrates the structure of a packet useful for realizing data transfers from a client device to a host device.

FIG. 8 illustrates the format of a Sub-frame Header Packet.

FIG. 9 illustrates the format and contents of a Filler Packet.

FIG. 13 illustrates the format of an Audio Stream Packet.

FIG. 15 illustrates the format of a User-Defined Stream Packet.

FIG. 16 illustrates the format of a Color Map Packet.

FIG. 19 illustrates the format of a Keyboard Data Packet.

FIG. 20 illustrates the format of a Pointing Device Data Packet.

FIG. 21 illustrates the format of a Link Shutdown Packet.

FIG. 22 illustrates the format of a Display Request and Status Packet.

FIG. 23 illustrates the format of a Bit Block Transfer Packet.

FIG. 24 illustrates the format of a Bitmap Area Fill Packet.

FIG. 25 illustrates the format of a Bitmap Pattern Fill Packet.

FIG. 26 illustrates the format of a Communication Link Data Channel Packet.

FIG. 27 illustrates the format of a Interface Type Handoff Request Packet.

FIG. 28 illustrates the format of an Interface Type Acknowledge Packet.

FIG. 29 illustrates the format of a Perform Type Handoff Packet.

FIG. 30 illustrates the format of a Forward Audio Channel Enable Packet.

FIG. 31 illustrates the format of a Reverse Audio Sample Rate Packet.

FIG. 32 illustrates the format of a Digital Content Protection Overhead Packet.

FIG. 33 illustrates the format of a Transparent Color Enable Packet.

FIG. 34 illustrates the format of a Round Trip Delay Measurement Packet.

FIG. 38 illustrates processing steps for a typical service request with no contention.

FIG. 39 illustrates processing steps for a typical service request asserted after the link restart sequence has begun, contending with link start.

FIG. 56 illustrates the format of a Forward Link Packet

DETAILED DESCRIPTION OF THE EMBODIMENTS

I. Overview

A general intent of the invention is to provide a Mobile Display Digital Interface (MDDI), as discussed below, which results in or provides a cost-effective, low power consumption, transfer mechanism that enables high- or very-high-speed data transfer over a short-range communication link between a host device and a display device using a "serial" type of data link or channel. This mechanism lends itself to implementation with miniature connectors and thin flexible cables which are especially useful in connecting display elements or devices such as wearable micro-displays (goggles or projectors) to portable computers, wireless communication devices, or entertainment devices.

The present invention can be used in a variety of situations to communicate or transfer large quantities of data, generally for audio, video, or multimedia applications from a host or source device where such data is generated or stored, to a client display or presentation device at a high rate. A typical application, which is discussed below, is the transfer of data from either a portable computer or a wireless telephone or modem to a visual display device such as a small video screen or a wearable micro-display appliance, such as in the form of goggles or helmets containing small projection lenses and screens.

The characteristics or attributes of the MDDI are such that they are independent of specific display technology. This is a highly flexible mechanism for transferring data at a high rate without regards to the internal structure of that data, nor the functional aspects of the data or commands it implements. This allows the timing of data packets being transferred to be adjusted to adapt to the idiosyncrasies of particular display devices, or unique display desires for certain devices, or to meet the requirements of combined audio and video for some A-V systems. The interface is very display element or client device agnostic, as long as the selected protocol is followed. In addition, the aggregate serial link data or data rate can vary over several orders of magnitude which allows a communication system or host device designer to optimize the cost, power requirements, client device complexity, and display device update rates.

The data interface is presented primarily for use in transferring large amounts of high rate data over a "wired" signal link or small cable. However, some applications may take advantage of a wireless link as well, including optical based links, provided it is configured to use the same packet and data structures developed for the interface protocol, and can sustain the desired level of transfer at low enough power consumption or complexity to remain practical.

II. Environment

Figure 1A:
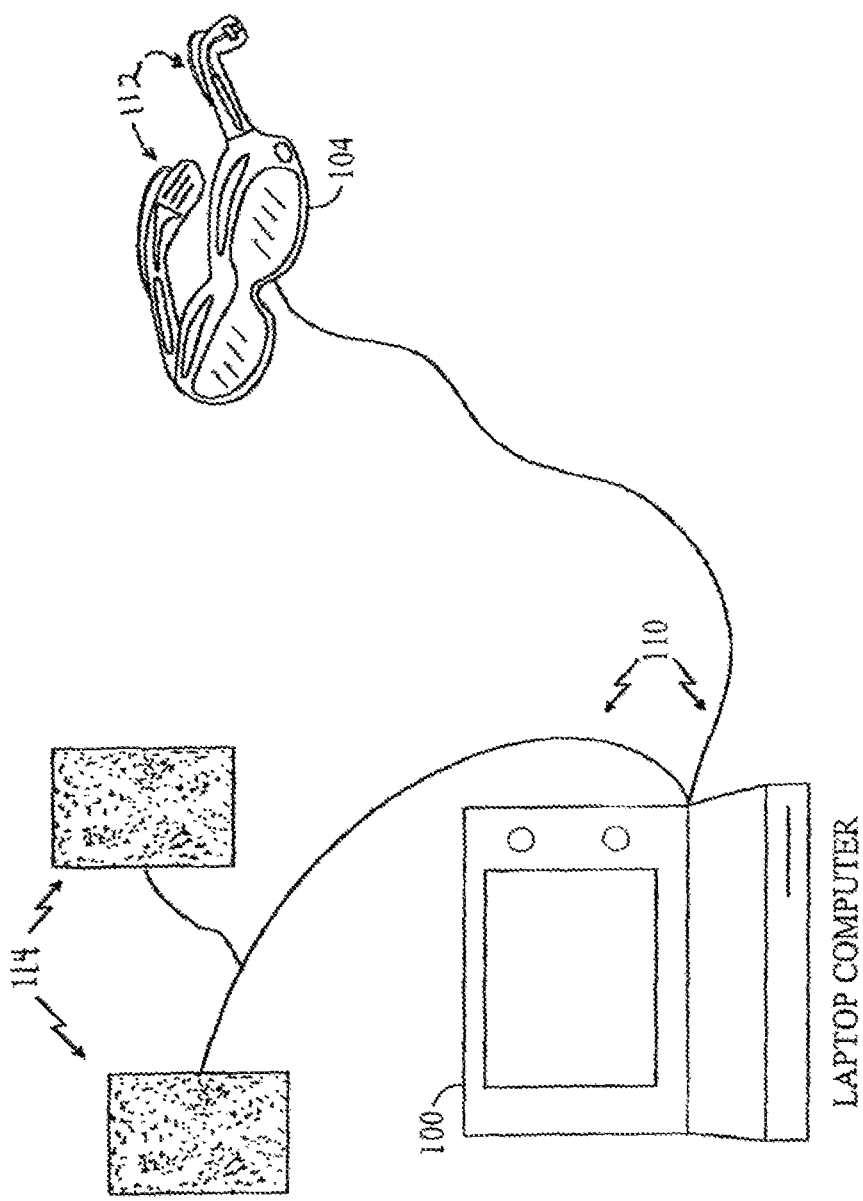
FIG. 1a illustrates a basic environment in which the present invention might operate including the use of a micro-display device used in conjunction with a portable computer.
Figure 1B:
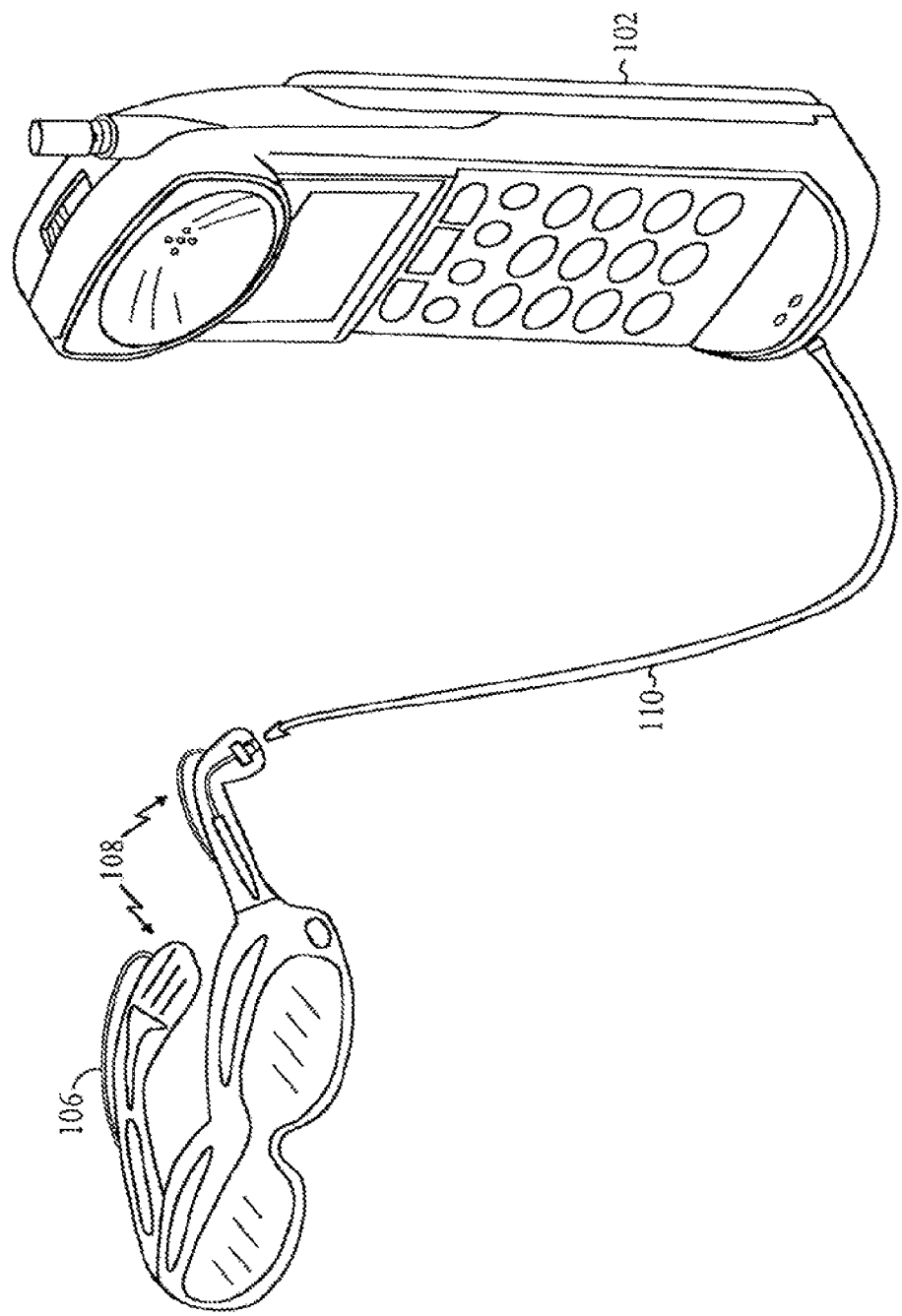
FIG. 1b illustrates a basic environment in which the present invention might operate including the use of a micro-display device and audio presentation elements used in conjunction with a wireless transceiver.

A typical application can be seen in FIGS. 1a and 1b where a portable or laptop computer 100 and wireless telephone or PDA device 102 are shown communicating data with display devices 104 and 106, respectively, along with audio reproduction system 108 and 112. The wireless device can be currently receiving data or have previously stored a certain amount of multimedia type data in a memory element or device for later presentation for viewing and/or hearing by an end user of the wireless device. Since a typical wireless device is used for voice and simple text communications most of the time, it has a rather small display screen and simple audio system (speakers) for communicating information to the device 102 user.

Computer 100 has a much larger screen, but still inadequate external sound system, and still falls short of other multimedia presentation devices such as a high definition television, or movie screens. Computer 100 is used for purposes of illustration and other types of processors, interactive video games, or consumer electronics devices can also be used with the invention. Computer 100 can employ, but is not limited to or by, a wireless modem or other built in device for wireless communications, or be connected to such devices using a cable or wireless link, as desired.

This makes presentation of more complex or "rich" data a less than a useful or enjoyable experience. Therefore, industry is developing other mechanisms and devices to present the information to end users and provide a minimum level of desired enjoyment or positive experience.

As previously discussed above, several types of display devices have or are currently being developed for presenting information to end users of device 100. For example, one or more companies have developed sets of wearable goggles that project an image in front of the eye of a device user to present a visual display. When correctly positioned such devices effectively "project" a virtual image, as perceived by a users eyes, that is much larger than the element providing the visual output. That is, a very small projection element allows the eye(s) of the user to "see" images on a much larger scale than possible with typical LCD screens and the like. The use of larger virtual screen images also allows the use of much higher resolution images than possible with more limited LCD screen displays. Other display devices could include, but are not limited to, small LCD screens or various flat panel display elements, projection lenses and display drivers for projecting images on a surface, and so forth.

There may also be additional elements connected to or associated with the use of wireless device 102 or computer 100 for presenting an output to another user, or to another device which in turn transfers the signals elsewhere or stores them. For example, data may be stored in flash memory, in optical form, for example using a writeable CD media or on magnetic media such as in a magnetic tape recorder and similar devices, for later use.

In addition, many wireless devices and computers now have built-in MP3 music decoding capabilities, as well as other advanced sound decoders and systems. Portable computers utilize CD and DVD playback capabilities as a general rule, and some have small dedicated flash memory readers for receiving pre-recorded audio files. The issue with having such capabilities is that digital music files promise a highly increased feature rich experience, but only if the decoding and playback process can keep pace. The same holds true for the digital video files.

To assist with sound reproduction, external speakers 114 are shown in FIG. 1*a*, which could also be accompanied by addition elements such as sub-woofers, or "surround-sound" speakers for front and rear sound projection. At the same time, speakers or earphones 108 are indicated as built-in to the support frame or mechanism of micro-display device 106 of FIG. 1*b*. As would be known, other audio or sound reproduction elements can be used including power amplification or sound shaping devices.

In any case, as discussed above, when one desires to transfer high quality or high resolution image data and high quality audio information or data signals from a data source to an end user over one or more communication links 110, a high data rate is required. That is, transfer link 110 is clearly a potential bottleneck in the communication of data as discussed earlier and is limiting system performance, since current transfer mechanisms do not achieve the high data rates typically desired. As discussed above for example, for higher image resolutions such as 1024 by 1024 pixels, with color depths of 24-32 bits per pixel and at data rates of 30 fps, the data rates can approach rates in excess of 755 Mbps or more. In addition, such images may be presented as part of a multimedia presentation which includes audio data and potentially additional signals dealing with interactive gaming or communications, or various commands, controls, or signals, further increasing the quantity or data and the data rate.

It is also clear that fewer cables or interconnections required for establishing a data link, means that mobile devices associated with a display are easier to use, and more likely to be adopted by a larger user base. This is especially true where multiple devices are commonly used to establish a full audio-visual experience, and more especially as the quality level of the displays and audio output devices increases.

Unfortunately, the higher data rates exceed current technology available for transferring data. What is needed is a technique for transferring data at higher rates for the data transfer link or communication path between presentation elements and the data source, which allows for consistently low(er) power, light weight, and as simple and economical a cabling structure as possible. Applicants have developed a new technique, or method and apparatus, to achieve these and other goals to allow an array of mobile, portable, or even fixed location devices to transfer data to desired displays, micro-displays, or audio transfer elements, at very high data rates, while maintaining a desired low power consumption, and complexity.

III. High Rate Digital Data Interface System Architecture

In order to create and efficiently utilize a new device interface, a signal protocol and system architecture has been formulated that provides a very high data transfer rate using low power signals. The protocol is based on a packet and common frame signals, or structures linked together to form a protocol for communicating a pre-selected set of data or data types along with a command or operational structure imposed on the interface.

A. Overview

The devices connected by or communicating over the MDDI link are called the host and client, with the client typically being a display device of some type. Data from the host to the display travels in the forward direction (referred to as forward traffic or link), and data from the display to the host travels in the reverse direction (reverse traffic or link), as enabled by the host. This is illustrated in the basic configuration shown in FIG. 2. In FIG. 2, a host 202 is connected to a client 204 using a bi-directional communication channel 206 which is illustrated as comprising a forward link 208 and a reverse link 210. However, these channels are formed by a common set of conductors whose data transfer is effectively switched between the forward or reverse link operations.

As discussed elsewhere, the host comprises one of several types of devices that can benefit from using the present invention. For example, host 202 could be a portable computer in the form of a handheld, laptop, or similar mobile computing device, it could be a PDA, a paging device, or one of many wireless telephones or modems. Alternatively, host 202 could be a portable entertainment or presentation device such as a portable DVD or CD player, or a game playing device. At the same time, client 204 could comprise a variety of devices useful for presenting information to an end user. For example, a micro-display incorporated in goggles or glasses, a projection device built into a hat or helmet, a small screen or even holographic element built into a vehicle, such as in a window or windshield, or various speaker, headphone, or sound systems for presenting high quality sound or music. However, those skilled in the art will readily recognize that the present invention is not limited to these devices, there being many other devices on the market, and proposed for use, that are intended to provide end users with high quality images and sound, either in terms of storage and transport or in terms of presentation at playback. The present invention is useful in increasing the data throughput between various devices to accommodate the high data rates needed for realizing the desired user experience.

B. Interface Types

The MDD Interface is contemplated as addressing five or more somewhat distinct physical types of interfaces found in the communications and computer industries. These are labeled at this point simply as Type-I, Type-II, Type-III, Type-IV and Type-U.

The Type-I interface is configured as a 6-wire (conductor) interface which makes it suitable for mobile or wireless telephones, PDAs, e-Books, electronic games, and portable media players, such as CD players, or MP3 players, and devices on similar types of electronic consumer technology. The Type-U interface is configured as an 8-wire (conductor) interface which is more suitable for laptop, notebook, or desktop personal computers and similar devices or applications, that do not require the display to be updated rapidly and do not have a built-in MDDI link controller. This interface type is also distinguishable by the use of an additional two-wire Universal Serial Bus (USB) interface, which is extremely useful in accommodating existing operating systems or software support found on most personal computers. Type-U interfaces can also be used in a USB-only mode where the display simply has a USB connector that connects to a standard USB port on a computer or similar device, for example.

Type-II, Type-III, and Type-IV interfaces are suitable for high performance displays or devices and use larger more complex cabling with additional twisted-pair type conductors to provide the appropriate shielding and low loss transfers for data signals.

The Type-I interface passes signals which can comprise both the display, audio, control, and limited signaling information, and is typically used for devices that do not require high-resolution full-rate video data. This type of interface is primarily intended for devices, such as mobile wireless devices, where a USB host is typically not available within the device for connection and transfer of signals. In this configuration, the mobile device is a MDDI host device, and acts as the "master" that controls the communication link from the host, which generally sends display data to the client (forward traffic or link).

In this interface, a host enables receipt of communication data at the host from the client (reverse traffic or link) by sending a special command or packet type to the client that allows it take over the bus for a specified duration and send data to the host as reverse packets. This is illustrated in FIG. 3, where a type of packet referred to as an encapsulation packet (discussed below) is used to accommodate the transfer of reverse packets over the transfer link, creating the reverse link. The time interval allocated for the host to poll the display for data is pre-determined by the host and is based on the requirements of each specified application. This type of half-duplex bi-directional data transfer is especially advantageous where a USB port is not available for transfer of information or data form the client.

The Type-U interface transfers signals which are well suited for use in laptop and desktop applications where a USB interface is widely supported by extensive amounts of motherboards or other hardware, and by operating system software. The use of an added USB interface allows use with "plug-and-play" features and easy application configuration. The inclusion of USB also allows general-purpose bi-directional flow of commands, status, audio data, and so forth while video and audio data intended for the client device can be transferred using the twisted pairs at low power and high speed. Power can be transferred using other wires, as discussed below. Embodiments of the invention using a USB interface allow high speed transfers over one set of conductors while implementing mainly signaling and control on the USB connection, which can be shut down when not in use and consumes little power.

The USB interface is a very extensively used standard for modern personal computer equipment, and the details of a USB interface and its operation are very well known in the art, so not explained here. For the USB interface, communication between the host and display are compliant with the Universal Serial Bus Specification, Revision 2.0. In applications using the Type-U interface where USB is the primary signaling channel and possibly a voice return channel, it is optional for the host to poll the client through the MDDI serial data signals.

High-performance displays capable of HDTV type or similar high resolutions require around 1.5 Gbps rate data streams in order to support full-motion video. The Type-II interface supports high data rates by transmitting 2 bits in parallel, the Type-III by transmitting 4 bits in parallel, and the Type-IV interface transfers 8 bits in parallel. The protocol used by the MDDI allows each Type-I, -II, -III, or -IV host to communicate with any Type-I, -II, -III, or -IV client or display by negotiating what is the highest data rate possible that can be used. The capabilities or available features of what can be referred to as the least capable device is used to set the performance of the link. As a rule, even for systems where the host and client are both capable using Type-II, Type-III, or Type-IV interfaces, both begin operation as a Type-I interface. The host then determines the capability of the target client or display, and negotiates a hand-off or reconfiguration operation to either Type-II, Type-III, or Type-IV mode, as appropriate for the particular application.

It is generally possible for the host to use the proper link-layer protocol (discussed further below) and at any time to step down or again reconfigure operation to a slower mode to save power or to step up to a faster mode to support higher speed transfers, such as for higher resolution display content. For example, a host may change display modes when the display system switches from a power source such as a battery to AC power, or when the source of the display media switches to a lower or higher resolution format, or a combination of these or other conditions or events may be considered as a basis for changing a display or data transfer mode.

It is also possible for a system to communicate data using one mode in one direction and another mode in another direction. For example, a Type IV interface mode could be used to transfer data to a display at a high rate, while a Type I or Type U mode is used when transferring data to a host device from peripheral devices such as a keyboard or a pointing device.

C. Physical Interface Structure

Figure 4:
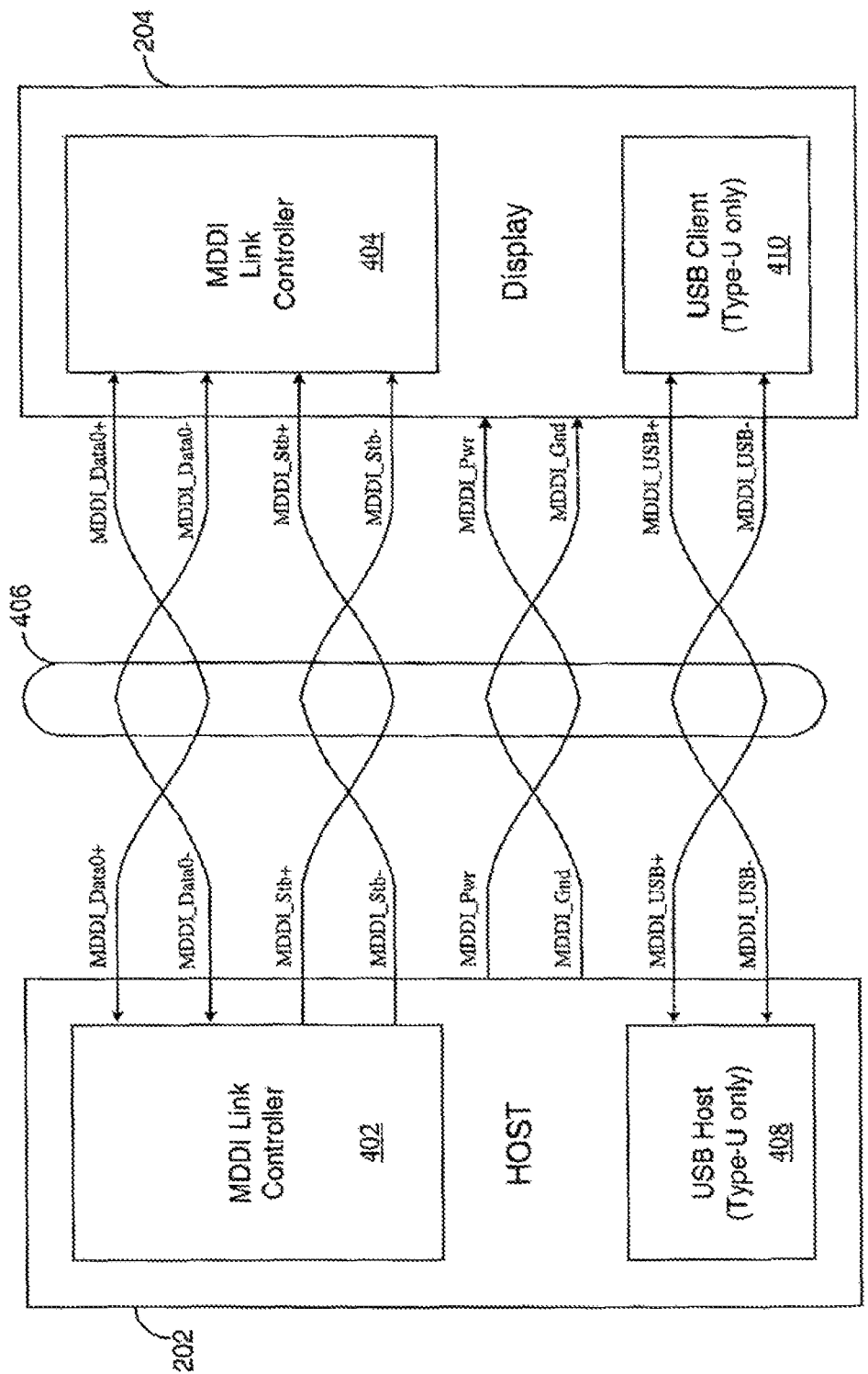
FIG. 4 illustrates the use of an MDDI link controller and the types of signals passed between a host and a client over the physical data link conductors for Type I and Type U interfaces.
Figure 5:
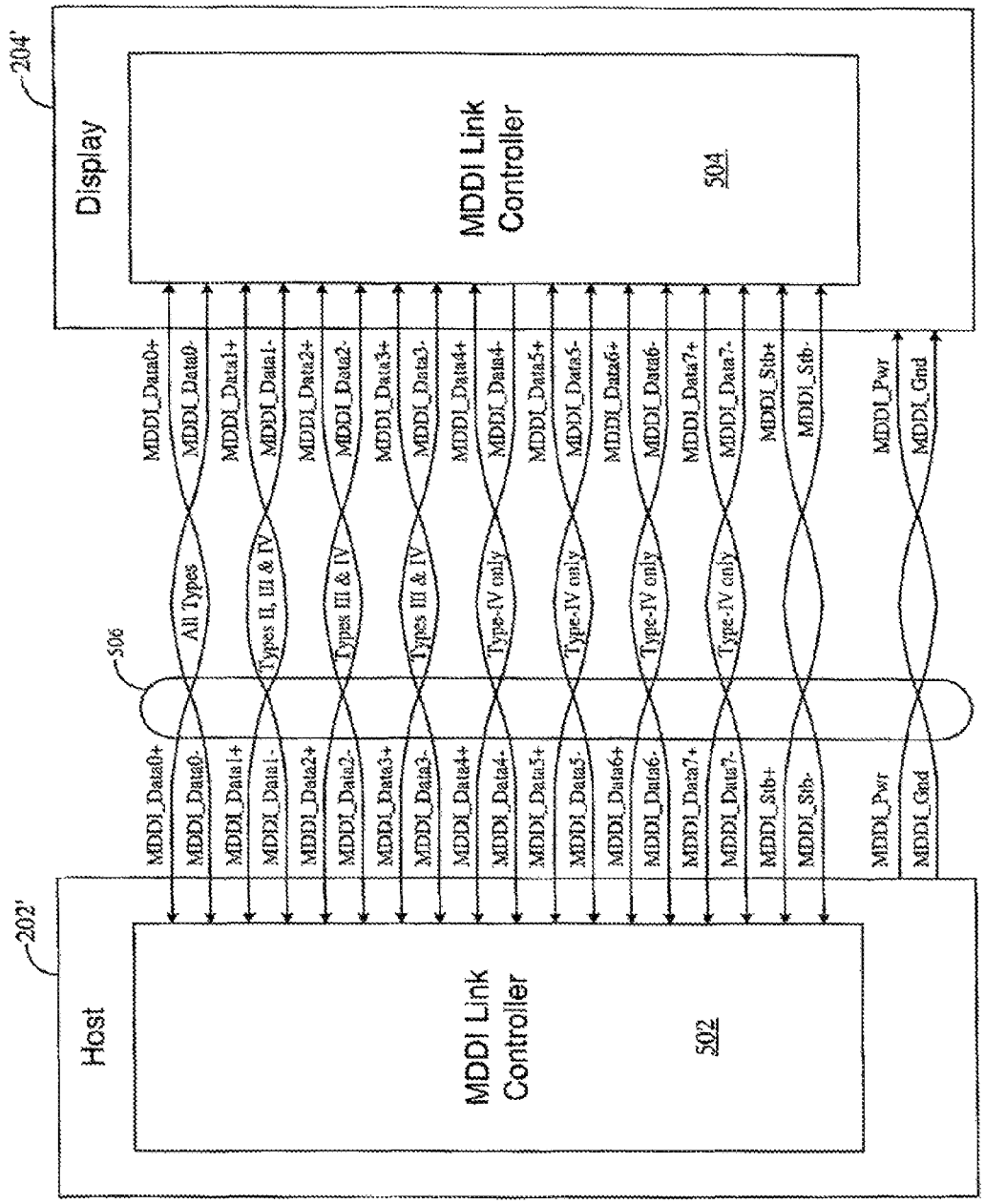
FIG. 5 illustrates the use of a MDDI link controller and the types of signals passed between a host and a client over the physical data link conductors for Types II, III, and IV interfaces.

The general disposition of a device or link controller for establishing communications between host and client devices is shown in FIGS. 4 and 5. In FIGS. 4 and 5, a MDDI link controller 402 and 502 is shown installed in a host device 202 and a MDDI link controller 404 and 504 is shown installed in a client device 204. As before, host 202 is connected to a client 204 using a bi-directional communication channel 406 comprising a series of conductors. As discussed below, both the host and client link controllers can be manufactured as an integrated circuit using a single circuit design that can be set, adjusted or programmed to respond as either a host controller (driver) or a client controller (receiver). This provides for lower costs due to larger scale manufacturing of a single circuit device.

In FIG. 4, a USB host device 408 and a USB client device 410 are also shown for use in implementing Type U interface versions of the MDDI. Circuits and devices for implementing such functions are well known in the art, and are not described in further detail herein.

In FIG. 5, a MDDI link controller 502 is shown installed in a host device 202' and a MDDI link controller 504 is shown installed in a client device 204'. As before, host 202' is connected to a client 204' using a bi-directional communication channel 506 comprising a series of conductors. As discussed before, both the host and client link controllers can be manufactured using a using a single circuit design.

Signals passed between a host and a client, such as a display device, over the MDDI link, or the physical conductors used, are also illustrated in FIGS. 4 and 5. As seen in FIGS. 4 and 5, the primary path or mechanism for transferring data through the MDDI uses data signals labeled as MDDI_Data0+/− and MDDI_Stb+/−. Each of these are low voltage data signals that are transferred over a differential pair of wires in a cable. There is only one transition on either the MDDI_Data0 pair or the MDDI_Stb pair for each bit sent over the interface. This is a voltage based transfer mechanism not current based, so static current consumption is near zero. The host drives the MDDI_Stb signals to the client display.

While data can flow in both the forward and reverse directions over the MDDI_Data pairs, that is it is a bidirectional transfer path, the host is the master or controller of the data link. The MDDI_Data0 and MDDI_Stb signal paths are operated in a differential mode to maximize noise immunity. The data rate for signals on these lines is determined by the rate of the clock sent by the host, and is variable over a range of about 1 kbps up to 400 Mbps or more.

The Type-II interface contains one additional data pair or conductors or paths beyond that of the Type-I, referred to as MDDI_Data1+/−. The Type-III interface contains two additional data pairs or signal paths beyond that of the Type-II interface referred to as MDDI_Data2+/−, and MDDI_Data3+/−. The Type-IV interface contains four more data pairs or signal paths beyond that of the Type-III interface referred to as: MDDI_data4+/−, MDDI_Data5+/−, MDDI_Data6+/−, and MDDI_Data7+/−, respectively. In each of the above interface configurations, a host sends power to the client or display using the wire-pair or signals designated as MDDI_Pwr and MDDI_Gnd.

A type of transfer generally only made available for the Type-U configuration is the MDDI USB connection or signal path. The MDDI USB connection comprises a secondary path for communication between a host and a client display. In certain applications it may be more advantageous to send certain information at a relatively low data rate between a host and client. Using the USB transfer link allows devices without an MDDI Link Controller that have a USB host or limited host capability to communicate with an MDDI-compatible client or display equipped with the Type-U interface. Examples of information that can be usefully transferred over a USB interface to a display are: static bitmaps, digital audio streams, pointing device data, keyboard data, and control and status information. All functionality supported through the USB interface can also be implemented using the primary MDDI high-speed serial data path. While the data (see packets below) defined above may be sent over a USB type interface, the requirements for chaining data in the form of packets back-to-back do not apply to such a USB interface, neither does use of packets supporting MDDI Type handoff.

A summary of the signals passed between the host and client (display) over the MDDI link are illustrated in Table I, below, in accordance with the interface type.

Cabling generally used to implement the above structure and operation is nominally on the order of 1.5 meters in length and contains three twisted pairs of conductors, each in turn being multi-strand 30 AWG wire. A foil shield covering is wrapped or otherwise formed above the three twisted pairs, as an additional drain wire. The twisted pairs and shield drain conductor terminate in the display connector with the shield connected to the shield for the display (client), and there is an insulating layer, covering the entire cable, as would be well known in the art. The wires are paired as: MDDI_Gnd with MDDI_Pwr; MDDI_Stb+ with MDDI_Stb−; MDDI_Data0+ with MDDI_Data0−; MDDI_Data1+ with MDDI_Data1−; and so forth. The nominal cable diameter is on the order of 3.0 mm with a nominal impedance of 85 ohms±10%, and DC resistance nominally of 110 ohms per 1000 feet. The signal propagation velocity should be nominally 0.66 c, with a maximum delay through the cable less than around 8.0 nsec.

D. Data Types and Rates

To achieve a useful interface for a full range of user experiences and applications, the Mobile Digital Data Interface (MDDI) provides support for a variety of displays and display information, audio transducers, keyboards, pointing devices, and many other input devices that might be integrated into or working in concert with a mobile display device, along with control information, and combinations thereof. The MDD interface is designed to be able to accommodate a variety of potential types of streams of data traversing between the host and client in either the forward or reverse link directions using a minimum number of cables or conductors. Both isochronous streams and asynchronous stream (updates) are supported. Many combinations of data types are possible as long as the aggregate data rate is less than or equal to the maximum desired MDDI link rate. These could include, but are not limited to those items listed in Tables II and III below.

TABLE II

Transferring from Host to Client

| | | |
|---|---|---|
| isochronous video data | 720 × 480, 12 bit, 30 f/s | ~124.5 Mbps |
| isochronous stereo audio data | 44.1 kHz, 16 bit, stereo | ~1.4 Mbps |
| asynchronous graphics data | 800 × 600, 12 bit, 10 f/s, stereo | ~115.2 Mbps |
| asynchronous control | minimum | <<1.0 Mbps |

TABLE I

| Type-I | Type-II | Type-III | Type-IV | Type-U |
|---|---|---|---|---|
| MDDI_Pwr/Gnd | MDDI_Pwr/Gnd | MDDI_Pwr/Gnd | MDDI_Pwr/Gnd | MDDI_Pwr/Gnd |
| MDDI_Stb+/− | MDDI_Stb+/− | MDDI_Stb+/− | MDDI_Stb+/− | MDDI_Stb+/− |
| MDDI_Data0+/− | MDDI_Data0+/− | MDDI_Data0+/− | MDDI_Data0+/− | MDDI_Data0+/− |
| | MDDI_Data1+/− | MDDI_Data1+/− | MDDI_Data1+/− | MDDI_USB+/− |
| | | MDDI_Data2+/− | MDDI_Data2+/− | |
| | | MDDI_Data3+/− | MDDI_Data3+/− | |
| | | | MDDI_Data4+/− | |
| | | | MDDI_Data5+/− | |
| | | | MDDI_Data6+/− | |
| | | | MDDI_Data7+/− | |

TABLE III

Transferring from Client to Host

| | | |
|---|---|---|
| isochronous voice data | 8 kHz, 8 bit | <<1.0 Mbps |
| isochronous video data | 640 × 480, 12 bit, 24 f/s | ~88.5 Mbps |
| asynchronous status, user input, etc. | minimum | <<1.0 Mbps |

The interface is not fixed but extensible so that it can support the transfer of a variety of information "types" which includes user-defined data, for future system flexibility. Specific examples of data to be accommodated are: full-motion video, either in the form of full or partial screen bitmap fields or compressed video; static bitmaps at low rates to conserve power and reduce implementation costs; PCM or compressed audio data at a variety of resolutions or rates; pointing device position and selection, and user-definable data for capabilities yet to be defined. Such data may also be transferred along with control or status information to detect device capability or set operating parameters.

The present invention advances the art for use in data transfers that include, but are not limited to, watching a movie (video display and audio), using a personal computer with limited personal viewing (graphics display, sometimes combined with video and audio), playing a video game on a PC, console, or personal device (motion graphics display, or synthetic video and audio), "surfing" the Internet, using devices in the form of a video phone (bi-directional low-rate video and audio), a camera for still digital pictures, or a camcorder for capturing digital video images, and for productivity enhancement or entertainment use with cell phones, smart phones, or PDAs.

The mobile data interface as discussed below is presented in terms of providing large amounts of A-V type data over a communication or transfer link which is generally configured as a wire-line or cable type link. However, it will be readily apparent that the signal structure, protocols, timing, or transfer mechanism could be adjusted to provide a link in the form of an optical or wireless media, if it can sustain the desired level of transfer.

The MDD interface signals use a concept known as the Common Frame (CF) for the basic signal protocol or structure. The idea behind using of a Common Frame is to provide a synchronization pulse for simultaneous isochronous data streams. A display device can use this common frame rate as a time reference. A low CF rate increases channel efficiency by decreasing overhead to transmit the sub-frame header. On the other hand, a high CF rate decreases the latency, and allows a smaller elastic data buffer for audio samples. The CF rate of the present inventive interface is dynamically programmable and may be set at one of many values that are appropriate for the isochronous streams used in a particular application. That is, the CF value is selected to best suit the given display device and host configuration, as desired.

The number of bytes generally required per common frame, which is adjustable or programmable, for isochronous data steams that are most likely to be used with an application, such as for a head-mounted micro-display are shown in Table IV.

TABLE IV

| Common Frame Rate (CFR) = 1200 Hz | | | | | | |
|---|---|---|---|---|---|---|
| | X | Y | Bit | Frame Rate | Channel | Rate (Mbps) | Byte/CFR |
| DVD Movie | 720 | 480 | 12 | 30 | 1 | 124.4 | 12960 |
| Stereo Graphics | 800 | 600 | 12 | 10 | 2 | 115.2 | 12000 |
| Camcorder | 640 | 480 | 12 | 24 | 1 | 88.5 | 9216 |
| CD Audio | 1 | 1 | 16 | 44100 | 2 | 1.4 | 147 |
| Voice | 1 | 1 | 8 | 8000 | 1 | 0.1 | 6.7 |

Fractional counts of bytes per common frame are easily obtained using a simple programmable M/N counter structure. For example, a count of 26-2/3 bytes per CF is implemented by transferring 2 frames of 27 bytes each followed by one frame of 26 bytes. A smaller CF rate may be selected to produce an integer number of bytes per CF. However, generally speaking to implement a simple M/N counter in hardware should require less area within an integrated circuit chip used to implement part or all of the invention than the area needed for a larger audio sample FIFO buffer.

An exemplary application that illustrates the impact of different data transfer rates and data types is a Karaoke system. For Karaoke, a system user sings along with a music video program. Lyrics of the song are displayed at the bottom of a screen so the user knows the words to be sung, and roughly the timing of the song. This application requires a video display with infrequent graphics updates, and mixing of the user's voice with a stereo audio stream.

If one assumes a common frame rate of 300 Hz, then each CF will consist of: 92,160 bytes of video content and 588 bytes of audio content (based on 147 16-bit samples, in stereo) over the forward link to the display device, and an average of 29.67 (26-2/3) bytes of voice are sent back from a microphone to the mobile Karaoke machine. Asynchronous packets are sent between the host and the display. This includes at most 768 bytes of graphics data (quarter-screen height), and less than about 200 bytes (several) bytes for miscellaneous control and status commands.

Table V, shows how data is allocated within a Common Frame for the Karaoke example. The total rate being used is selected to be about 225 Mbps. A slightly higher rate of 226 Mbps allows about another 400 bytes of data per sub-frame to be transferred which allows the use of occasional control and status messages.

TABLE V

| Element Rate | Bytes/CF |
|---|---|
| Music Video at 640 × 480 pixels and 30 fps | 92160 |
| Lyric Text at 640 × 120 pixels and 1 fps | 768 |
| CD Audio at 44,100 sps, stereo, 16-bit | 588 |
| Voice at 8,000 sps, mono, 8-bit | 26.67 |
| Sub-frame Header | 19 |
| Reverse Link Overhead | 26.67 + 2 * 9 + 20 |
| Total Bytes/CF | 93626.33 |
| Total Rate (Mbps) | 224.7032 |

E. Link Layer

Data transferred using the MDD interface high-speed serial data signals consists of a stream of time-multiplexed packets that are linked one after the other. Even when a transmitting device has no data to send, a MDDI link controller automatically sends filler packets, thus, maintaining a stream of packets. The use of a simple packet structure ensures reliable isochronous timing for video and audio signals or data streams.

Groups of packets are contained within signal elements or structures referred to as sub-frames, and groups of sub-frames are contained within signal elements or structures referred to as a media-frame. A sub-frame contains one or more packets, depending on their respective size and data transfer uses, and a media-frame must contain one more sub-frames. The largest sub-frame provided by the protocol employed by the present invention is on the order of $2^{32}-1$ or 4,294,967,295 bytes, and the largest media-frame size then becomes on the order of $2^{16}-1$ or 65,535 sub-frames.

A special header packet that contains a unique identifier that appears at the beginning of each sub-frame, as is discussed below. That identifier is also used for acquiring the frame timing at the client device when communication between the host and display is initiated. Link timing acquisition is discussed in more detail below.

Typically, a display screen is updated once per media-frame when full-motion video is being displayed. The display frame rate is the same as the media-frame rate. The link protocol supports full-motion video over an entire display, or just a small region of full-motion video content surrounded by a static image, depending on the desired application. In some low-power mobile applications, such as viewing web pages or email, the display screen may only need to be updated occasionally. In those situations, it is advantageous to transmit a single sub-frame and then shut down the link to minimize power consumption. The interface also supports effects such as stereo vision, and handles graphics primitives.

Sub-frames exist to enable the transmission of high-priority packets on a periodic basis. This allows simultaneous isochronous streams to co-exist with a minimal amount of data buffering. This is one advantage the present invention provides to the display process, allowing multiple data streams (high speed communication of video, voice, control, status, pointing device, etc.) to essentially share a common channel. It transfers information using relatively few signals. It also enables display-technology-specific actions to exist, such as horizontal sync pulses and blanking intervals for a CRT monitor.

F. Link Controller

The MDDI link controller shown in FIGS. 4 and 5 is manufactured or assembled to be a completely digital implementation with the exception of the differential line receivers which are used to receive MDDI data and strobe signals. However, even the differential line drivers and receivers can be implemented in the same digital integrated circuits with the link controller. No analog functions or phase lock loops (PLLs) are required to implement the hardware for the link controller. The host and display link controllers contain very similar functions, with the exception of the display interface which contains a state machine for link synchronization.

Therefore, the present invention allows the practical advantage of being able to create a single controller design or circuit that can be configured as either a host or client, which can reduce manufacturing costs for the link controllers, as a whole.

IV. Interface Link Protocol

A. Frame structure

Figures 6, 7:
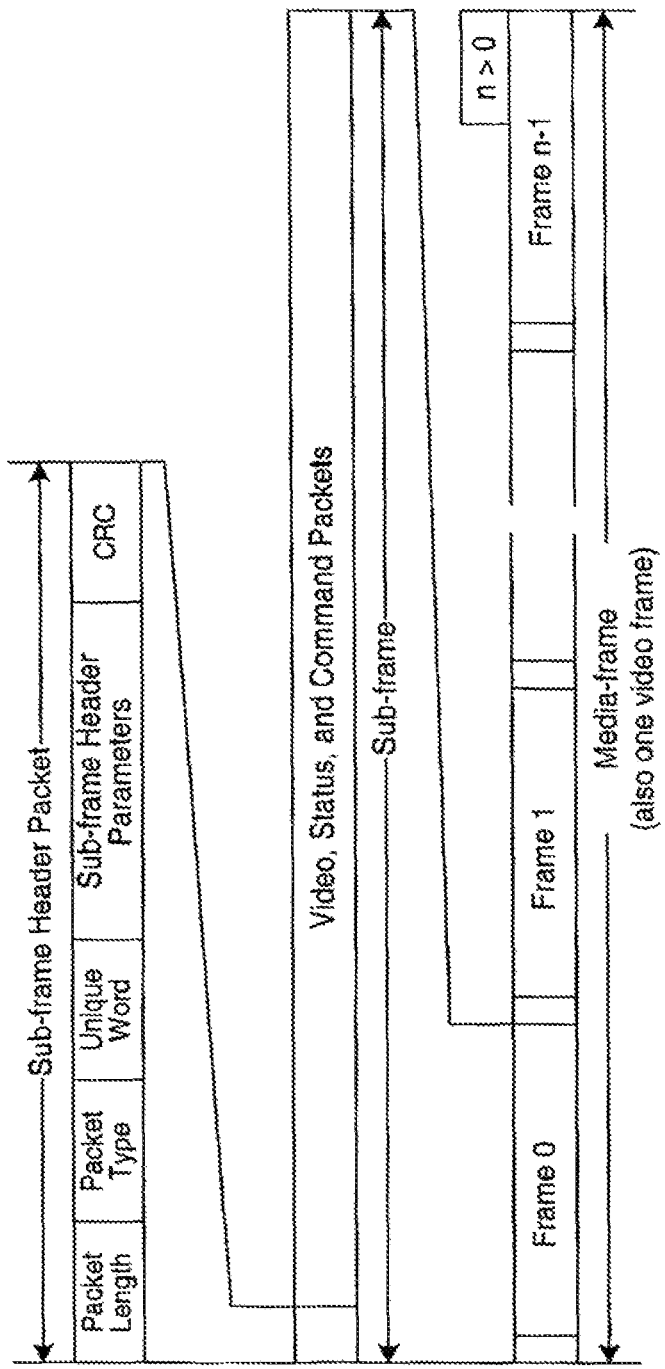
FIG. 6 illustrates the structure of frames and sub-frames used to implement the interface protocol.
FIG. 7 illustrates the general structure of packets used to implement the interface protocol.

The signal protocol or frame structure used to implement the forward link communication for packet transfer is illustrated in FIG. 6. As shown in FIG. 6, information or digital data is grouped into elements known as packets. Multiple packets are in turn grouped together to form what are referred to as a "sub-frame," and multiple sub-frames are in turn grouped together to form a "media" frame. To control the formation of frames and transfer of sub-frames, each sub-frame begins with a specially predefined packet referred to as a Sub-frame Header Packet (SHP).

The host device selects the data rate to be used for a given transfer. This rate can be changed dynamically by the host device based on both the maximum transfer capability of the host, or the data being retrieved from a source by the host, and the maximum capability of the display, or other device the data is being transferred to.

A recipient client device designed for, or capable of, working with the MDDI or inventive signal protocol is able to be queried by the host to determine the maximum, or current maximum, data transfer rate it can use, or a default slower minimum rate may be used, as well as useable data types and features supported. This information could be transferred using a Display Capability Packet (DCP), as discussed further below. The client display device is capable of transferring data or communicating with other devices using the interface at a pre-selected minimum data rate or within a minimum data rate range, and the host will perform a query using a data rate within this range to determine the full capabilities of the client devices.

Other status information defining the nature of the bitmap and video frame-rate capabilities of the display can be transferred in a status packet to the host so that the host can configure the interface to be as efficient or optimal as practical, or desired within any system constraints.

The host sends filler packets when there are no (more) data packets to be transferred in the present sub-frame, or when the host cannot transfer at a rate sufficient to keep pace with the data transmission rate chosen for the forward link. Since each sub-frame begins with a sub-frame header packet, the end of the previous sub-frame contains a packet (most likely a filler packet) the exactly fills the previous sub-frame. In the case of a lack of room for data bearing packets per se, a filler packet will most likely be the last packet in a sub-frame, or at the end of a next previous sub-frame and before a sub-frame header packet. It is the task of the control operations in a host device to ensure that there is sufficient space remaining in a sub-frame for each packet to be transmitted within that sub-frame. At the same time, once a host device initiates the sending of a data packet, the host must be able to successfully complete a packet of that size within a frame without incurring a data under-run condition.

In one aspect of embodiments of the invention, sub-frame transmission has two modes. One mode is a periodic sub-frame mode used to transmit live video and audio streams. In this mode, the Sub-frame length is defined as being non-zero. The second mode is an asynchronous or non-periodic mode in which frames are used to provide bitmap data to a display device only when new information is available. This mode is defined by setting the sub-frame length to zero in the Sub-frame Header Packet. When using the periodic mode, sub-frame packet reception may commence when the display has synchronized to the forward link frame structure. This corresponds to the "in sync" states defined according to the state diagram discussed below with respect to FIG. 49. In the asynchronous non-periodic sub-frame mode, reception commences after the first Sub-frame Header packet is received.

B. Overall Packet Structure

The format or structure of packets used to formulate the signaling protocol implemented by the present invention are presented below, keeping in mind that the interface is extensible and additional packet structures can be added as desired. The packets are labeled as, or divided into, different "packet types" in terms of their function in the interface, that is, commands or data they transfer. Therefore, each packet type denotes a pre-defined packet structure for a given packet which is used in manipulating the packets and data being transferred. As will be readily apparent, the packets may have pre-selected lengths or have variable or dynamically changeable lengths depending on their respective functions. The bytes or byte values used in the various packets are configured as multi-bit (8- or 16-bit) unsigned integers. A summary of the packets being employed along with their "type" designations, listed in type order, is shown in Table VI The direction in which transfer of a packet is considered valid is also noted, along with whether or not they are used for a Type-U interface.

TABLE VI

| Packet Name | Packet Type | Valid in Direction | | |
|---|---|---|---|---|
| | | Forward | Reverse | Type-U |
| Sub-frame Header Packet | 255 | x | | x |
| Filler Packet | 0 | x | x | |
| Video Stream Packet | 1 | x | x | x |

TABLE VI-continued

| Packet Name | Packet Type | Valid in Direction | | |
|---|---|---|---|---|
| | | Forward | Reverse | Type-U |
| Audio Stream Packet | 2 | x | x | x |
| Reserved Stream Packets | 3-55 | | | |
| User-Defined Stream Packets | 56-63 | x | x | x |
| Color Map Packet | 64 | x | x | x |
| Reverse Link Encapsulation Packet | 65 | x | | |
| Display Capability Packet | 66 | | x | x |
| Keyboard Data Packet | 67 | x | x | x |
| Pointing Device Data Packet | 68 | x | x | x |
| Link Shutdown Packet | 69 | x | | |
| Display Request and Status Packet | 70 | | x | x |
| Bit Block Transfer Packet | 71 | x | | x |
| Bitmap Area Fill Packet | 72 | x | | x |
| Bitmap Pattern Fill Packet | 73 | x | | x |
| Communication Link Data Channel Packet | 74 | x | x | x |
| Interface Type Handoff Request Packet | 75 | x | | |
| Interface Type Acknowledge Packet | 76 | | x | |
| Perform Type Handoff Packet | 77 | x | | |
| Forward Audio Channel Enable Packet | 78 | x | | x |
| Reverse Audio Sample Rate Packet | 79 | x | | x |
| Digital Content Protection Overhead Packet | 80 | x | x | x |
| Transparent Color Enable Packet | 81 | x | | x |
| Round Trip Delay Measurement Packet | 82 | x | | |
| Forward Link Skew Calibration Packet | 83 | x | | |

Packets have a common basic structure or overall set of minimum fields comprising a Packet Length field, a Packet Type field, Data Bytes field(s), and a CRC field, which is illustrated in FIG. 7. As shown in FIG. 7, the Packet Length field contains information, in the form of a multi-bit or -byte value, that specifies the total number of bits in the packet, or its length between the packet length field and the CRC field. In a preferred embodiment of the present example, the packet length field contains a 16-bit or 2-byte wide, unsigned integer, that specifies the packet length. The Packet Type field is another multi-bit field which designates the type of information that is contained within the packet. In the exemplary embodiment of the present example, this is an 8-bit or 1-byte wide value, in the form of an 8-bit unsigned integer, and specifies such data types as display capabilities, handoff, video or audio streams, status, and so forth.

A third field is the Data Bytes which contains the bits or data being transferred or sent between the host and client devices as part of that packet. The format of the data is defined specifically for each packet type according to the specific type of data being transferred, and may be separated into a series of additional fields, each with its own format requirements. That is, each packet type will have a defined format for this portion or field. The last field is the CRC field which contains the results of a 16-bit cyclic redundancy check calculated over the Data Bytes, Packet Type, and Packet Length fields, which is used to confirm the integrity of the information in the packet. In other words, calculated over the entire packet except for the CRC field itself. The client generally keeps a total count of the CRC errors detected, and reports this count back to the host in the Display Request and Status Packet (see further below).

During transfer of the packets, fields are transmitted starting with the Least Significant Bit (LSB) first and ending with the Most Significant Bit (MSB) transmitted last. Parameters that are more than one byte in length are transmitted using the least significant byte first, which results in the same bit transmission pattern being used for a parameter greater than 8 bits in length, as is used for a shorter parameter where the LSB is transmitted first. The data on the MDDI_Data0 signal path is aligned with bit 0 of bytes transmitted on the interface in any of the modes, Type-I, Type-II, Type-III, or Type-IV.

When manipulating data for displays, the data for arrays of pixels are transmitted by rows first, then columns, as is traditionally done in the electronics arts. In other words, all pixels that appear in the same row in a bit map are transmitted in order with the left-most pixel transmitted first and the right-most pixel transmitted last. After the right-most pixel of a row is transmitted then the next pixel in the sequence is the left-most pixel of the following row. Rows of pixels are generally transmitted in order from top to bottom for most displays, although other configurations can be accommodated as needed. Furthermore, in handling bitmaps, the conventional approach, which is followed here, is to define a reference point by labeling the upper-left corner of a bitmap as location or offset "0,0." The X and Y coordinates used to define or determine a position in the bitmap increase in value as one approaches the right and bottom of the bitmap, respectively. The first row and first column start with an index value of zero.

C. Packet Definitions

1. Sub-frame Header Packet

The sub-frame header packet is the first packet of every sub-frame, and has a basic structure as illustrated in FIG. 8. As can be seen in FIG. 8, this type of packet is structured to have Packet Length, Packet Type, Unique Word, Sub-Frame Length, Protocol Version, Sub-Frame Count, and Media-frame Count fields, generally in that order. This type of packet is generally identified as a Type 255 (0xff hexadecimal) packet and uses a pre-selected fixed length of 17 bytes.

While the Packet Type field uses a 1 byte value, the Unique Word field uses a 3 byte value. The 4-byte combination of these two fields together forms a 32-bit unique word with good autocorrelation. The actual unique word is 0x005a3bff where the lower 8 bits are transmitted first as the Packet Type, and the most significant 24 bits are transmitted afterward.

The Sub-frame Length field contains 4 bytes of information that specifies the number of bytes per sub-frame. The length of this field may be set equal to zero to indicate that only one sub-frame will be transmitted by the host before the link is shut down into an idle state. The value in this field can be dynamically changed "on-the-fly" when transitioning from one sub-frame to the next. This capability is useful in order to make minor timing adjustments in the sync pulses for accommodating isochronous data streams. If the CRC of the Sub-frame Header packet is not valid then the link controller should use the Sub-frame Length of the previous known-good Sub-frame Header packet to estimate the length of the current sub-frame.

The Protocol Version field contains 2 bytes that specify the protocol version used by the host. The Protocol Version field is set to '0' to specify the first or current version of the protocol as being used. This value will change over time as new versions are created. The Sub-frame Count field contains 2 bytes that specify a sequence number that indicates the number of sub-frames that have been transmitted since the beginning of the media-frame. The first sub-frame of the media-frame has a Sub-frame Count of zero. The last sub-frame of the media-frame has a value of n−1, where n is the number of sub-frames per media-frame. Note that if the Sub-frame Length is set to zero (indicating a non-periodic sub-frame) then the Sub-frame count must also be set to zero.

The Media-frame Count field contains 3 bytes that specify a sequence number that indicates the number of media-frames that have been transmitted since the beginning of the present media item or data being transferred. The first media-frame of a media item has a Media-frame Count of zero. The Media-frame Count increments just prior to the first sub-frame of each media-frame and wraps back to zero after the maximum Media-frame Count (media-frame number $2^{24}-1=16,777,215$) is used. The Media-frame Count value may be reset generally at any time by the Host to suit the needs of an end application.

2. Filler Packet

A filler packet is a packet that is transferred to, or from, a client device when no other information is available to be sent on either the forward or reverse link. It is recommended that filler packets have a minimum length in order to allow maximum flexibility in sending other packets when required. At the very end of a sub-frame or a reverse link encapsulation packet (see below), a link controller sets the size of the filler packet to fill the remaining space to maintain packet integrity.

The format and contents of a Filler Packet are shown in FIG. 9. As shown in FIG. 9, this type of packet is structured to have Packet Length, Packet Type, Filler Bytes, and CRC fields. This type of packet is generally identified as a Type 0, which is indicated in the 1 byte type field. The bits or bytes in the Filler Bytes field comprise a variable number of all zero bit values to allow the filler packet to be the desired length. The smallest filler packet contains no bytes in this field. That is, the packet consists of only the packet length, packet type, and CRC, and uses a pre-selected fixed length of 3 bytes.

3. Video Stream Packet

Figures 10, 11:
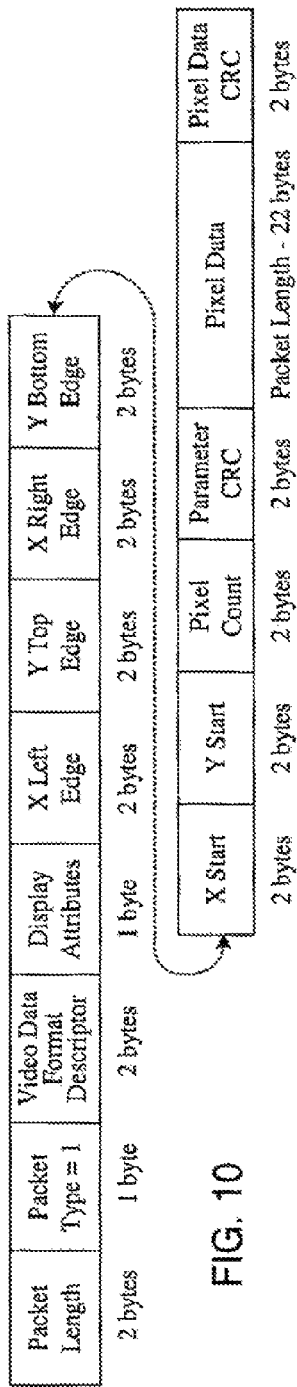
FIG. 10 illustrates the format of a Video Stream Packet.
FIG. 11 illustrates the format and contents for the Video Data Format Descriptor of FIG. 10.

Video Stream Packets carry video data to update typically rectangular regions of a display device. The size of this region may be as small as a single pixel or as large as the entire display. There may be an almost unlimited number of streams displayed simultaneously, limited by system resources, because all context required to display a stream is contained within the Video Stream Packet. The format of the video stream packet (Video Data Format Descriptor) is shown in FIG. 10. As seen in FIG. 10, this type of packet is structured to have Packet Length (2 bytes), Packet Type, Video Data Format Descriptor, Display Attributes, X Left Edge, Y Top Edge, X Right Edge, Y Bottom Edge, X and Y Start, Pixel Count, Parameter CRC, Pixel Data, and CRC fields. This type of packet is generally identified as a Type 1, which is indicated in the 1 byte type field.

Figure 12:
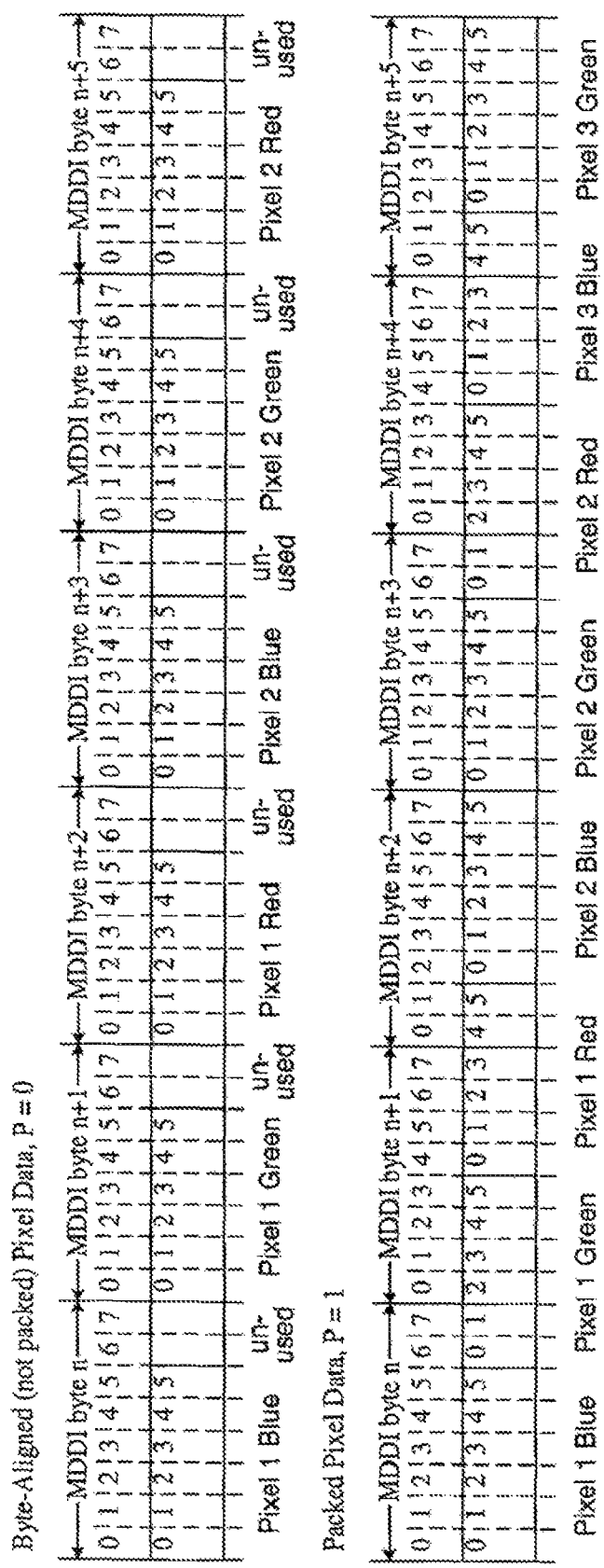
FIG. 12 illustrates the use of packed and unpacked formats for data.

The common frame concept discussed above is an effective way to minimize the audio buffer size and decrease latency. However, for video data it may be necessary to spread the pixels of one video frame across multiple Video Stream Packets within a media-frame. It is also very likely that the pixels in a single Video Stream Packet will not exactly correspond to a perfect rectangular window on the display. For the exemplary video frame rate of 30 frames per second, there are 300 sub-frames per second, which results in 10 sub-frames per media-frame. If there are 480 rows of pixels in each frame, each Video Stream Packet in each sub-frame will contain 48 rows of pixels. In other situations, the Video Stream Packet might not contain an integer number of rows of pixels. This is true for other video frame sizes where the number of sub-frames per media-frame does not divide evenly into the number of rows (also known as video lines) per video frame. Each Video Stream Packet must contain an integer number of pixels, even though it might not contain an integer number of rows of pixels. This is important if pixels are more than one byte each, or if they are in a packed format as shown in FIG. 12.

The format and contents employed for realizing the operation of the Video Data Descriptor field mentioned above, are shown in FIGS. 11a-11d. In FIGS. 11a-11d, the Video Data Format Descriptor field contains 2 bytes in the form of a 16-bit unsigned integer that specifies the format of each pixel in the Pixel Data in the present stream in the present packet. It is possible that different Video Stream packets may use different pixel data formats, that is, use a different value in the Video Data Format Descriptor, and similarly, any stream (region of the display) may change its data format on-the-fly. The Video Data Format Descriptor defines the pixel format for the present packet only which does not imply that a constant format will continue to be used for the lifetime of a particular video stream.

FIGS. 11a through 11d illustrate how the Video Data Format Descriptor is coded. As used in these figures, when bits [15:13] are equal to '000', as shown in FIG. 11a, then the video data consists of an array of monochrome pixels where the number of bits per pixel is defined by bits 3 through 0 of the Video Data Format Descriptor word. Bits 11 through 4 are set to zero in this situation. When bits [15:13] are instead equal to '001', as shown in FIG. 11b, then the video data consists of an array of color pixels that each specify a color through a color map. In this situation, bits 5 through 0 of the Video Data Format Descriptor word define the number of bits per pixel, and bits 11 through 6 are set equal to zero. When bits [15:13] are instead equal to '010', as shown in FIG. 11c, then the video data consists of an array of color pixels where the number of bits per pixel of red is defined by bits 11 through 8, the number of bits per pixel of green is defined by bits 7 through 4, and the number of bits per pixel of blue is defined by bits 3 through 0. In this situation, the total number of bits in each pixel is the sum of the number of bits used for red, green, and blue.

However, when bits [15:13] are instead equal to '011', as shown in FIG. 11d, then the video data consists of an array of video data in 4:2:2 format with luminance and chrominance information, where the number of bits per pixel of luminance (Y) is defined by bits 11 through 8, the number of bits of the Cr component is defined by bits 7 through 4, and the number of bits of the Cb component is defined by bits 3 through 0. The total number of bits in each pixel is the sum of the number of bits used for red, green, and blue. The Cr and Cb components are sent at half the rate as Y. In addition, the video samples in the Pixel Data portion of this packet are organized as follows: $Y_n, Cr_n, Cb_n, Y_{n+1}, Y_{n+2}, Cr_{n+2}, Cb_{n+2}, Y_{n+3}, \ldots$ where $Cr_n$ and $Cb_n$ are associated with $Y_n$ and $Y_{n+1}$, and $Cr_{n+2}$ and $Cb_{n+2}$ are associated with $Y_{n+2}$ and $Y_{n+3}$, and so on. If there are an odd number of pixels in a row (X Right Edge−X Left Edge+1) in the present stream then the Cb value corresponding to the last pixel in each row will be followed by the Y value of the first pixel of the next row.

For all four formats shown in the figures, bit 12, which is designated as "P", specifies whether or not the Pixel Data samples are packed, or byte-aligned pixel data. A value of '0' in this field indicates that each pixel and each color within each pixel in the Pixel Data field is byte-aligned with an MDDI interface byte boundary. A value of '1' indicates that each pixel and each color within each pixel in the Pixel Data is packed up against the previous pixel or color within a pixel leaving no unused bits.

The first pixel in the first video stream packet of a media frame for a particular display window will go into the upper left corner of the stream window defined by an X Left Edge and a Y Top Edge, and the next pixel received is placed in the next pixel location in the same row, and so on. In this first packet of a media frame the X start value will usually be equal to X Left Edge, and Y start value will usually be equal to Y Top Edge. In subsequent packets corresponding to the same screen window, the X and Y start values will usually be set to the pixel location in the screen window that would normally follow after the last pixel sent in the Video Stream Packet that was transmitted in the previous sub-frame.

4. Audio Stream Packet

The audio stream packets carry audio data to be played through the audio system of the display, or for a stand alone audio presentation device. Different audio data streams may be allocated for separate audio channels in a sound system, for example: left-front, right-front, center, left-rear, and right-rear, depending on the type of audio system being used. A full complement of audio channels is provided for headsets that contain enhanced spatial-acoustic signal processing. The format of Audio Stream Packets are illustrated in FIG. 13. As shown in FIG. 13, this type of packet is structured to have Packet Length, Packet Type, Audio Channel ID, Audio Sample Count, Bits Per Sample and Packing, Audio Sample Rate, Parameter CRC, Digital Audio Data, and Audio Data CRC fields. This type of packet is generally identified as a Type 2 packet.

Figure 14:
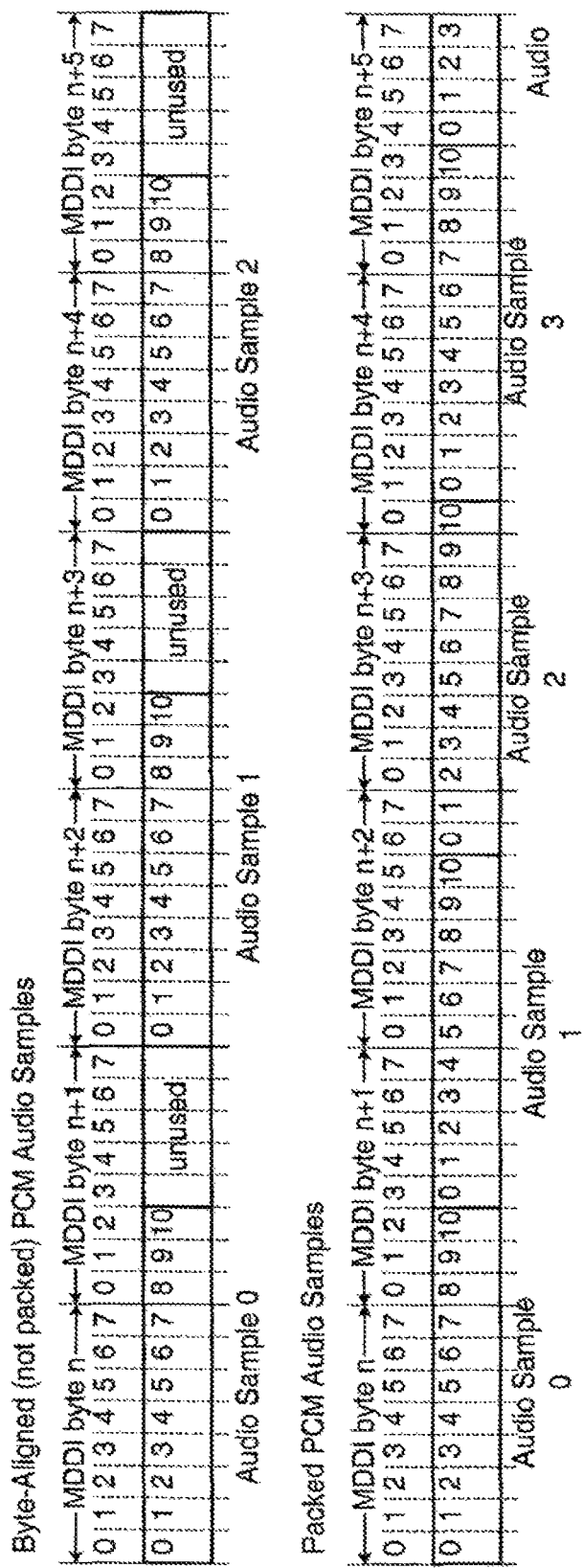
FIG. 14 illustrates the use of byte-aligned and packed PCM formats for data

The Bits Per Sample and Packing field contains 1 byte in the form of an 8-bit unsigned integer that specifies the packing format of audio data. The format generally employed is for Bits 4 through 0 to define the number of bits per PCM audio sample. Bit 5 then specifies whether or not the Digital Audio Data samples are packed. The difference between packed and byte-aligned audio samples is illustrated in FIG. 14. A value of '0' indicates that each PCM audio sample in the Digital Audio Data field is byte-aligned with an MDDI interface byte boundary, and a value of '1' indicates that each successive PCM audio sample is packed up against the previous audio sample. This bit is effective only when the value defined in bits 4 through 0 (the number of bits per PCM audio sample) is not a multiple of eight. Bits 7 through 6 are reserved for future use and are generally set at a value of zero.

5. Reserved Stream Packets

Packet types 3 through 55 are reserved for stream packets to be defined for use in future versions or variations of the packet protocols, as desired for various applications encountered. Again, this is part of making the MDD interface more flexible and useful in the face of ever changing technology and system designs as compared to other techniques.

6. User-Defined Stream Packets

Eight data stream types, known as Types 56 through 63, are reserved for use in proprietary applications that may be defined by equipment manufacturers for use with a MDDI link. These are known as User-defined Stream Packets. The video stream packets carry video data to update (or not) a rectangular region of the display. The definition of the stream parameters and data for these packet types is left to the specific equipment manufacturers seeking their use. The format of the user-defined stream packets is illustrated in FIG. 15. As shown in FIG. 15, this type of packet is structured to have Packet Length (2 bytes), Packet Type, Stream ID number, Stream Parameters, Parameter CRC, Stream Data, and Stream Data CRC fields.

7. Color Map Packets

The color map packets specify the contents of a color map look-up table used to present colors for a display. Some applications may require a color map that is larger than the amount of data that can be transmitted in a single packet. In these cases, multiple Color Map packets may be transferred, each with a different subset of the color map by using the offset and length fields described below. The format of the Color Map packet is illustrated in FIG. 16. As shown in FIG. 16, this type of packet is structured to have Packet Length, Packet Type, Color Map Data Size, Color Map Offset, Parameter CRC, Color Map Data, and Data CRC fields. This type of packet is generally identified as a Type 64 packet.

8. Reverse Link Encapsulation Packets

Figure 17:
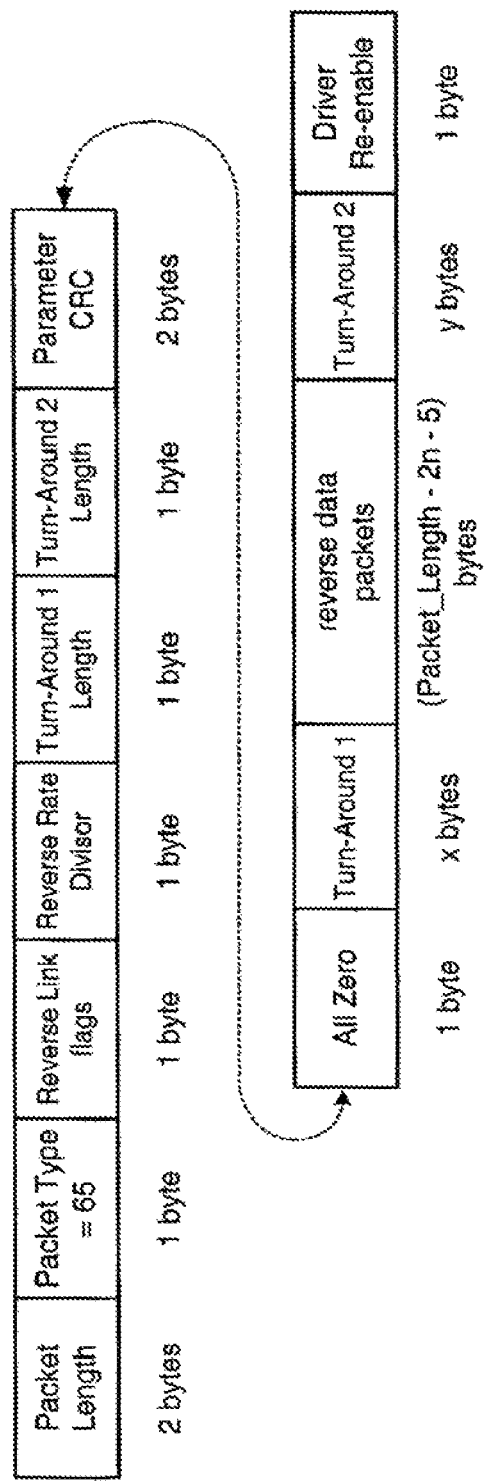
FIG. 17 illustrates the format of a Reverse Link Encapsulation Packet.

Data is transferred in the reverse direction using a Reverse Link Encapsulation Packet. A forward link packet is sent and the MDDI link operation (transfer direction) is changed or turned around in the middle of this packet so that packets can be sent in the reverse direction. The format of the Reverse Link Encapsulation packet is illustrated in FIG. 17. As shown in FIG. 17, this type of packet is structured to have Packet Length, Packet Type, Reverse Link Flags, Turn-Around Length, Parameter CRC, Turn-Around 1, Reverse Data packets, and Turn-Around 2. This type of packet is generally identified as a Type 65 packet.

The MDDI link controller behaves in a special manner while sending a Reverse Link Encapsulation Packet. The MDD interface has a strobe signal that is always driven by the host. The host behaves as if it were transmitting a zero for each bit of the Turn-Around and Reverse Data Packets portions of the Reverse Link Encapsulation packet. The host toggles MDDI_Strobe signal at each bit boundary during the two turn-around times and during the time allocated for reverse data packets. (This is the same behavior as if it were transmitting all-zero data.) The host disables its MDDI data signal line drivers during the time period specified by Turn-Around 1, and the client re-enables its line drivers during the Driver Re-enable field following the time period specified by Turn-Around 2 field. The display reads the Turn-Around Length parameter and drives the data signals toward the host immediately after the last bit in the Turn-Around 1 field. The display uses the Packet Length and Turn-Around Length parameters to know the length of time it has available to send packets to the host. The client may send filler packets or drive the data lines to a zero state when it has no data to send to the host. If the data lines are driven to zero, the host interprets this as a packet with a zero length (not a valid length) and the host does not accept any more packets from the client for the duration of the current Reverse Link Encapsulation Packet.

The display drives the MDDI data lines to the zero level for at least one reverse link clock period before the start of the Turn Around 2 field. This keeps the data lines in a deterministic state during the Turn Around 2 time period. If the client has no more packets to send, it may even disable the data lines after driving them to a zero level because the hibernation bias resistors (discussed elsewhere) keep the data lines at a zero level for the remainder of the Reverse Data Packets field.

The Reverse Link Request field of the Display Request and Status Packet may be used to inform the host of the number of bytes the display needs in the Reverse Link Encapsulation Packet to send data back to the host. The host attempts to grant the request by allocating at least that number of bytes in the Reverse Link Encapsulation Packet. The host may send more than one Reverse Link Encapsulation Packet in a sub-frame. The display may send a Display Request and Status Packet at almost any time, and the host will interpret the Reverse Link Request parameter as the total number of bytes requested in one sub-frame.

9. Display Capability Packets

Figure 18:
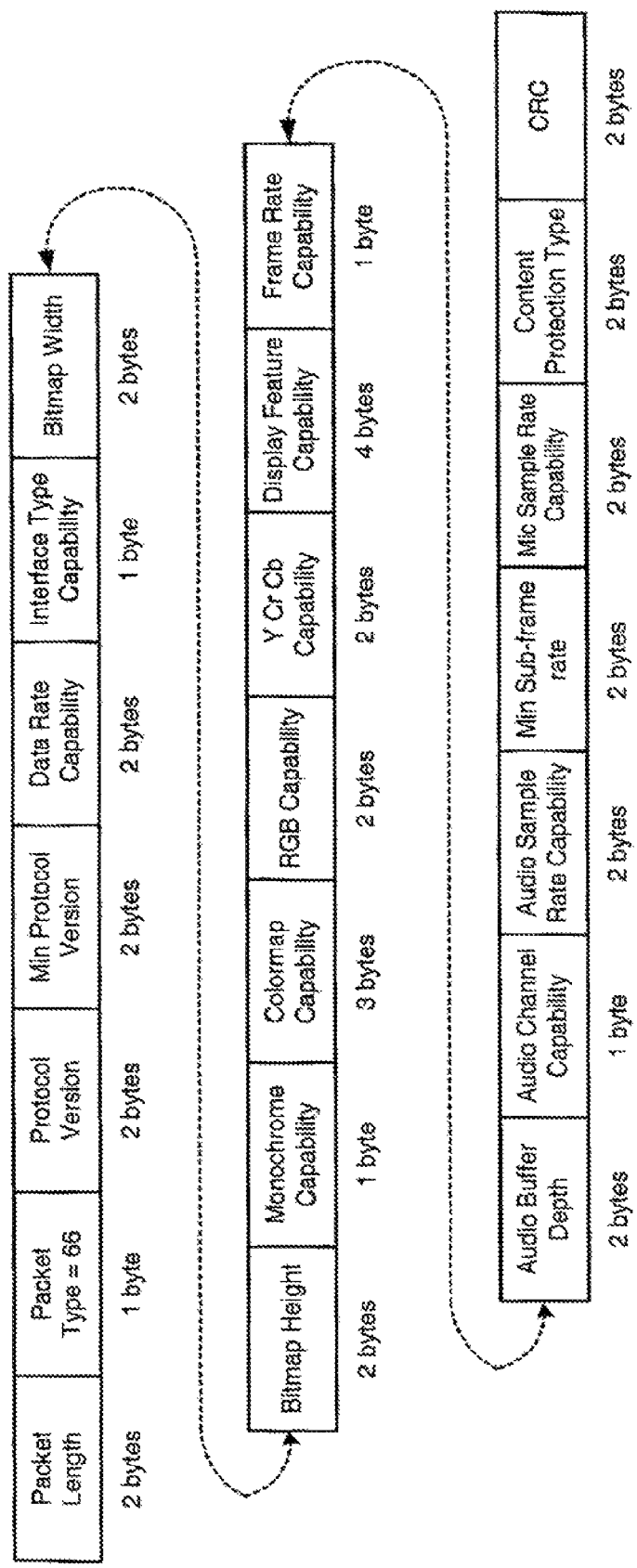
FIG. 18 illustrates the format of a Display Capability Packet.

A host needs to know the capability of the display (client) it is communicating with in order to configure the host-to-display link in a generally optimum or desired manner. It is recommended that a display send a Display Capability Packet to the host after forward link synchronization is acquired. The transmission of such a packet is considered required when requested by the host using the Reverse Link Flags in the Reverse Link Encapsulation Packet. The format of the Display Capability packet is illustrated in FIG. 18. As shown in FIG. 18, this type of packet is structured to have Packet Length, Packet Type, Protocol Version, Min Protocol Version, Bitmap Width, Bitmap Height, Monochrome Capability, Color Map Capability, RGB Capability, Y Cr Cb Capability, Display Feature Capability, Data Rate Capability, Frame Rate Capability, Audio Buffer Depth, Audio Stream Capability, Audio Rate Capability, Min Sub-frame rate, and CRC fields. This type of packet is generally identified as a Type 66 packet.

10. Keyboard Data Packets

A keyboard data packet is used to send keyboard data from the client device to the host. A wireless (or wired) keyboard may be used in conjunction with various displays or audio devices, including, but not limited to, a head mounted video display/audio presentation device. The Keyboard Data Packet relays keyboard data received from one of several known keyboard-like devices to the host. This packet can also be used on the forward link to send data to the keyboard. The format of a Keyboard Data Packet is shown in FIG. 19, and contains a variable number of bytes of information from or for a keyboard. As shown in FIG. 19, this type of packet is structured to have Packet Length, Packet Type, Keyboard Data, and CRC fields. This type of packet is generally identified as a Type 67 packet.

11. Pointing Device Data Packets

A pointing device data packet is used to send position information from a wireless mouse or other pointing device from the display to the host. Data can also be sent to the pointing device on the forward link using this packet. The format of a Pointing Device Data Packet is shown in FIG. 20, and contains a variable number of bytes of information from or for a pointing device. As shown in FIG. 20, this type of packet is structured to have Packet Length, Packet Type, Pointing Device Data, and CRC fields. This type of packet is generally identified as a Type 68 packet in the 1-byte type field.

12. Link Shutdown Packets

A Link Shutdown Packet is sent from the host to the client display to indicate that the MDDI data and strobe will be shut down and go into a low-power consumption "hibernation" state. This packet is useful to shut down the link and conserve power after static bitmaps are sent from a mobile communication device to the display, or when there is no further information to transfer from a host to a client for the time being. Normal operation is resumed when the host sends packets again. The first packet sent after hibernation is a sub-frame header packet. The format of a Display Status Packet is shown in FIG. 21. As shown in FIG. 21, this type of packet is structured to have Packet Length, Packet Type, and CRC fields. This type of packet is generally identified as a Type 69 packet in the 1-byte type field, and uses a pre-selected fixed length of 3 bytes.

In the low-power hibernation state the MDDI_Data driver is disabled into a high-impedance state, and the MDDI_Data signals are pulled to a logic zero state using a high-impedance bias network that can be overdriven by the display. The strobe signal used by the interface is set to a logic zero level in the hibernation state to minimize power consumption. Either the host or display may cause the MDDI link to "wake up" from the hibernation state as described elsewhere, which is a key advance for and advantage of the present invention.

13. Display Request and Status Packets

The host needs a small amount of information from the display so it can configure the host-to-display link in an optimum manner. It is recommended that the display send one Display Status Packet to the host each sub-frame. The display should send this packet as the first packet in the Reverse Link Encapsulation Packet to ensure that it is delivered reliably to the host. The format of a Display Status Packet is shown in FIG. 22. As shown in FIG. 22, this type of packet is structured to have Packet Length, Packet Type, Reverse Link Request, CRC Error Count, and CRC fields. This type of packet is generally identified as a Type 70 packet in the 1-byte type field, and uses a pre-selected fixed length of 8 bytes.

The Reverse Link Request field may be used to inform the host of the number of bytes the display needs in the Reverse Link Encapsulation Packet to send data back to the host. The host should attempt to grant the request by allocating at least that number of bytes in the Reverse Link Encapsulation Packet. The host may send more than one Reverse Link Encapsulation Packet in a sub-frame in order to accommodate data. The display may send a Display Request and Status Packet at any time and the host will interpret the Reverse Link Request parameter as the total number of bytes requested in one sub-frame. Additional details and specific examples of how reverse link data is sent back to the host are shown below.

14. Bit Block Transfer Packets

The Bit Block Transfer Packet provides a means to scroll regions of the display in any direction. Displays that have this capability will report the capability in bit 0 of the Display Feature Capability Indicators field of the Display Capability Packet. The format of a Bit Block Transfer Packet is shown in FIG. 23. As shown in FIG. 23, this type of packet is structured to have Packet Length, Packet Type, Upper Left X Value, Upper Left Y Value, Window Width, Window Height, Window X Movement, Window Y Movement, and CRC fields. This type of packet is generally identified as a Type 71 packet, and uses a pre-selected fixed length of 15 bytes.

The fields are used to specify the X and Y values of the coordinate of the upper left corner of the window to be moved, the width and height of the window to be moved, and the number of pixels that the window is to be moved horizontally, and vertically, respectively. Positive values for the latter two fields cause the window to be moved to the right, and down, and negative values cause movement to the left and up, respectively.

15. Bitmap Area Fill Packets

The Bitmap Area Fill Packet provides a means to easily initialize a region of the display to a single color. Displays that have this capability will report the capability in bit 1 of the Display Feature Capability Indicators field of the Display Capability Packet. The format of a Bitmap Area Fill Packet is shown in FIG. 24. As shown in FIG. 24, this type of packet is structured to have Packet Length, Packet Type, Upper Left X Value, Upper Left Y Value, Window Width, Window Height, Data Format Descriptor, Pixel Area Fill Value, and CRC fields. This type of packet is generally identified as a Type 72 packet in the 1-byte type field, and uses a pre-selected fixed length of 17 bytes.

16. Bitmap Pattern Fill Packets

The Bitmap Pattern Fill Packet provides a means to easily initialize a region of the display to a pre-selected pattern. Displays that have this capability will report the capability in bit 2 of the Display Feature Capability Indicators field of the Display Capability Packet. The upper left corner of the fill pattern is aligned with the upper left corner of the window to be filled. If the window to be filled is wider or taller than the fill pattern, then the pattern may repeated horizontally or vertically a number of times to fill the window. The right or bottom of the last repeated pattern is truncated as necessary. If the window is smaller than the fill pattern, then the right side or bottom of the fill pattern may be truncated to fit the window.

The format of a Bitmap Pattern Fill Packet is shown in FIG. 25. As shown in FIG. 25, this type of packet is structured to have Packet Length, Packet Type, Upper Left X Value, Upper Left Y Value, Window Width, Window Height, Pattern Width, Pattern Height, Data Format Descriptor, Parameter CRC, Pattern Pixel Data, and Pixel Data CRC fields. This type of packet is generally identified as a Type 73 packet in the 1-byte type field.

17. Communication Link Data Channel Packets

The Communication Link Data Channel Packet provides a means for a display with high-level computing capability, such as a PDA, to communicate with a wireless transceiver such as a cell phone or wireless data port device. In this situation, the MDDI link is acting as a convenient high-speed interface between the communication device and the computing device with the mobile display, where this packet transports data at a Data Link Layer of an operating system for the device. For example, this packet could be used if a web browser, email client, or an entire PDA were built into a mobile display. Displays that have this capability will report the capability in bit 3 of the Display Feature Capability Indicators field of the Display Capability Packet.

The format of a Communication Link Data Channel Packet is shown in FIG. 26. As shown in FIG. 26, this type of packet is structured to have Packet Length, Packet Type, Parameter CRC, Communication Link Data, and Communication Data CRC fields. This type of packet is generally identified as a Type 74 packet in the type field.

18. Interface Type Handoff Request Packets

The Interface Type Handoff Request Packet enables the host to request that the client or display shift from an existing or current mode to the Type-I (serial), Type-II (2-bit parallel), Type-III (4-bit parallel), or Type-IV (8-bit parallel) modes. Before the host requests a particular mode it should confirm that the display is capable of operating in the desired mode by examining bits 6 and 7 of the Display Feature Capability Indicators field of the Display Capability Packet. The format of a Interface Type Handoff Request Packet is shown in FIG. 27. As shown in FIG. 27, this type of packet is structured to have Packet Length, Packet Type, Interface Type, and CRC fields. This type of packet is generally identified as a Type 75 packet, and uses a pre-selected fixed length of 4 bytes.

19. Interface Type Acknowledge Packets

The Interface Type Acknowledge Packet is sent by the display to confirm receipt of the Interface Type Handoff Packet. The requested mode, Type-I (serial), Type-II (2-bit parallel), Type-III (4-bit parallel), or Type-IV (8-bit parallel) mode, is echoed back to the host as a parameter in this packet. The format of a Interface Type Acknowledge Packet is shown in FIG. 28. As shown in FIG. 28, this type of packet is structured to have Packet Length, Packet Type, Interface Type, and CRC fields. This type of packet is generally identified as a Type 76 packet, and uses a pre-selected fixed length of 4 bytes.

20. Perform Type Handoff Packets

The Perform Type Handoff Packet is a means for the host to command the display to handoff to the mode specified in this packet. This is to be the same mode that was previously requested and acknowledged by the Interface Type Handoff Request Packet and Interface Type Acknowledge Packet. The host and display should switch to the agreed upon mode after this packet is sent. The display may lose and regain link synchronization during the mode change. The format of a Perform Type Handoff Packet is shown in FIG. 29. As shown in FIG. 29, this type of packet is structured to have Packet Length, Packet Type, Interface Type, and CRC fields. This type of packet is generally identified as a Type 77 packet in the 1-byte type field, and uses a pre-selected fixed length of 4 bytes.

21. Forward Audio Channel Enable Packets

This packet allows the host to enable or disable audio channels in the display. This capability is useful so the display (client) can power off audio amplifiers or similar circuit elements to save power when there is no audio to be output by the host. This is significantly more difficult to implement implicitly simply using the presence or absence of audio streams as an indicator. The default state when the display system is powered-up is that all audio channels are enabled. The format of a Forward Audio Channel Enable Packet is shown in FIG. 30. As shown in FIG. 30, this type of packet is structured to have Packet Length, Packet Type, Audio Channel Enable Mask, and CRC fields. This type of packet is generally identified as a Type 78 packet in the 1-byte type field, and uses a pre-selected fixed length of 4 bytes.

22. Reverse Audio Sample Rate Packets

This packet allows the host to enable or disable the reverse-link audio channel, and to set the audio data sample rate of this stream. The host selects a sample rate that is defined to be valid in the Display Capability Packet. If the host selects an invalid sample rate then the display will not send an audio stream to the host. The host may disable the reverse-link audio stream by setting the sample rate to 255. The default state assumed when the display system is initially powered-up or connected is with the reverse-link audio stream disabled. The format of a Reverse Audio Sample Rate Packet is shown in FIG. 31. As shown in FIG. 31, this type of packet is structured to have Packet Length, Packet Type, Audio Sample Rate, and CRC fields. This type of packet is generally identified as a Type 79 packet, and uses a pre-selected fixed length of 4 bytes.

23. Digital Content Protection Overhead Packets

This packet allows the host and a display to exchange messages related to the digital content protection method being used. Presently two types of content protection are contemplated, Digital Transmission Content Protection (DTCP), or High-bandwidth Digital Content Protection System (HDCP), with room reserved for future alternative protection scheme designations. The method being used is specified by a Content Protection Type parameter in this packet. The format of a Digital Content Protection Overhead Packet is shown in FIG. 32. As shown in FIG. 32, this type of packet is structured to have Packet Length, Packet Type, Content Protection Type, Content Protection Overhead Messages, and CRC fields. This type of packet is generally identified as a Type 80 packet.

24. Transparent Color Enable Packets

The Transparent Color Enable Packet is used to specify which color is transparent in a display and to enable or disable the use of a transparent color for displaying images. Displays that have this capability will report that capability in bit 4 of the Display Feature Capability Indicators field of the Display Capability Packet. When a pixel with the value for transparent color is written to the bitmap, the color does not change from the previous value. The format of a Transparent Color Enable Packet is shown in FIG. 33. As shown in FIG. 33, this type of packet is structured to have Packet Length, Packet Type, Transparent Color Enable, Data Format Descriptor, Transparent Pixel Value, and CRC fields. This type of packet is generally identified as a Type 81 packet in the 1-byte type field, and uses a pre-selected fixed length of 10 bytes.

25. Round Trip Delay Measurement Packets

The Round Trip Delay Measurement Packet is used to measure the propagation delay from the host to a client (display) plus the Delay from the client (display) back to the host. This measurement inherently includes the delays that exist in the line drivers and receivers and an interconnect sub-system.

This measurement is used to set the turn around delay and, reverse link rate divisor parameters in the Reverse Link Encapsulation Packet, described generally above. This packet is most useful when the MDDI link is running at the maximum speed intended for a particular application. The MDDI_Stb signal behaves as though all zero data is being sent during the following fields: All Zero, both Guard Times, and the Measurement Period. This causes MDDI_Stb to toggle at half the data rate so it can be used as periodic clock in the display during the Measurement Period.

The format of a of Round Trip Delay Measurement Packet is shown in FIG. 34. As shown in FIG. 34, this type of packet is structured to have Packet Length, Packet Type, Parameter CRC, All Zero, Guard Time 1, Measurement Period, Guard Time 2, and Driver Re-enable fields. This type of packet is generally identified as a Type 82 packet, and uses a pre-selected fixed length of 533 bits.

Figure 35:
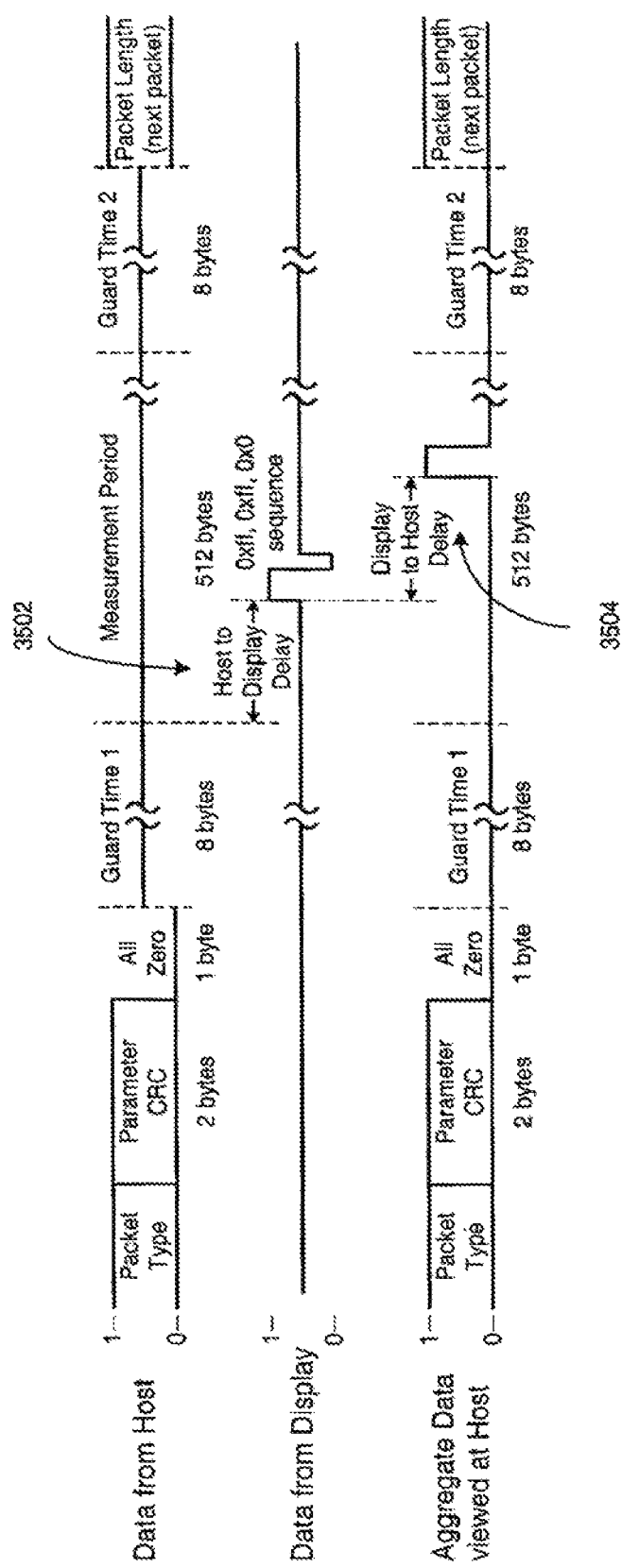
FIG. 35 illustrates the timing of events during the Round Trip Delay Measurement Packet.

The timing of events that take place during the Round Trip Delay Measurement Packet are illustrated in FIG. 35. In FIG. 35, the host transmits the Round Trip Delay Measurement Packet, shown by the presence of the Parameter CRC and Strobe Alignment fields followed by the All Zero and Guard Time 1 fields. A delay 3502 occurs before the packet reaches the client display device or processing circuitry. As the display receives the packet, it transmits the 0xff, 0xff, 0x0 pattern as precisely as practical at the beginning of the Measurement Period as determined by the display. The actual time the display begins to transmit this sequence is delayed from the beginning of the Measurement Period from the point of view of the host. The amount of this delay is precisely the time it takes for the packet to propagate through the line drivers and receivers and the interconnect subsystem. A similar amount of delay 3504 is incurred for the pattern to propagate from the display back to the host.

In order to accurately determine the round trip delay time for signals traversing to and from the client, the host counts the number of bit time periods occurring after the start of the Measurement Period until the beginning of the 0xff, 0xff, 0x0 sequence is detected upon arrival. This information is used to determine the amount of time for a round trip signal to pass from the host to the client and back again. Then, about one half of this amount is attributed to a the delay created for the one way passage of a signal to the client.

The display disables its line drivers substantially immediately after sending the last bit of the 0xff, 0xff, 0x0 pattern. Guard Time 2 allows time for the display's line drivers to go completely to the high-impedance state before the host transmits the Packet Length of the next packet. The hibernation pull-up and pull-down resistors (see FIG. 42) ensure that the MDDI_Data signals are held at a valid low level in the intervals where the line drivers are disabled in both the host and display.

26. Forward Link Skew Calibration Packet

The Forward Link Skew Calibration Packet allows a client or Display to calibrate itself for differences in the propagation delay of the MDDI_Data signals with respect to the MDDI_Stb signal. Without delay skew compensation, the maximum data rate is generally limited to account for potential worst-case variation in these delays. Generally, this packet is only sent when the forward link data rate is configured to a rate of around 50 Mbps or lower. After sending this packet to calibrate the display, the data rate may be stepped up above 50 Mbps. If the data rate is set too high during the skew calibration process, the display might synchronize to an alias of the bit period which could cause the delay skew compensation setting to be off by more than one bit time, resulting in erroneous data clocking. The highest data rate type of interface or greatest possible Interface Type is selected prior to sending the Forward Link Skew Calibration Packet so that all existing data bits are calibrated.

The format of a Forward Link Skew Calibration Packet is shown in FIG. 56. As shown in FIG. 56, this type of packet is structured to have Packet Length (2 bytes), Packet Type, Parameter CRC, Calibration Data Sequence, and CRC fields. This type of packet is generally identified as a Type 83 packet in the type field, and has a pre-selected length of 515.

D. Packet CRC

The CRC fields appear at the end of the packets and sometimes after certain more critical parameters in a packet that may have a significantly large data field, and thus, an increased likelihood of errors during transfer. In packets that have two CRC fields, the CRC generator, when only one is used, is re-initialized after the first CRC so the CRC computations following a long data field are not affected by the parameters at the beginning of the packet.

Figure 36:
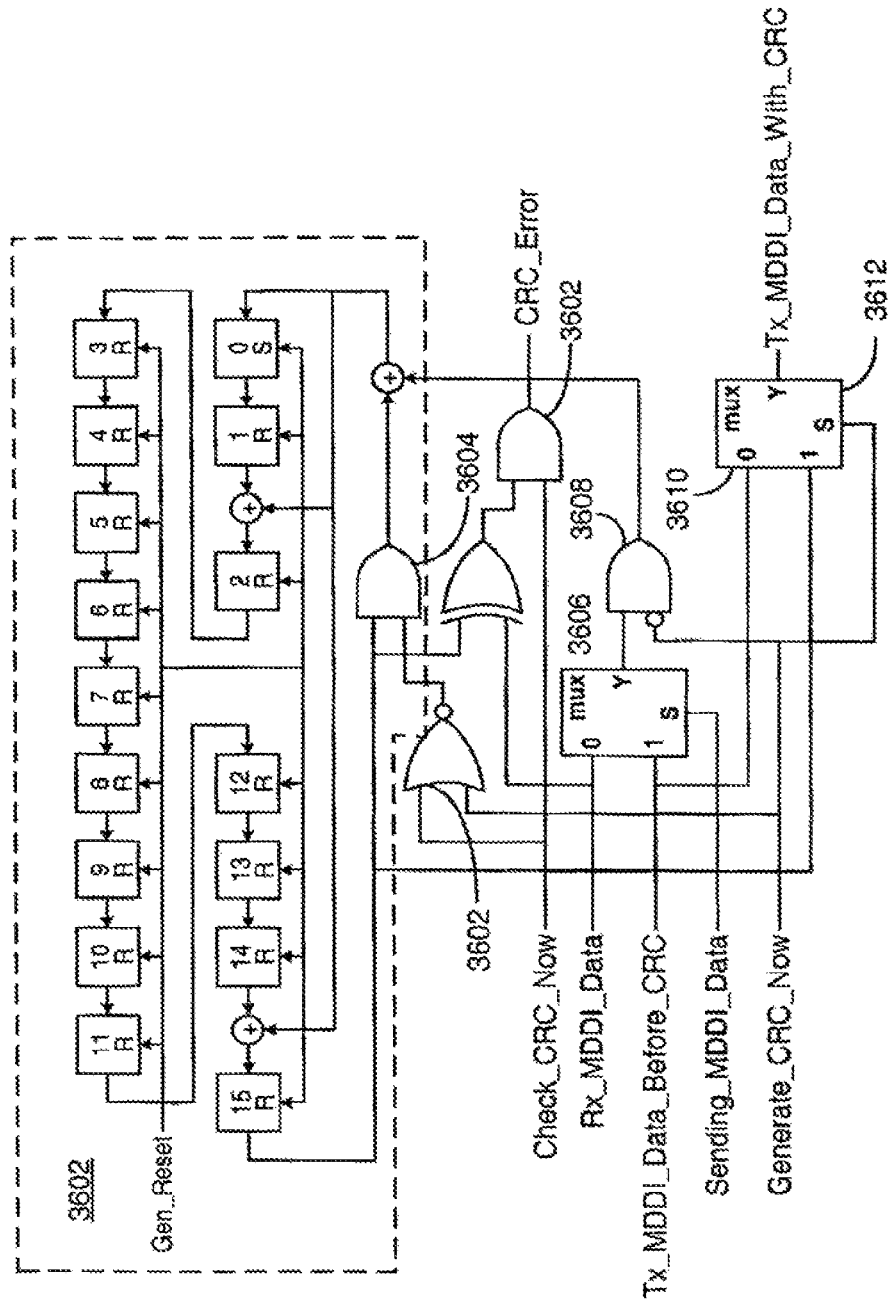
FIG. 36 illustrates a sample implementation of a CRC generator and checker useful for the invention.

In an exemplary embodiment of the invention, the polynomial used, for the CRC calculation is known as the CRC-16, or $X^{16}+X^{15}+X^2+X^0$. A sample implementation of a CRC generator and checker 3600 useful for implementing the invention is shown in FIG. 36. In FIG. 36, a CRC register 3602 is initialized to a value of 0x0001 just prior to transfer of the first bit of a packet which is input on the Tx_MDDI_Data_Before_CRC line, then the bytes of the packet are shifted into the register starting with the LSB first. Note that the register bit numbers in this figure correspond to the order of the polynomial being used, and not the bit positions used by the MDDI. It is more efficient to shift the CRC register in a single direction, and this results in having CRC bit 15 appear in bit position 0 of the MDDI CRC field, and CRC register bit 14 in MDDI CRC field bit position 1, and so forth until MDDI bit position 14 is reached.

As an example, if the packet contents for the Display Request and Status Packets are: 0x07, 0x46, 0x000400, 0x00 (or represented as a sequence of bytes as: 0x07, 0x00, 0x46, 0x00, 0x04, 0x00, 0x00), and are submitted using the inputs of the multiplexors 3604 and 3606, and NAND gate 3608, the resulting CRC output on the Tx_MDDI_Data_With_CRC line is 0x0ea1 (or represented as a sequence as 0xa1, 0x0e).

When CRC generator and checker 3600 is configured as a CRC checker, the CRC that is received on the Rx_MDDI_Data line is input to multiplexor 3604 and NAND gate 3608, and is compared bit by bit with the value found in the CRC register using NOR gate 3610, exclusive-OR (XOR) gate 3612, and AND gate 3614. If there are any errors, as output by AND gate 3614, the CRC is incremented once for every packet that contains a CRC error by connecting the output of gate 3614 to the input of register 3602. Note that the example circuit shown in the diagram of FIG. 36 can output more than one CRC error signal within a given CHECK_CRC_NOW window (see FIG. 37*b*). Therefore, the CRC error counter will only count the first CRC error instance within each interval where CHECK_CRC_NOW is active. If configured as a CRC generator the CRC is clocked out of the CRC register at the time coinciding with the end of the packet.

Figure 37A:
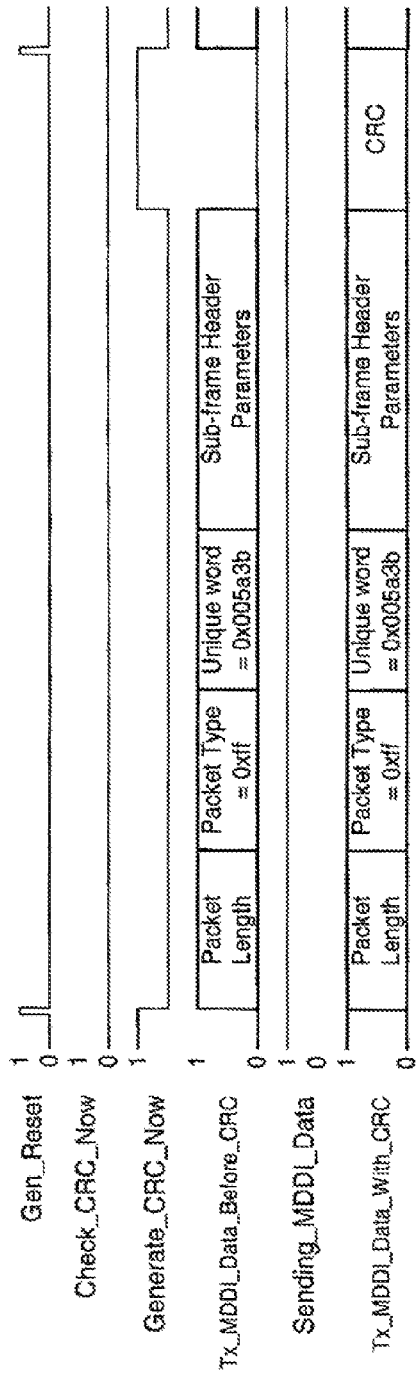
FIG. 37a illustrates the timing of CRC signals for the apparatus of FIG. 36 when sending data packets.
Figure 37B:
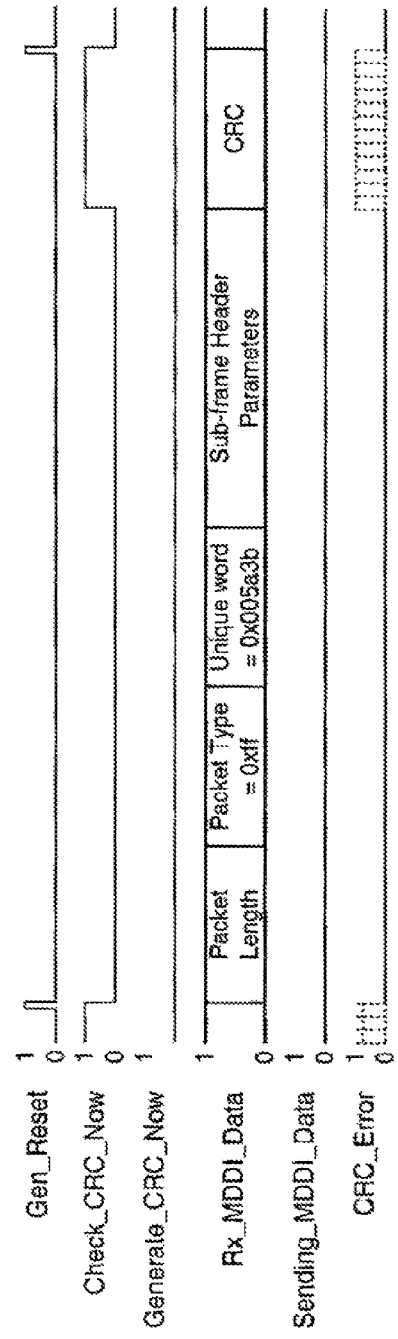
FIG. 37b illustrates the timing of CRC signals for the apparatus of FIG. 36 when receiving data packets.

The timing for the input and output signals, and the enabling signals, is illustrated graphically in FIGS. 37*a* and 37*b*. The generation of a CRC and transmission of a packet of data are shown in FIG. 37*a* with the state (0 or 1) of the Gen_Reset, Check_CRC_Now, Generate_CRC_Now, and Sending_MDDI_Data signals, along with the Tx_MDDI_Data_Before_CRC and Tx_MDDI_Data_With_CRC signals. The reception of a packet of data and checking of the CRC value are shown in FIG. 37*b* with the state of the Gen_Reset, Check_CRC_Now, Generate_CRC_Now, and Sending_MDDI_Data signals, along with the Rx_MDDI_Data and CRC error signals.

V. Link Restart from Hibernation

When the host restarts the forward link from a hibernation state it drives MDDI_Data to a logic one state for about 150 μsec and then activates MDDI_Stb and simultaneously drives MDDI_Data to a logic zero state for 50 μsec, and then starts forward link traffic by sending a sub-frame header packet. This generally allows bus contentions to be resolved before the sub-frame header packet is sent by providing enough settling time between signals.

When the client, here a display, needs data or communication from the host it drives the MDDI_Data0 line to a logic one state for around 70 μsec, although other periods can be used as desired, and then disables the driver by placing it in a high-impedance state. This action causes the host to start or restart data traffic on the forward link (208) and to poll the client for its status. The host must detect the presence of the request pulse within 50 μsec and then begin the startup sequence of driving MDDI_Data0 to logic one for 150 μsec and to logic zero for 50 μsec. The display must not send a service request pulse if it detects MDDI_Data0 in the logic one state for more than 50 μsec. The nature of selection of the times and tolerances of time intervals related to the hibernation processing and start up sequence are discussed further below.

An example of the processing steps for a typical service request event 3800 with no contention is illustrated in FIG. 38, where the events are labeled for convenience in illustration using the letters A, B, C, D, E, F, and G. The process commences at point A when the host sends a Link Shutdown Packet to the client device to inform it that the link will transition to a low-power hibernation state. In a next step, the host enters the low-power hibernation state by disabling the MDDI_Data0 driver and setting the MDDI_Stb driver to a logic zero, as shown at point B. MDDI_Data0 is driven to a zero level by a high-impedance bias network. After some period of time, the client sends a service request pulse to the host by driving MDDI_Data0 to a logic one level as seen at point C. The host still asserts the zero level using the high-impedance bias network, but the driver in the client forces the line to a logic one level. Within 50 μsec, the host recognizes the service request pulse, and asserts a logic one level on MDDI_Data0 by enabling its driver, as seen at point D. The client then ceases from attempting to assert the service request pulse, and the client places its driver into a high-impedance state, as seen at point E. The host drives MDDI_Data0 to a logic zero level for 50 μsec, as shown at point F, and also begins to generate MDDI_Stb in a manner consistent with the logic zero level on MDDI_Data0. After asserting MDDI_Data0 to a zero level and driving MDDI_Stb for 50 μsec, the host begins to transmit data on the forward link by sending a Sub-frame Header Packet, as shown at point G.

A similar example is illustrated in FIG. 39 where a service request is asserted after the link restart sequence has begun, and the events are again labeled using the letters A, B, C, D, E, F, and G. This represents a worst case scenario where a request pulse from the client comes closest to corrupting the Sub-frame Header Packet. The process commences at point A when the host again sends a Link Shutdown Packet to the client device to inform it that the link will transition to a low-power hibernation state. In a next step, the host enters the low-power hibernation state by disabling the MDDI_Data0 driver and setting the MDDI_Stb driver to a logic zero, as shown at point B. As before, MDDI_Data0 is driven to a zero level by a high-impedance bias network. After a period of time, the host begins the link restart sequence by driving MDDI_Data0 to a logic one level for 150 μsec as seen at point C. Prior to 50 μsec passing after the link restart sequence begins the display also asserts MDDI_Data0 for a duration of 70 μsec, as seen at point D. This happens because the display has a need to request service from the host and does not recognize that the host has already begun the link restart sequence. The client then ceases attempting to assert the service request pulse, and the client places its driver into a high-impedance state, as seen at point E. The host continues to drive MDDI_Data0 to a logic one level. The host drives MDDI_Data0 to a logic zero level for 50 μsec, as shown at point F, and also begins to generate MDDI_Stb in a manner consistent with the logic zero level on MDDI_Data0. After asserting MDDI_Data0 to a zero level, and driving MDDI_Stb for 50 μsec, the host begins to transmit data on the forward link by sending a Sub-frame Header Packet, as shown at point G.

VI. Interface Electrical Specifications

In the example embodiments of the present invention, Data in a Non-Return-to-Zero (NRZ) format is encoded using a data-strobe signal or DATA-STB format, which allows clock information to be embedded in the data and strobe signals. The clock can be recovered without complex phase lock loop circuitry. Data is carried over a bi-directional differential link, generally implemented using a wire-line cable, although other conductors, printed wires, or transfer elements can be used, as stated earlier. The strobe signal (STB) is carried over a uni-directional link which is driven only by the host. The strobe signal toggles value (0 or 1) whenever there is a back-to-back state, 0 or 1, that remains the same on the Data line or signal.

Figure 40:
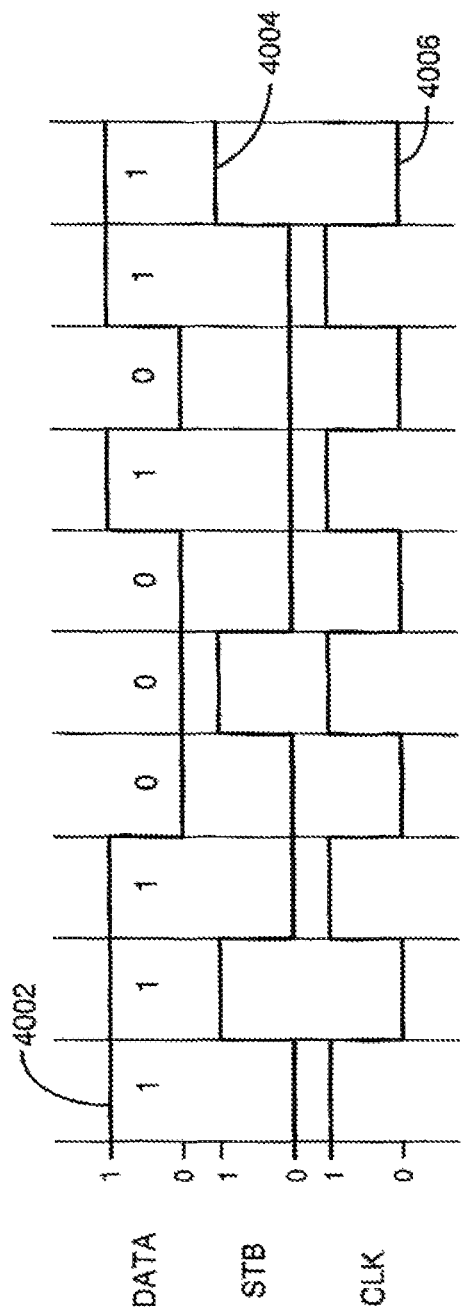
FIG. 40 illustrates how a data sequence can be transmitted using DATA-STB encoding.

An example of how a data sequence such as bits "110001011" can be transmitted using DATA-STB encoding is shown in graphical form in FIG. 40. In FIG. 40, a DATA signal 4002 is shown on the top line of a signal timing chart and a STB signal 4004 is shown on a second line, each time aligned as appropriate (common starting point). As time passes, when there is a change of state occurring on the DATA line 4002 (signal), then the STB line 4004 (signal) maintains a previous state, thus, the first '1' state of the DATA signal correlates with the first '0' state for the STB signal, its starting value. However, if or when the state, level, of the DATA signal does not change then the STB signal toggles to the opposite state or '1' in the present example, as is the case in FIG. 40 where the DATA is providing another '1' value. That is, there is always one and only one transition per bit cycle between DATA and STB. Therefore, the STB signal transitions again, this time to '0' as the DATA signal stays at '1' and holds this level or value as the DATA signal changes level to '0'. When the DATA signal stays at '1', the STB signal toggles to the opposite state or '1' in the present example, and so forth, as the DATA signal changes or holds levels or values.

Upon receiving these signals, an exclusive-OR (XOR) operation is performed on the DATA and STB signals to produce a clock signal 4006, which is shown on the bottom of the timing chart for relative comparison with the desired data and strobe signals. An example of circuitry useful for generating the DATA and STB outputs or signals from input data at the host, and then recovering or recapturing the data from the DATA and STB signals at the client, is shown in FIG. 41.

Figure 41:
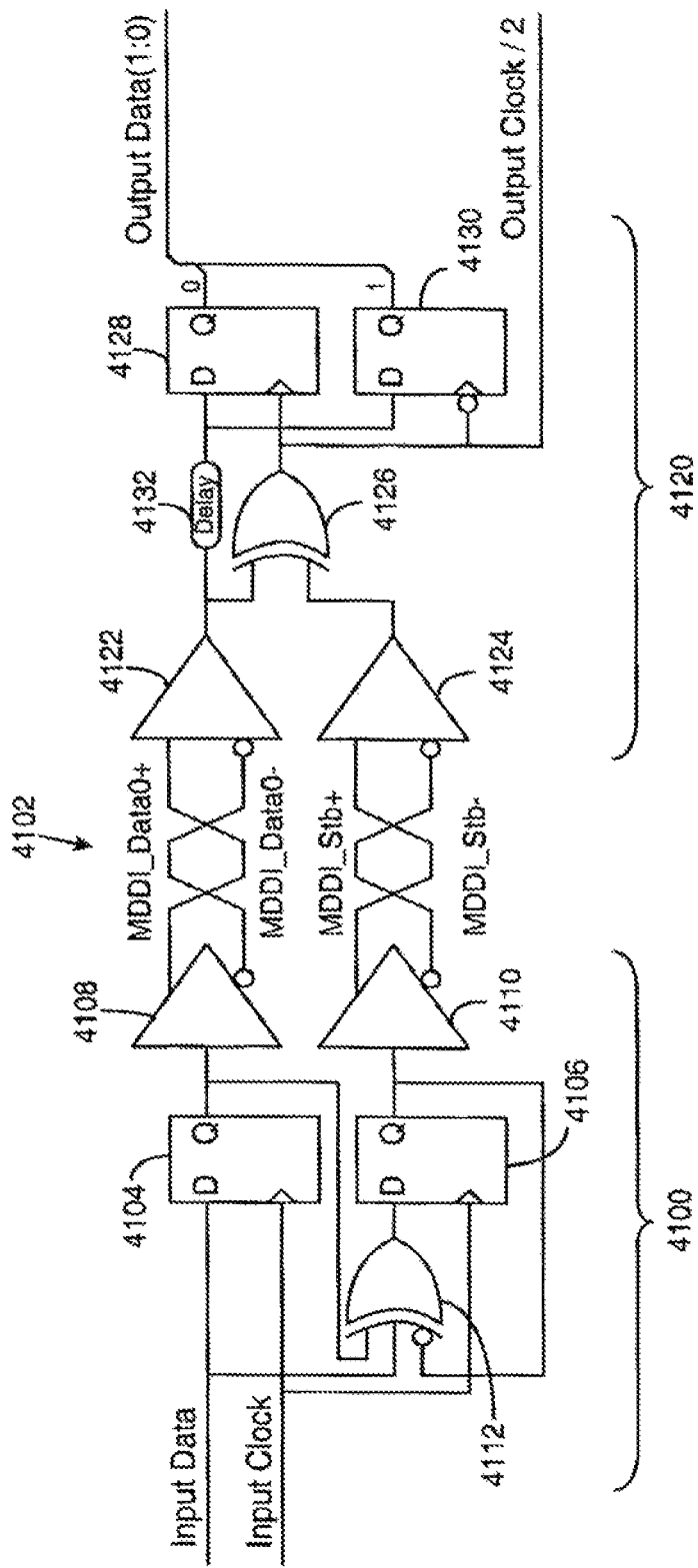
FIG. 41 illustrates circuitry useful for generating the DATA and STB signals from input data at the host, and then recovering the data at the client.

In FIG. 41, a transmission portion 4100 is used to generate and transmit the original DATA and STB signals over an intermediary signal path 4102, while a reception portion 4120 is used to receive the signals and recover the data. As shown in FIG. 41, in order to transfer data from a host to a client, the DATA signal is input to two D-type flip-flop circuit elements 4104 and 4106 along with a clock signal for triggering the circuits. The two flip-flop circuit outputs (Q) are then split into a differential pair of signals MDDI_Data0+, MDDI_Data0− and MDDI_Stb+, MDDI_Stb−, respectively, using two differential line drivers 4108 and 4110 (voltage mode). A three-input exclusive-NOR (XNOR) gate, circuit, or logic element 4112 is connected to receive the DATA and outputs of both flip-flops, and generates an output that provides the data input for the second flip-flop, which in turn generates the MDDI_Stb+, MDDI_Stb− signals. For convenience, the XNOR gate has the inversion bubble placed to indicate that it is effectively inverting the Q output of the flip-flop that generates the Strobe.

In reception portion 4120 of FIG. 41, the MDDI_Data0+, MDDI_Data0− and MDDI_Stb+, MDDI_Stb− signals are received by each of two differential line receivers 4122 and 4124, which generate single outputs from the differential signals. The outputs of the amplifiers are then input to each of the inputs of a two-input exclusive-OR (XOR) gate, circuit, or logic element 4126 which produces the clock signal. The clock signal is used to trigger each of two D-type flip-flop circuits 4128 and 4130 which receive a delayed version of the DATA signal, through delay element 4132, one of which (4128) generates data '0' values and the other (4130) data '1' values. The clock has an independent output from the XOR logic as well. Since the clock information is distributed between the DATA and STB lines, neither signal transitions between states faster than half of the clock rate. Since the clock is reproduced using the exclusive-OR processing of the DATA and STB signals, the system effectively tolerates twice the amount of skew between the input data and clock compared to the situation when a clock signal is sent directly over a single dedicated data line.

The MDDI Data pairs, MDDI_Stb+, and MDDI_Stb− signals are operated in a differential mode to maximize immunity from the negative affects of noise. Each portion of the differential signal path is source terminated with one-half of the characteristic impedance of the cable or conductor being used to transfer signals. MDDI Data pairs are source terminated at both the host and client ends. Since only one of these two drivers is active at a given time, there is always a termination at the source for the transfer link. The MDDI_Stb+ and MDDI_Stb− signals are only driven by the host.

Figure 42:
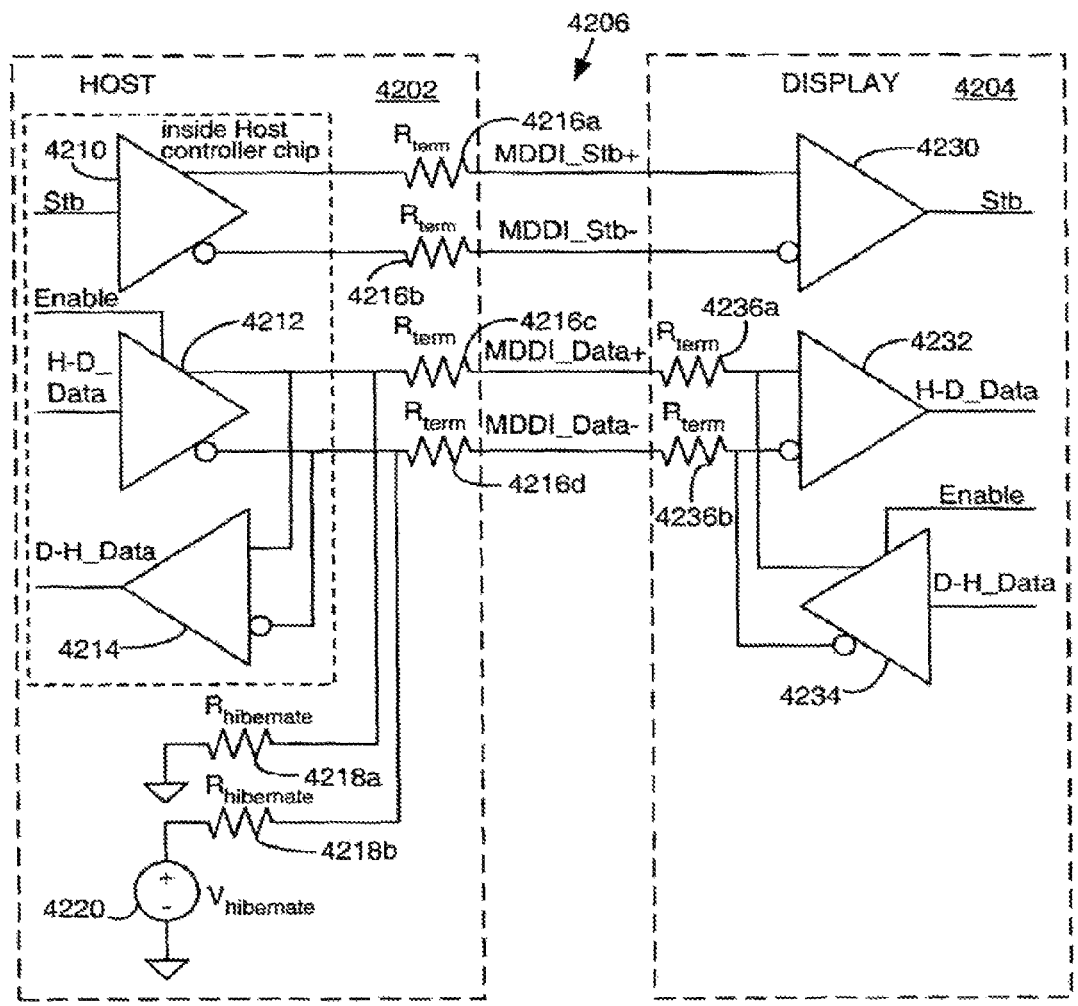
FIG. 42 illustrates drivers and terminating resistors useful for implementing an embodiment of the invention.

An exemplary configuration of elements useful for achieving the drivers, receivers, and terminations for transferring signals as part of the inventive MDD interface are shown in FIG. 42, while corresponding DC electrical specifications of MDDI_Data and MDDI_Stb are shown in Table VII. This exemplary interface uses low voltage sensing, here 200 mV, with less than 1 volt power swings and low power drain.

TABLE VII

| Parameter | Description | Min. | Typ. | Max. | Units |
|---|---|---|---|---|---|
| $R_{term}$ | Series Termination | 41.3 | 42.2 | 43.0 | Ohms |
| $R_{hibernate}$ | Hibernate State bias termination | 8 | 10 | 12 | K-Ohms |
| $V_{hibernate}$ | Hibernate State open-circuit voltage | 0.5 | | 2.8 | V |
| $V_{Output-Range}$ | Allowable driver output voltage range with respect to GND | 0 | | 2.8 | V |
| $V_{OD+}$ | Driver differential output high voltage | 0.5 | | | V |
| $V_{OD-}$ | Driver differential output low voltage | | | −0.5 | V |

TABLE VII-continued

| Parameter | Description | Min. | Typ. | Max. | Units |
|---|---|---|---|---|---|
| $V_{IT+}$ | Receiver differential input high threshold voltage | | | 10 | mV |
| $V_{IT-}$ | Receiver differential input low threshold voltage | −10 | | | mV |
| $V_{Input-Range}$ | Allowable receiver input voltage range with respect to GND | 0 | | 3.0 | V |
| $I_{in}$ | Input leakage current (excluding hibernate bias) | −25 | | 25 | μA |

The electrical parameters and characteristics of the differential line drivers and line receivers are described in Table VIII. Functionally, the driver transfers the logic level on the input directly to a positive output, and the inverse of the input to a negative output. The delay from input to outputs is well-matched to the differential line which is driven differentially. In most implementations, the voltage swing on the outputs is less than the swing on the input to minimize power consumption and electromagnetic emissions. Table VIII presents a minimum voltage swing to be around 0.5V. However, other values can be used, as would be known by those skilled in the art, and the inventors contemplate a smaller value in some embodiments, depending on design constraints.

The differential line receivers have the same characteristic as a high-speed voltage comparator. In FIG. 41, the input without the bubble is the positive input and the input with the bubble is the negative input. The output is a logic one if: $(V_{input+})-(V_{input-})$ is greater than zero. Another way to describe this is a differential amplifier with very large (virtually infinite) gain with the output clipped at logic 0 and 1 voltage levels.

The delay skew between different pairs should be minimized to operate the differential transmission system at the highest potential speed.

In FIG. 42, a host controller 4202 and a client or display controller 4204 are shown transferring packets over the communication link 4206. The host controller employs a series of three drivers 4210, 4212, and 4214 to receive the host DATA and STB signals to be transferred, as well as to receive the client Data signals to be transferred. The driver responsible for passage of the host DATA employs an enable signal input to allow activation of the communication link only when transfer from the host to the client is desired. Since the STB signal is formed as part of the transfer of data, no additional enable signal is employed for that driver (4212). The outputs of each of the DATA and STB drivers are connected to termination impedances or resistors 4216*a*, 4216*b*, 4216*c*, and 4216*d*, respectively.

Termination resistors 4216*a* and 4216*b* will also act as impedances on the input of the client side receiver 4220 for the STB signal processing while additional termination resistors 4216*e* and 4216*f* are placed in series with resistors 4216*c* and 4216*d*, respectively on the input of the client data processing receiver 4222. A sixth driver 4226 in the client controller is used to prepare the data signals being transferred from the client to the host, where driver 4214, through termination resistors 4216*c* and 4216*d*, on the input side, processes the data for transfer to the host for processing.

Two additional resistors 4218*a* and 4218*b* are placed between the termination resistors and ground and a voltage source 4220, respectively, as part of the hibernation control discussed elsewhere. The voltage source is used to drive the transfer lines to the high or low levels previously discussed to manage the flow of data.

The above drivers and impedances can be formed as discrete components or as part of an application specific integrated circuit (ASIC) which acts as a more cost effective encoder or decoder solution.

It can be easily seen that power is transferred to the client device, or display, from the host device using the signals labeled MDDI_Pwr and MDDI_Gnd over a pair of conductors. The MDDI_Gnd portion of the signal acts as the reference ground and the power supply return path or signal for the display device. The MDDI_Pwr signal acts as the display device power supply which is driven by the host device In an exemplary configuration, for low power applications, the display device is allowed to draw up to 500 mA. The MDDI_Pwr signal can be provided from portable power sources, such as but not limited to, a lithium-ion type battery or battery pack residing at the host device, and may range from 3.2 to 4.3 volts with respect to MDDI_Gnd.

VII. Timing Characteristics

A. Overview

Figure 43:
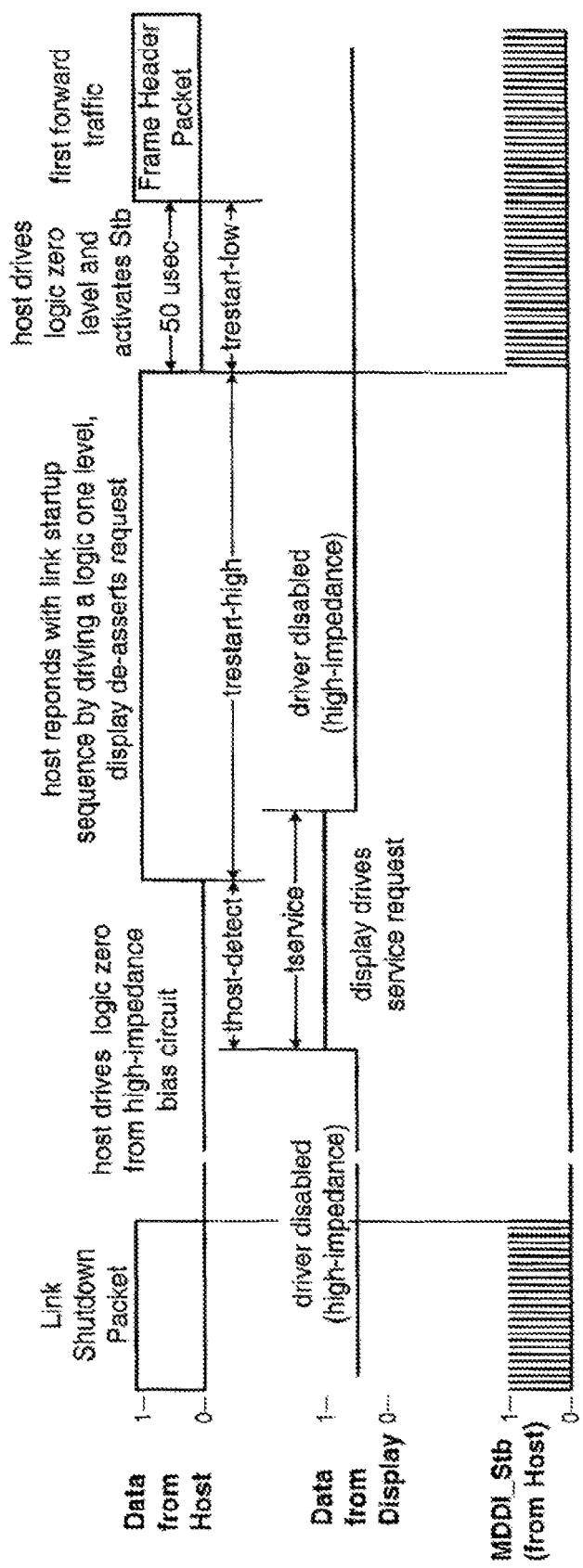
FIG. 43 illustrates steps and signal levels employed by a client to secure service from the host and by the host to provide such service.

The steps and signal levels employed by a client to secure service from the host and by the host to provide such service, are illustrated in FIG. 43. In FIG. 43, the first part of signals being illustrated shows a Link Shutdown Packet being transferred from the host and the data line is then driven to a logic zero state using the high-impedance bias circuit. No data is being transmitted by the client display, or host, which has its driver disabled. A series of strobe pulses for the MDDI_Stb signal line can be seen at the bottom, since MDDI_Stb is active during the Link Shutdown Packet. Once this packet ends and the logic level changes to zero as the host drives the bias circuit and logic to zero, the MDDI_Stb signal line changes to a zero level as well. This represents the termination of the last signal transfer or service from the host, and could have occurred at any time in the past, and is included to show the prior cessation of service, and the state of the signals prior to service commencement. If desired, such as signal can be sent just to reset the communication link to the proper state without a 'known' prior communication having been undertaken by this host device.

As shown in FIG. 43, the signal output from the client is initially set at a logic level of zero. In other words, the client output is at a high impedance, and the driver is disabled. When service is being requested, the client enables its driver and sends a service request to the host, which is a period of time, designated $t_{service}$, during which the line is driven to a logic one level. A certain amount of time then passes or may be needed before the host detects the request, termed $t_{host-detect}$, after which the host responds with a link startup sequence by driving the signal to a logic one level. At this point, the client de-asserts the request, and disables the service request driver so that the output line from the client goes to zero logic level again. During this time, the MDDI_Stb signal is at a logic zero level.

The host drives the host data output at the '1' level for a period termed $t_{restart-high}$, after which the host drives the logic level to zero and activates MDDI_Stb for a period termed $t_{restart-low}$, after which the first forward traffic begins with a Frame Header Packet, and the forward traffic packets are then transferred. The MDDI_Stb signal is active during the $t_{restart-low}$ period and the subsequent Frame Header Packet.

Table VIII shows representative times for the length of the various periods discussed above, and the relationship to exemplary minimum and maximum data rates, where:

$$t_{bit} = \frac{1}{\text{Link\_Data\_Rate}}$$

TABLE VIII

| Parameter | Description | Min. | Typ. | Max. | Units |
|---|---|---|---|---|---|
| $t_{service}$ | Duration of display service request pulse | 60 | 70 | 80 | μsec |
| $t_{restart-high}$ | Duration of host link restart high pulse | 140 | 150 | 160 | μsec |
| $t_{restart-low}$ | Duration of host link restart low pulse | 40 | 50 | 60 | μsec |
| $t_{display-detect}$ | Time for display to detect link restart sequence | 1 | | 50 | μsec |
| $t_{host-detect}$ | Time for host to detect service request pulse | 1 | | 50 | μsec |
| $1/t_{bit-min-perf}$ | Link data rate for a minimum performance device | 0.001 | | 1 | Mbps |
| $1/t_{bit-max-perf}$ | Maximum link data rate range for a device | 0.001 | | 450 | Mbps |
| | Reverse Link data rate | 0.0005 | | 50 | Mbps |
| $t_{bit}$ | Period of one forward link data bit | 2.2 | | $10^6$ | nsec |

Those skilled in the art will readily understand that the functions of the individual elements illustrated in FIGS. 41 and 42, are well known, and the function of the elements in FIG. 42 is confirmed by the timing diagram in FIG. 43. Details about the series terminations and hibernation resistors that are shown in FIG. 42 were omitted from FIG. 41 because that information is unnecessary for a description of how to perform the Data-Strobe encoding and recover the clock from it.

B. Data-Strobe Timing Forward Link

Figure 44:
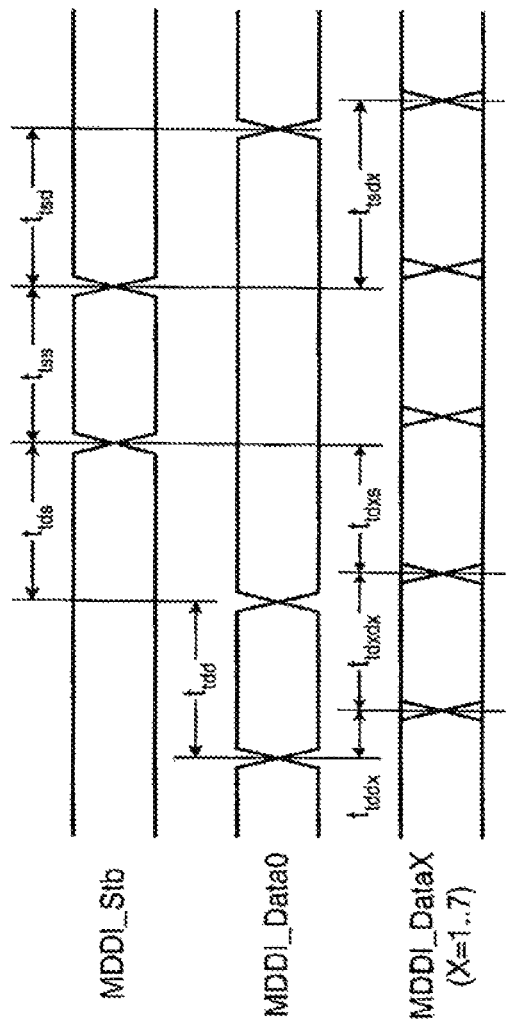
FIG. 44 illustrates relative spacing between transitions on the Data0, other data lines (DataX), and the strobe lines (Stb).

The switching characteristics for the transfer of data on the forward link from the host driver output is shown in Table IX. Table IX presents a tabular form of the minimum and maximum desired, versus typical times for certain signal transitions to occur. For example, the typical length of time for a transition to occur from the start to the end of a data value (output of a '0' or '1'), a Data0 to Data0 transition, termed $t_{tdd-(host-output)}$, is $t_{tbit}$ while the minimum time is about $t_{tbit}-0.5$ nsec., and the maximum is about $t_{tbit}+0.5$ nsec. The relative spacing between transitions on the Data0, other data lines (DataX), and the strobe lines (Stb), is illustrated in FIG. 44 where the Data0 to Strobe, Strobe to Strobe, Strobe to Data0, Data0 to non-Data0, non-Data0 to non-Data0, non-Data0 to Strobe, and Strobe to non-Data0 transitions are shown, which are referred to as $t_{tds-(host-output)}$, $t_{tss-(host-output)}$, $t_{tsd-(host-output)}$, $t_{tddx-(host-output)}$, $t_{tdxdx-(host-output)}$, $t_{tdxs-(host-output)}$, and $t_{tsdx-(host-output)}$, respectively.

TABLE IX

| Parameter | Description | Min. | Typ. | Max. | Units |
|---|---|---|---|---|---|
| $t_{tdd-(host-output)}$ | Data0 to Data0 transition | $t_{tbit} - 0.5$ | $t_{tbit}$ | $t_{tbit} + 0.5$ | nsec |
| $t_{tds-(host-output)}$ | Data0 to Strobe transition | $t_{tbit} - 0.8$ | $t_{tbit}$ | $t_{tbit} + 0.8$ | nsec |
| $t_{tss-(host-output)}$ | Strobe to Strobe transition | $t_{tbit} - 0.5$ | $t_{tbit}$ | $t_{tbit} + 0.5$ | nsec |
| $t_{tsd-(host-output)}$ | Strobe to Data0 transition | $t_{tbit} - 0.8$ | $t_{tbit}$ | $t_{tbit} + 0.8$ | nsec |
| $t_{tddx-(host-output)}$ | Data0 to non-Data0 transition | | $t_{tbit}$ | | nsec |
| $t_{tdxdx-(host-output)}$ | non-Data0 to non-Data0 transition | $t_{tbit} - 0.5$ | $t_{tbit}$ | $t_{tbit} + 0.5$ | nsec |

TABLE IX-continued

| Parameter | Description | Min. | Typ. | Max. | Units |
|---|---|---|---|---|---|
| $t_{tdxs\text{-}(host\text{-}output)}$ | non-Data0 to Strobe transition | | $t_{tbit}$ | | nsec |
| $t_{tsdx\text{-}(host\text{-}output)}$ | Strobe to non-Data0 transition | | $t_{tbit}$ | | nsec |

The typical MDDI timing requirements for the client receiver input for the same signals transferring data on the forward link is shown in Table X. Since the same signals are being discussed but time delayed, no new figure is needed to illustrate the signal characteristics or meaning of the respective labels, as would be understood by those skilled in the art.

TABLE X

| Parameter | Description | Min. | Typ. | Max. | Units |
|---|---|---|---|---|---|
| $t_{tdd\text{-}(display\text{-}input)}$ | Data0 to Data0 transition | $t_{tbit} - 1.0$ | $t_{tbit}$ | $t_{tbit} + 1.0$ | nsec |
| $t_{tds\text{-}(display\text{-}input)}$ | Data0 to Strobe transition | $t_{tbit} - 1.5$ | $t_{tbit}$ | $t_{tbit} + 1.5$ | nsec |
| $t_{tss\text{-}(display\text{-}input)}$ | Strobe to Strobe transition | $t_{tbit} - 1.0$ | $t_{tbit}$ | $t_{tbit} + 1.0$ | nsec |
| $t_{tsd\text{-}(display\text{-}input)}$ | Strobe to Data0 transition | $t_{tbit} - 1.5$ | $t_{tbit}$ | $t_{tbit} + 1.5$ | nsec |
| $t_{tddx\text{-}(host\text{-}output)}$ | Data0 to non-Data0 transition | | $t_{tbit}$ | | nsec |
| $t_{tdxdx\text{-}(host\text{-}output)}$ | non-Data0 to non-Data0 transition | | $t_{tbit}$ | | nsec |
| $t_{tdxs\text{-}(host\text{-}output)}$ | non-Data0 to Strobe transition | | $t_{tbit}$ | | nsec |
| $t_{tsdx\text{-}(host\text{-}output)}$ | Strobe to non-Data0 transition | | $t_{tbit}$ | | nsec |

Figure 45:
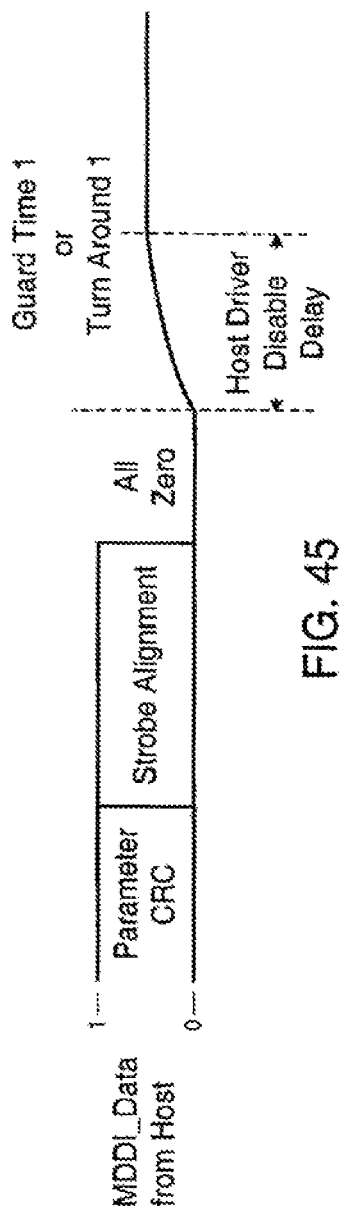
FIG. 45 illustrates the presence of a delay in response that can occur when a host disables the host driver after transferring a packet.
Figure 46:
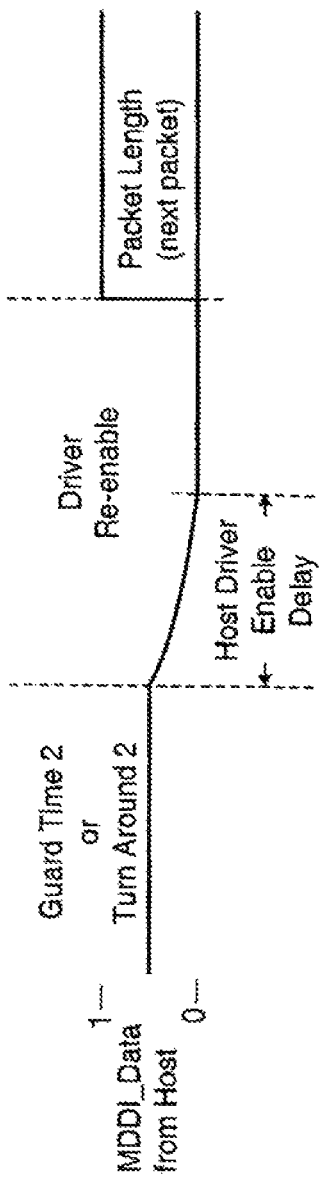
FIG. 46 illustrates the presence of a delay in response that can occur when a host enables the host driver to transfer a packet.

FIGS. 45 and 46 illustrate the presence of a delay in response that can occur when the host disables or enables the host driver, respectively. In the case of a host forwarding certain packets, such as the Reverse Link Encapsulation Packet or the Round Trip Delay Measurement Packet, the host disables the line driver after the desired packets are forwarded, such as the Parameter CRC, Strobe Alignment, and All Zero packets illustrated in FIG. 45 as having been transferred. However, as shown in FIG. 45, the state of the line does not necessarily switch from '0' to a desired higher value instantaneously, although this is potentially achievable with certain control or circuit elements present, but takes a period of time termed the host Driver Disable Delay period to respond. While it could occur virtually instantly such that this time period is 0 nanoseconds (nsec.) in length, it could more readily extend over some longer period with 10 nsec. being a desired maximum period length, which occurs during the Guard Time 1 or Turn Around 1 packet periods.

Looking in FIG. 46, one sees the signal level change undergone when the host Driver is enabled for transferring a packet such as Reverse Link Encapsulation Packet or the Round Trip Delay Measurement Packet. Here, after the Guard Time 2 or Turn Around 2 packet periods, the host driver is enabled and begins to drive a level, here '0', which value is approached or reached over a period of time termed the Host Driver Enable Delay period, which occurs during the Driver Re-enable period, prior to the first packet being sent.

A similar process occurs for the drivers and signal transfers for the client device, here a display. The general guidelines for the length of these periods, and their respective relationships are shown in Table XI, below.

TABLE XI

| Description | Min. | Max. | Units |
|---|---|---|---|
| Host Driver Disable Delay | 0 | 10 | nsec |
| Host Driver Enable Delay | 0 | 2.0 | nsec |
| Display Driver Disable Delay | 0 | 10 | nsec |
| Display Driver Enable Delay | 0 | 2.0 | nsec |

C. Data-Strobe Timing Reverse Link

Figure 47:
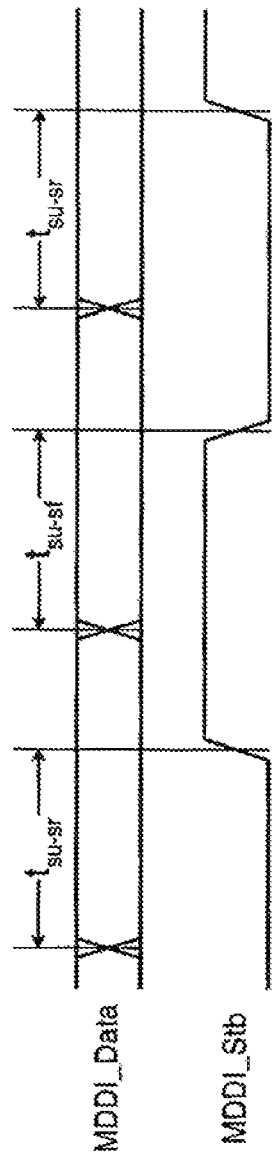
FIG. 47 illustrates the relationship at the host receiver input between the timing of the data being transferred and the leading and trailing edges of the strobe pulses.
Figure 48:
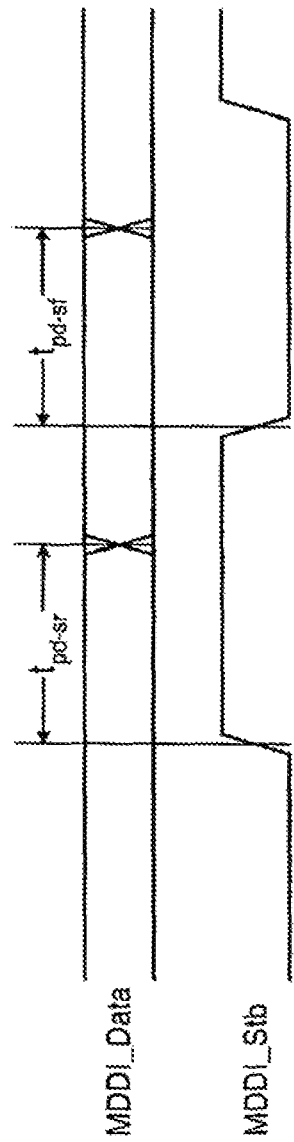
FIG. 48 illustrates switching characteristics and corresponding client output delay developed by the reverse data timing.

The switching characteristics and timing relationships for the data and strobe signals used to transfer data on the reverse link from the client driver output are shown in FIGS. 47, and 48. The typical times for certain signal transitions are discussed below. FIG. 47 illustrates the relationship at the host receiver input between the timing of the data being transferred and the leading and trailing edges of the strobe pulses. That is, what is referred to as the set-up time for the rising or leading edge of the strobe signals, $t_{su\text{-}sr}$ and the set-up time for the trailing or falling edge of the strobe signals, $t_{su\text{-}sf}$. A typical length of time for these set-up periods in on the order of a minimum of 8 nanoseconds.

FIG. 48 illustrates the switching characteristics and corresponding client output delay developed by the reverse data timing. In FIG. 48, one can see the relationship between the timing of the data being transferred and the leading and trailing edges of the strobe pulses accounting for induced delay. That is, what is referred to as the propagation delay between the rising or leading edge of the strobe signals and the data (valid), $t_{pd\text{-}sr}$, and the propagation delay between the data and the trailing or falling edge of the strobe signals, $t_{pd\text{-}sf}$. A typical maximum length of time for these propagation delay periods in on the order of 8 nanoseconds.

VIII. Implementation of Link Control (Link Controller Operation)

A. State Machine Packet Processor

Packets being transferred over a MDDI link are dispatched very rapidly, typically at a rate on the order of 300 Mbps or more, although lower rates are certainly accommodated, as desired. This type of bus or transfer link speed is too great for currently commercially available (economical) general-purpose microprocessors or the like to control. Therefore, a practical implementation to accomplish this type of signal transfer is to utilize a programmable state machine to parse the input packet stream to produce packets that are transferred or redirected to the appropriate audio-visual subsystem for which they are intended.

General purpose controllers, processors, or processing elements, can be used to more appropriately act upon or manipulate some information such as control or status packets, which have lower speed demands. When those packets (control, status, or other pre-defined packets) are received, the state machine should pass them through a data buffer or similar processing element to the general-purpose processor so the packets can be acted upon to provide a desired result (effect) while the audio and visual packets are transferred to their appropriate destination for action.

The general purpose processor function can be realized in some embodiments by taking advantage of the processing power, or excess cycles available for, microprocessors (CPUs) in computer applications, or processors, digital signal processors (DSPs), or ASICs found in wireless devices, in much the same manner as some modems or graphics processors utilize the processing power of CPUs in computers to perform some functions and reduce hardware complexity and costs. However, this can negatively impact the processing speed, timing, or overall operation of such elements, so in many applications, dedicated circuits or elements are preferred for this general processing.

Figure 49:
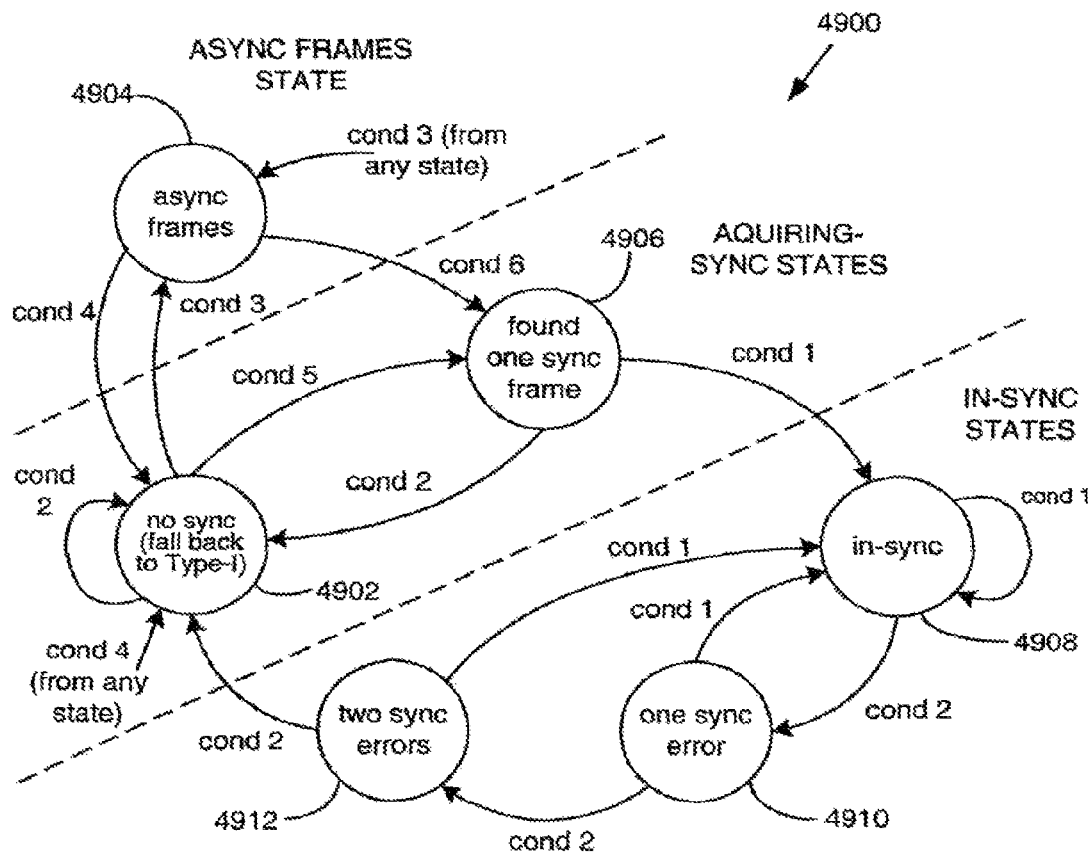
FIG. 49 illustrates a high level diagram of signal processing steps by which synchronization can be implemented for the present invention using a state machine.

In order for image data to be viewed on a display (microdisplay), or to reliably receive all packets sent by the host, the display signal processing must be synchronized with the forward link channel timing. That is, signals arriving at the display and the display circuits must be time synchronized for proper signal processing to occur. A high level diagram of states achieved by signal processing steps or a method by which such a synchronization can be implemented is presented in the illustration of FIG. 49. In FIG. 49, the possible forward link synchronization "states" for a state machine 4900 are shown being categorized as one Async Frames State 4904, two Acquiring Sync States 4902 and 4906, and three In-Sync States 4908, 4910, and 4912.

As shown by starting step or state 4902, the display starts in a pre-selected "no sync" state, and searches for a unique word in the first sub-frame header packet that is detected. It is to be noted that this no sync state represents the minimum communication setting or "fall-back" setting in which a Type I interface is selected. When the unique word is found during the search, the display saves the sub-frame length field. There is no checking of the CRC bits for processing on this first frame, or until synchronization is obtained. If this sub-frame length is zero, then sync state processing proceeds according to the method to state 4904 labeled here as the "async frames" state, which indicates that synchronization has not yet been achieved. This step in the processing is labeled as having encountered cond 3, or condition 3, in FIG. 49. Otherwise, if the frame length is greater than zero, then the sync state processing proceeds to a state 4906 where the interface state is set as "found one sync frame." This step in the processing is labeled as encountering cond 5, or condition 5, in FIG. 49. In addition, if the state machine sees a frame header packet and good CRC determination for a frame length greater than zero, processing proceeds to the "found one sync frame" state. This is labeled as meeting cond 6, or condition 6, in FIG. 49.

In each situation in which the system is in a state other than "no sync", when the unique word is detected and a good CRC result is determined for the sub-frame header packet, and the sub-frame length is greater than zero, then the interface state is changed to the "in-sync" state 4908. This step in the processing is labeled as having encountered cond 1, or condition 1, in FIG. 49. On the other hand, if either the unique word or the CRC in the sub-frame Header Packet are not correct, then the sync state processing proceeds or returns to the interface state 4902 of "no sync frame" state. This portion of the processing is labeled as encountering cond 2, or condition 2, in the state diagram of FIG. 49.

B. Acquisition Time for Sync

The interface can be configured to accommodate a certain number of "sync errors" prior to deciding that synchronization is lost and returning to the "no sync frame" state. In FIG. 49, once the state machine has reached the "in-sync state" and no errors are found, it is continuously encountering a cond 1 result, and remains in the "in-sync" state. However once one cond 2 result is detected, processing changes the state to a "one-sync-error" state 4910. At this point, if processing results in detecting another cond 1 result, then the state machine returns to the "in-sync" state, otherwise it encounters another cond 2 result, and moves to a "two-sync-errors" state 4912. Again, if a cond 1 occurs, processing returns the state machine to the "in-sync" state. Otherwise, another cond 2 is encountered and the state machine returns to the "no-sync" state. It is also obvious that encountering a "link shutdown packet" will cause the link to terminate data transfers and return to the "no-sync frame" state as there is nothing to synchronize with, which is referred to as meeting cond 4, or condition 4, in the state diagram of FIG. 49.

It is understood that it is possible for there to be a repeating "false copy" of the unique word which may appear at some fixed location within the sub-frame. In that situation, it is highly unlikely that the state machine will synchronize to the sub-frame because the CRC on the sub-frame Header Packet must also be valid when processed in order for the MDD interface processing to proceed to the "in sync" state.

The sub-frame length in the sub-frame Header Packet may be set to zero to indicate that the host will transmit only one sub-frame before the link is shut down, and the MDD interface is placed in or configured into an idle hibernation state. In this case, the display must immediately receive packets over the forward link after detecting the sub-frame Header Packet because only a single sub-frame is sent before the link transitions to the idle state. In normal or typical operations, the sub-frame length is non-zero and the display only processes forward link packets while the interface is in those states collectively shown as "IN_SYNC" states in FIG. 49.

The time required for a display to synchronize to the forward link signal is variable depending on the sub-frame size and the forward link data rate. The likelihood of detecting a "false copy" of the unique word as part of the random, or more random, data in the forward link is greater when the sub-frame size is larger. At the same time, the ability to recover from a false detection is lower, and the time taken to do so is longer, when a forward link data rate is slower.

C. Initialization

As stated earlier, at the time of "start-up", the host configures the forward link to operate at or below a minimum required, or desired, data rate of 1 Mbps, and configures the sub-frame length and media-frame rate appropriately for a given application. That is, both the forward and reverse links begin operation using the Type-I interface. These parameters are generally only going to be used temporarily while the host determines the capability or desired configuration for the client display (or other device). The host sends or transfers a sub-frame Header Packet over the forward link followed by a Reverse Link Encapsulation Packet which has bit '0' of the Request Flags set to a value of one (1), in order to request that the display responds with a Display Capability Packet. Once the display acquires synchronization on (or with) the forward link, it sends a Display Capability Packet and a Display Request and Status Packet over the reverse link or channel.

The host examines the contents of the Display Capability Packet in order to determine how to reconfigure the link for optimal or a desired level of performance. The host examines the Protocol Version and Minimum Protocol Version fields to confirm that the host and display use versions of the protocol that are compatible with each other. The protocol versions remain as the first two parameters of the display capability Packet so that compatibility can be determined even when other elements of the protocol might not be compatible or completely understood as being compatible.

D. CRC Processing

For all packet types, the packet processor state machine ensures that the CRC checker is controlled appropriately or properly. It also increments a CRC error counter when a CRC comparison results in one or more errors being detected, and it resets the CRC counter at the beginning of each sub-frame being processed.

IX. Packet Processing

For each type of packet discussed above that the state machine receives, it undertakes a particular processing step or series of steps to implement operation of the interface. Forward link packets are generally processed according to the exemplary processing listed in Table XII below.

TABLE XII

| Packet type | Packet processor state machine response |
|---|---|
| Sub-Frame Header (SH) | Confirms good packet, captures sub-frame length field, and sends packet parameters to a general purpose processor. |
| Filler (F) | Ignores data. |
| Video Stream (VS) | Interprets the Video Data Format Descriptor and other parameters, unpacks packed pixel data when necessary, translates pixels through the color map if necessary, and writes pixel data to appropriate locations in the bitmap. |
| Audio Stream (AS) | Sends audio sample rate setting to audio sample clock generator, separates audio samples of specified size, unpacks audio sample data when necessary, and routes audio samples to appropriate audio sample FIFO |
| Color Map (CM) | Reads color map size and offset parameters, and writes the color map data to a color map memory or storage location. |
| Reverse Link Encapsulation (REL) | Facilitates sending packets in reverse direction at the appropriate time. Reverse link flags are examined, and Display Capability packets are sent as necessary. Display Request and Status packets are also sent as appropriate. |
| Display Capability (DC) | Sends this type of packet when requested by a host using the reverse link flags field of the Reverse Link Encapsulation Packet. |
| Keyboard (K) | Passes these packets to and from a general purpose processor that communicates with a keyboard type device, if one is present, and use is desired. |
| Pointing Device (PD) | Passes these packets to and from a general purpose processor that communicates with a pointing type device, if one is present, and use is desired. |
| Link Shutdown (LS) | Records fact link is shut down and informs a general-purpose processor. |
| Display Service Request and Status (DSRS) | Sends this packet as the first packet in the Reverse Link Encapsulation packet. |
| Bit Block Transfer (BPT) | Interprets packet parameters, such as Video Data Format Descriptor, determines which pixels to move first, and moves pixels in bitmap as required. |
| Bitmap Area Fill (BAF) | Interprets packet parameters, translates pixels through color map if necessary, and writes pixel data to appropriate locations in bitmap, |
| Bitmap Pattern Fill (BPF) | Interprets packet parameters, unpacks packed pixel data if necessary, translates pixels through color map if necessary, and writes pixel data to appropriate locations in bitmap. |
| Communication Link Channel (CLC) | Sends this data directly to a general-purpose processor. |
| Display Service Request (DSR) during hibernation | General-purpose processor controls the low-level functions of sending request and detects contention with link restarting on its own. |
| Interface Type Handoff Request (ITHR) and Interface Type Acknowledge (ITA) | May pass these packets to and from the general-purpose processor. The logic to receive this type of packet and formulate a response with an acknowledgment is substantially minimal. Therefore, this operation could also be implemented within the packet processor state machine. The resulting handoff occurs as a low-level physical layer action and is not likely to affect the functionality or functioning of the general-purpose processor. |
| Perform Type Handoff (PTH) | May act on such packets either directly or by transferring them to the general-purpose processor, also commanding hardware to undergo a mode change. |

X. Reducing the Reverse Link Data Rate

Figure 50:
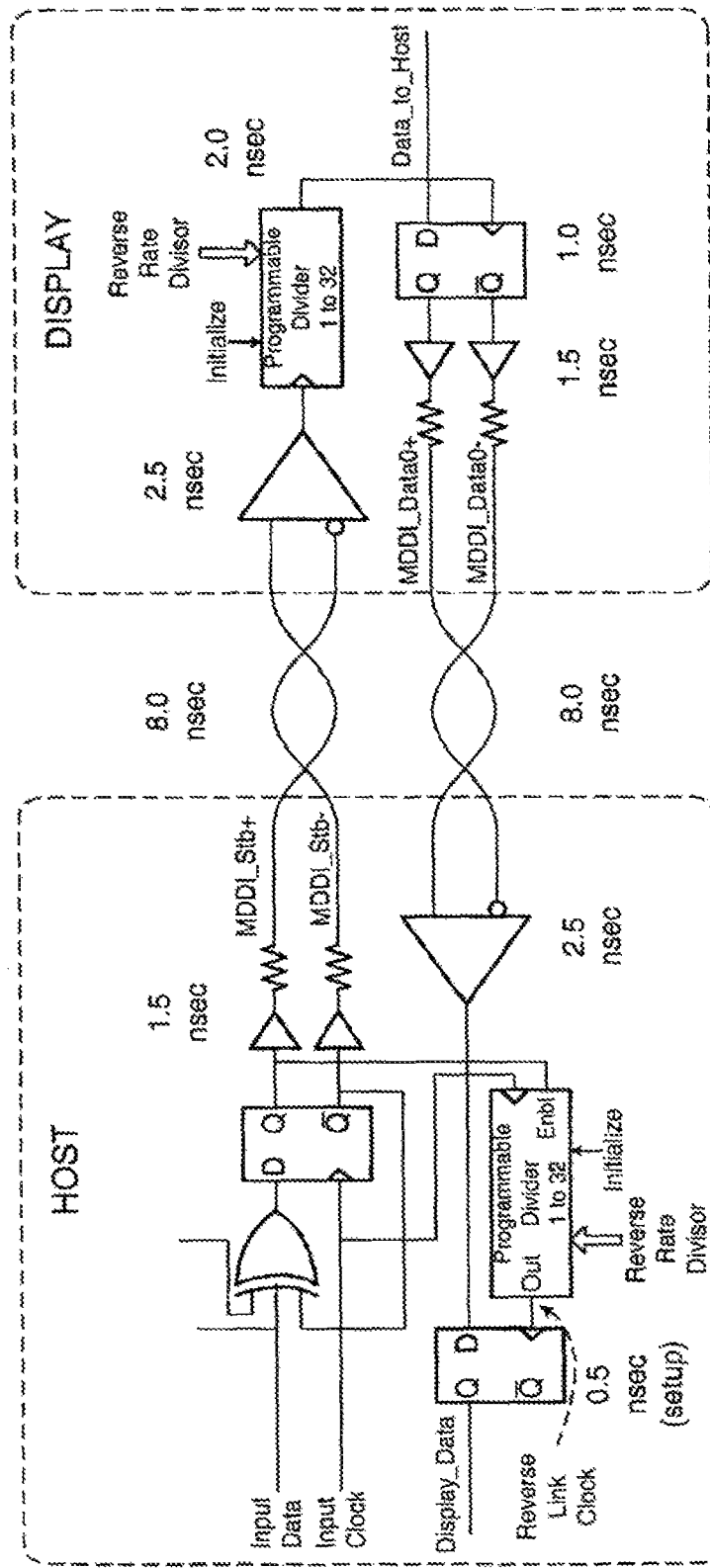
FIG. 50 illustrates typical amounts of delay encountered for signal processing on the forward and reverse paths in a system employing the MDDI.

It has been observed by the inventors that certain parameters used for the host link controller can be adjusted or configured in a certain manner in order to achieve a maximum or more optimized (scale) reverse link data rate, which is very desirable. For example, during the time used to transfer the Reverse Data Packets field of the Reverse Link Encapsulation Packet, the MDDI_Stb signal pair toggles to create a periodic data clock at half the forward link data rate. This occurs because the host link controller generates the MDDI_Stb signal that corresponds to the MDDI_Data0 signal as if it were sending all zeroes. The MDDI_Stb signal is transferred from the host to a display where it is used to generate a clock signal for transferring reverse link data from the display, with which reverse data is sent back to the host. An illustration of typical amounts of delay encountered for the signal transfer and processing on the forward and reverse paths in a system employing the MDDI, is shown in FIG. 50. In FIG. 50, a series of delay values 1.5 nsec., 8.0 nsec., 2.5 nsec., 2.0 nsec., 1.0 nsec., 1.5 nsec., 8.0 nsec., and 2.5 nsec., are shown near processing portions for the Stb+/− generation, cable transfer-to-display, display receiver, clock generation, signal clocking, Data0+/− generation, cable transfer-to-host, and host receiver stages, respectively.

Depending on the forward link data rate and signal processing delays encountered, it may require more time than one cycle on the MDDI_Stb signal for this "round trip" effect or set of events to be completed, which results in the consumption of undesirable amounts of time or cycles. To circumvent this problem, the Reverse Rate Divisor makes it possible for one bit time on the reverse link to span multiple cycles of the MDDI_Stb signal. This means that the reverse link data rate is less than the forward link rate.

It should be noted that the actual length of signal delays through the interface may differ depending on each specific host-client system or hardware being used. Each system can generally be made to perform better by using the Round Trip Delay Measurement Packet to measure the actual delay in a system so that the Reverse Rate Divisor can be set to an optimum value.

A round-trip delay is measured by having the host send a Round Trip Delay Measurement Packet to the display. The display responds to this packet by sending a sequence of ones back to the host inside of, or during, a pre-selected measurement window in that packet called the Measurement Period field. The detailed timing of this measurement was described previously. The round-trip delay is used to determine the rate at which the reverse link data can be safely sampled.

Figure 51:
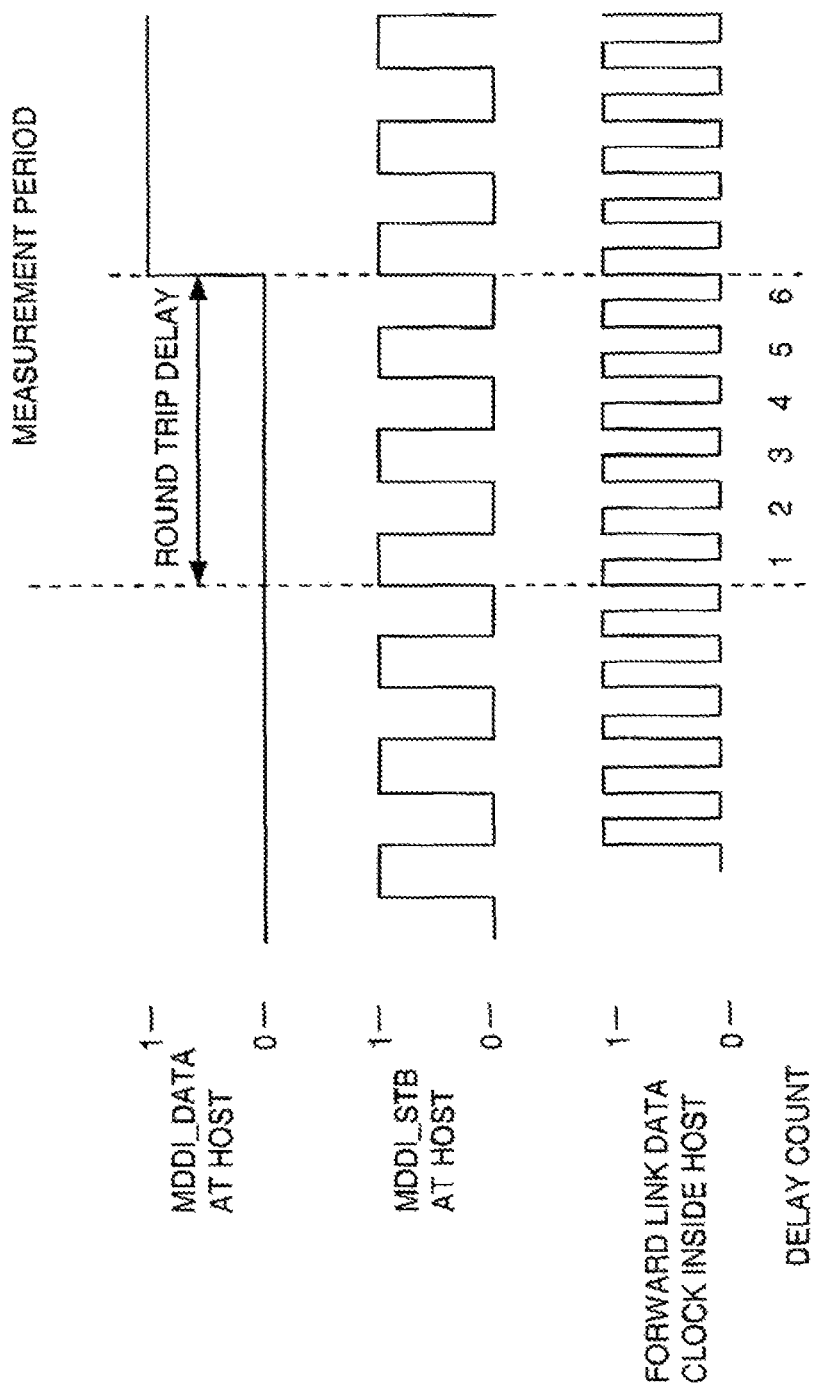
FIG. 51 illustrates marginal round trip delay measurement.

The round-trip delay measurement consists of determining, detecting, or counting the number of forward link data clock intervals occurring between the beginning of the Measurement Period field and the beginning of the time period when the 0xff, 0xff, 0x00 response sequence is received back at the host from the display. Note that it is possible that the response from the display could be received a small fraction of a forward link clock period before the measurement count was about to increment. If this unmodified value is used to calculate the Reverse Rate Divisor it could cause bit errors on the reverse link due to unreliable data sampling. An example of this situation is illustrated in FIG. 51, where signals representing MDDI_Data at host, MDDI_Stb at host, forward link data clock inside the host, and a Delay Count are illustrated in graphical form. In FIG. 51, the response sequence was received from the display a fraction of a forward link clock period before the Delay Count was about to increment from 6 to 7. If the delay is assumed to be 6 then the host will always sample the reverse data just after a bit transition or possibly in the middle of a bit transition. This could result in erroneous sampling at the host. For this reason, the measured delay should typically be incremented by one before it is used to calculate the Reverse Rate Divisor.

The Reverse Rate Divisor is the number of MDDI_Stb cycles the host should wait before sampling the reverse link data. Since MDDI_Stb is cycled at a rate that is one half of the forward link rate, the corrected round-trip delay measurement needs to be divided by 2 and then rounded up to the next integer. Expressed as a formula, this relationship is:

$$\text{reverse\_rate\_divisor} = RoundUpToNextInteger\left(\frac{\text{round\_trip\_delay} + 1}{2}\right)$$

For the example given, this becomes:

$$\text{reverse\_rate\_divisor} = RoundUpToNextInteger\left(\frac{6+1}{2}\right) = 4$$

If the round trip delay measurement used in this example were 7 as opposed to 6, then the Reverse Rate Divisor would also be equal to 4.

The reverse link data is sampled by the host on the rising edge of the Reverse Link Clock. There is a counter or similar known circuit or device present in both the host and client (display) to generate the Reverse Link Clock. The counters are initialized so that the first rising edge of the Reverse Link Clock occurs at the beginning of the first bit in the Reverse Link Packets field of the Reverse Link Encapsulation packet. This is illustrated, for the example given below, in FIG. 52. The counters increment at each rising edge of the MDDI_Stb signal, and the number of counts occurring until they wrap around is set by the Reverse Rate Divisor parameter in the Reverse Link Encapsulation Packet. Since the MDDI_Stb signal toggles at one half of the forward link rate, then the reverse link rate is one half of the forward link rate divided by the Reverse Rate Divisor. For example, if the forward link rate is 200 Mbps and the Reverse Rate Divisor is 4 then the reverse link data rate is expressed as:

$$\frac{1}{2} \cdot \frac{200 \text{ Mbps}}{4} = 25 \text{ Mbps}$$

Figure 52:
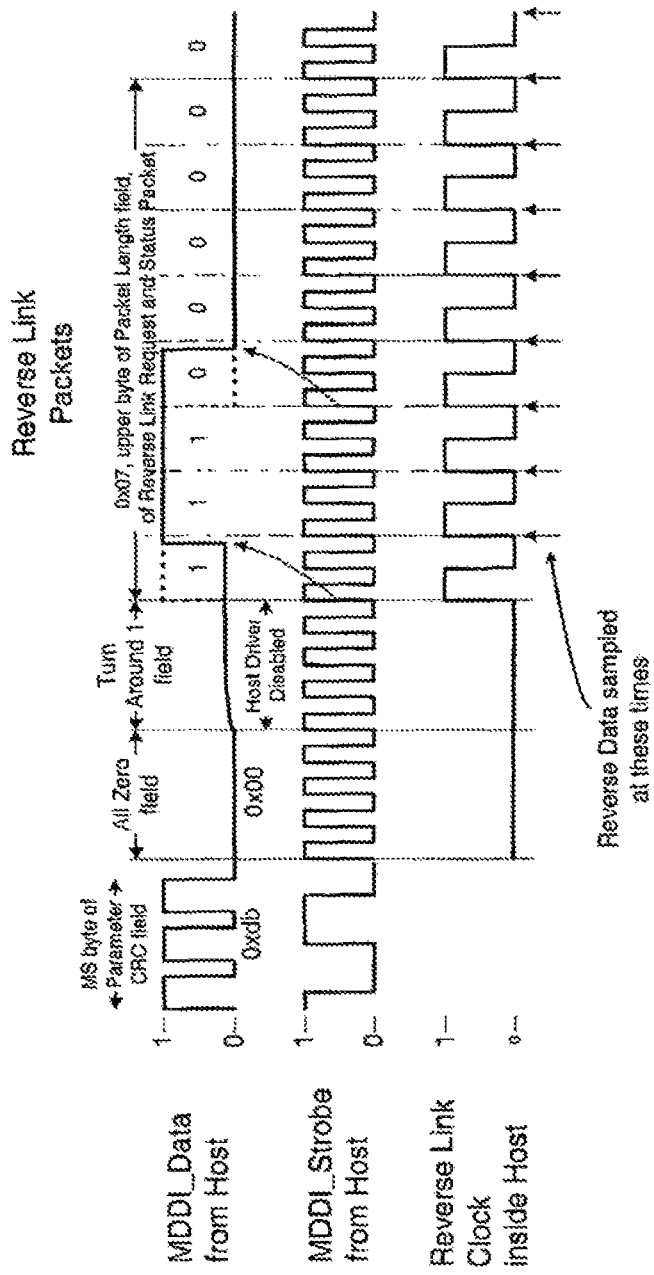
FIG. 52 illustrates Reverse Link data rate changes.

An example showing the timing of the MDDI_Data0 and MDDI_Stb signal lines in a Reverse Link Encapsulation Packet is shown in FIG. 52, where the packet parameters used for illustration have the values:

| | |
|---|---|
| Packet Length = 1024 (0x0400) | Turn Around 1 Length = 1 |
| Packet Type = 65 (0x41) | Turn Around 2 Length = 1 |
| Reverse Link Flags = 0 | Reverse Rate Divisor = 2 |
| Parameter CRC = 0xdb43 | All Zero is 0x00 |

Packet data between the Packet Length and Parameter CRC fields is:
0x00, 0x04, 0x41, 0x00, 0x02, 0x01, 0x01, 0x43, 0xdb, 0x00, . . .

The first reverse link packet returned from the display is the Display Request and Status Packet having a Packet Length of 7 and a packet type of 70. This packet begins with the byte values 0x07, 0x00, 0x46, . . . and so forth. However, only the first byte (0x07) is visible in FIG. 52. This first reverse link packet is time-shifted by nearly one reverse link clock period in the figure to illustrate an actual reverse link delay. An ideal waveform with zero host to display round-trip delay is shown as a dotted-line trace.

The MS byte of the Parameter CRC field is transferred, preceded by packet type, then the all zero field. The strobe from the host is switching from one to zero and back to one as the data from the host changes level forming wider pulses. As the data goes to zero, the strobe switches at the higher rate, only the change in data on the data line causes a change near the end of the alignment field. The strobe switches at the higher rate for the remainder of the figure due to the fixed 0 or 1 levels of the data signal for extended periods of time, and the transitions falling on the pulse pattern (edge).

The reverse link clock for the host is at zero until the end of the Turn Around 1 period, when the clock is started to accommodate the reverse link packets The arrows in the lower portion of the figure indicate when the data is sampled, as would be apparent from the remainder of the disclosure. The first byte of the packet field being transferred (here 11000000) is shown commencing after Turn Around 1 and the line level has stabilized from the host driver being disabled. The delay in the passage of the first bit, and as seen for bit three, can be seen in the dotted lines for the Data signal.

Figure 53:
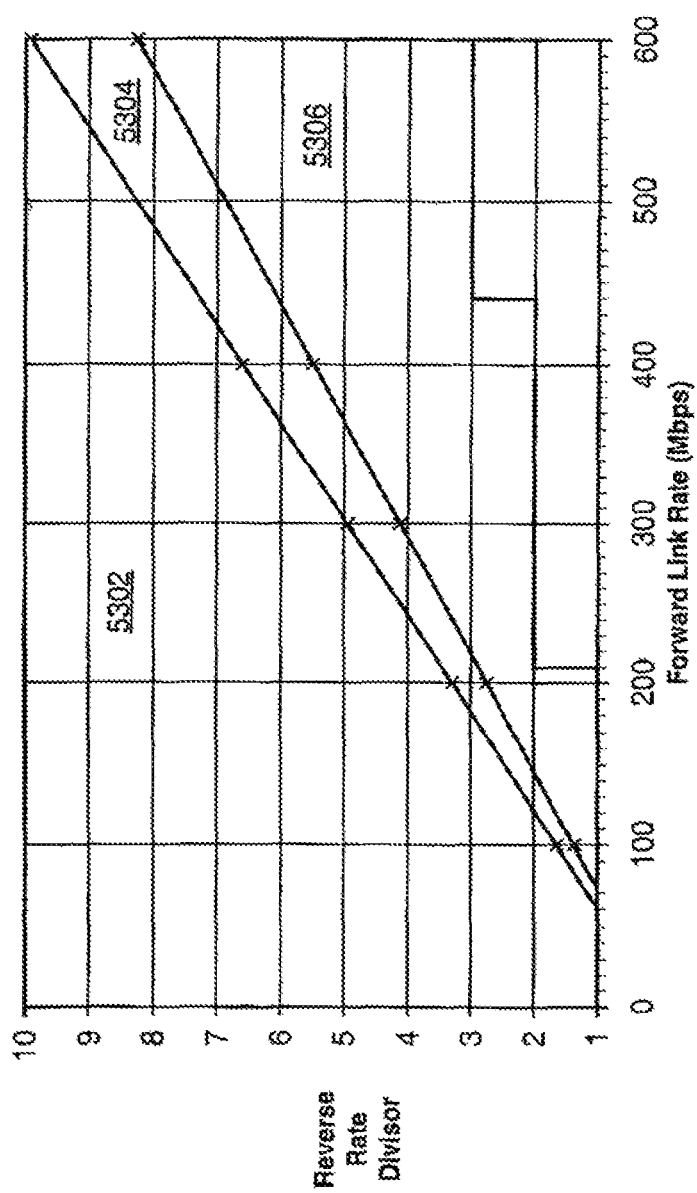
FIG. 53 illustrates a graphical representation of values of the Reverse Rate Divisor versus forward link data rate.

In FIG. 53, one can observe typical values of the Reverse Rate Divisor based on the forward link data rate. The actual Reverse Rate Divisor is determined as a result of a round-trip link measurement to guarantee proper reverse link operation. A first region 5302 corresponds to an area of safe operation, a second region 5304 corresponds to an area of marginal performance, while a third region 5306 indicates settings that are unlikely to function properly.

The round-trip delay measurement and Reverse Rate Divisor setting are the same while operating with any Interface Type setting on either the forward or reverse link because they are expressed and operated on in terms of units of actual clock periods rather than numbers of bits transmitted or received.

XI. Turn-Around and Guard Times

As discussed earlier, the Turn Around 1 field in the Reverse Link Encapsulation Packet and the Guard Time 1 field in the Round Trip Delay Measurement Packet designate values for lengths of time that allow for the host interface drivers to be disabled before the display interface drivers are enabled. Turn Around 2 and Guard Time 2 fields provide time values which allow the display drivers to be disabled before the host drivers are enabled. The Guard Time 1 and Guard Time 2 fields are generally filled with pre-set or pre-selected values for lengths that are not meant to be adjusted. Depending on the interface hardware being used, these values may be developed using empirical data and adjusted in some instances to improve operation.

Several factors contribute to a determination of the length of Turn Around 1 and these are the forward link data rate, and the maximum disable time of the MDDI_Data drivers in the host. The maximum host driver disable time is specified in Table XI, where it shows that the drivers take about 10 nsec. maximum to disable and about 2 nsec. to enable. The minimum number of forward link clocks required for the host driver to be disabled is expressed according to the relationship:

$$\text{Clocks\_to\_disable}_{TA1} = \frac{ForwardLinkDataRate}{InterfaceTypeFactor_{FWD}} \cdot HostDriverDisableDelay_{max}$$

The allowed value range of Turn Around 1 is expressed according to the relationship:

$$\text{Turn\_Around\_1} \geq \text{RoundUpToNextInteger}\left(\frac{\text{Clocks\_to\_disable}_{TA1}}{8} \cdot \text{InterfaceTypeFactor}_{FWD}\right)$$

where the Interface Type Factor is 1 for Type-I, 2 for Type-II, 4 for Type-III, and 8 for Type-IV.

Combining the two equations from above, one can see that the Interface Type Factor term cancels out, and Turn Around 1 is defined as:

$$\text{Turn\_Around\_1} = \text{RoundUpToNextInteger}\left(\frac{\text{ForwardLinkDataRate} \cdot \text{HostDriverDisableDelay}_{max}}{8}\right)$$

For example, a 1500 Mbps Type-III forward link would use a Turn Around 1 delay of:

$$\text{Turn\_Around\_1} = \text{RoundUpToNextInteger}\left(\frac{1500 \text{ Mbps} \cdot 10 \text{ nsec}}{8}\right)$$

$$= 2 \text{ Bytes}$$

As the round trip delay increases, the timing margin improves from the point in time when the host is disabled to the time the display is enabled.

The factors that determine the length of time generally used for Turn Around 2 are the forward link data rate, the maximum disable time of the MDDI_Data drivers in the display, and the round-trip delay of the communication link. The calculation of the time required to disable the display driver is essentially the same as that for the host driver discussed above, and is defined according to the relationship:

$$\text{Clocks\_to\_disable}_{TA2} = \frac{\text{ForwardLinkDataRate}}{\text{InterfaceTypeFactor}_{FWD}} \cdot \text{DisplayDriverDisableDelay}_{max}$$

and the allowed value range for Turn Around 2 is expressed as:

$$\text{Turn\_Around\_2} \geq$$

$$\text{RoundUpToNextInteger}\left(\frac{\text{Clocks\_to\_disable}_{TA2} + \text{round\_trip\_delay} + 1}{8 \cdot \left(\frac{8}{\text{InterfaceTypeFactor}_{FWD}}\right)}\right)$$

For example, a 1500 Mbps Type-III forward link with a round-trip delay of 10 forward link clocks typically uses a Turn Around 2 delay on the order of:

$$\text{Clocks\_to\_disable}_{TA2} = \frac{1500 \text{ Mbps}}{4} \cdot 10 \text{ nsec} = 3.75$$

$$\text{Turn\_Around\_2} \geq \text{RoundUpToNextInteger}\left(\frac{3.75 + 10 + 1}{\left(\frac{8}{4}\right)}\right) = 8$$

XII. Effects of Link Delay and Skew

Delay skew on the forward link between the MDDI_Data pairs and MDDI_Stb can limit the maximum possible data rate unless delay skew compensation is used. The differences in delay that cause timing skew are due to the controller logic, the line drivers and receivers, and the cable and connectors as outlined below.

A. Link Timing Analysis Limited by Skew (MDDI Type-I)

1. Delay and Skew Example of a Type-I Link

Figure 57:
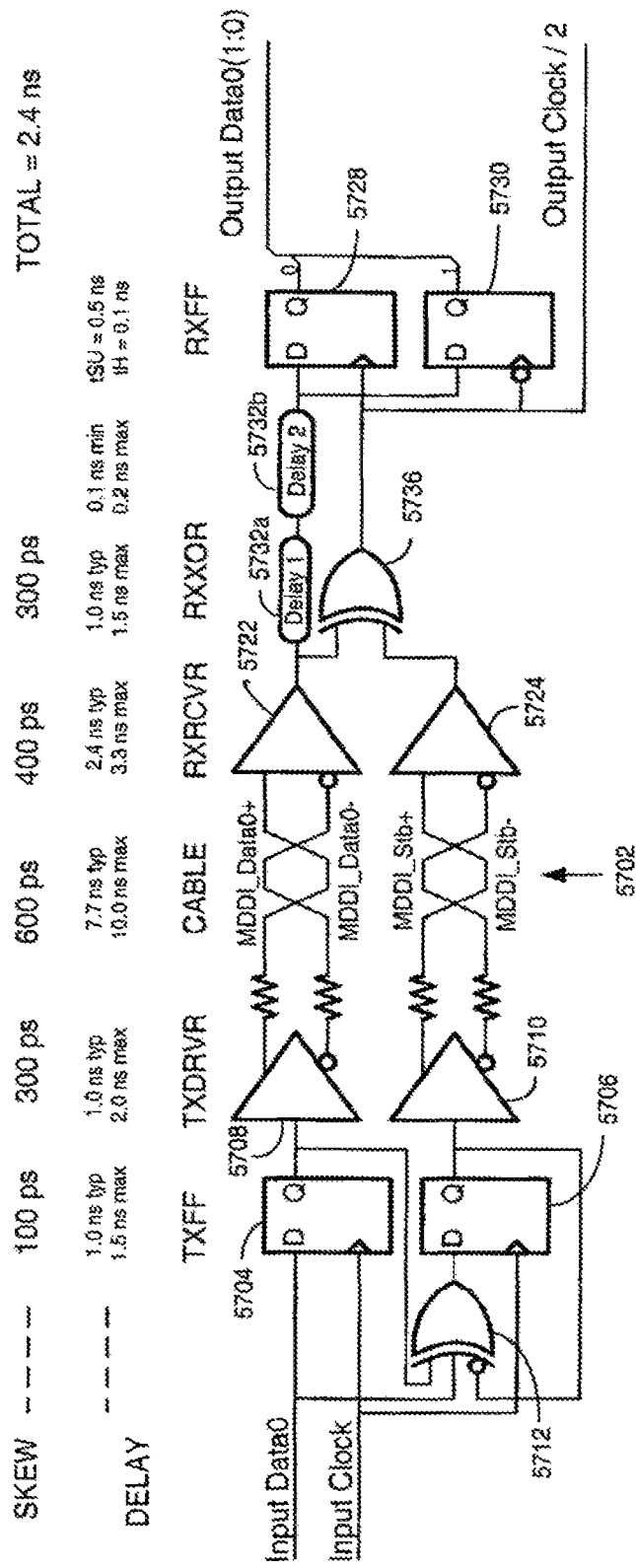
FIG. 57 illustrates typical values for propagation delay and skew in an Type-I Link interface.

A typical interface circuit similar to that shown in FIG. 41, is shown in FIG. 57 for accommodating a Type-I interface link. In FIG. 57, exemplary or typical values for propagation delay and skew are shown for each of several processing or interface stages of an MDDI Type-I forward link. Skew in the delay between MDDI_Stb and MDDI_Data0 causes the duty-cycle of the output clock to be distorted. Data at the D input of the receiver flip-flop (RXFF) stage using flip-flops 5728, 5732, must change slightly after the clock edge so that it can be sampled reliably. The figure shows two cascaded delay lines 5732a and 5732b being used to solve two different problems with creating this timing relationship. In the actual implementation these may be combined into a single delay element.

Figure 58:
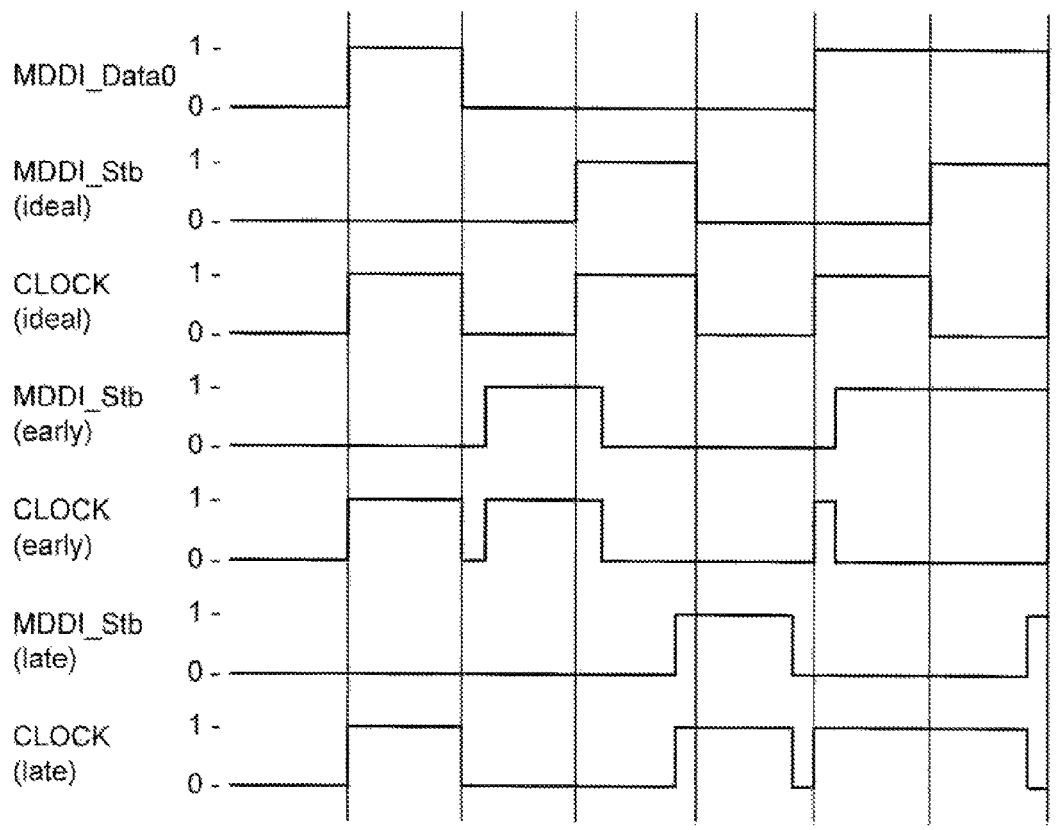
FIG. 58 illustrates Data, Stb, and Clock Recovery Timing on a Type-I Link for exemplary signal processing through the interface.

Data, Stb, and Clock Recovery Timing on a Type-I Link for exemplary signal processing through the interface are illustrated in FIG. 58.

The total delay skew that is significant generally arises or comes from the sum of the skew in the following stages: transmitter flip-flop (TXFF) with flip-flops 5704, 5706; transmitter driver (TXDRVR) with drivers 5708, 5710; the CABLE 5702; receiver line receiver (RXRCVR) with receivers 5722, 5724; and receiver XOR logic (RXXOR). Delay1 5732a should match or exceed the delay of the XOR gate 5736 in the RXXOR stage which is determined by the relationship:

$$t_{PD\text{-}min(Delay\ 1)} \geq t_{PD\text{-}max(XOR)}$$

It is desirable to meet this requirement so that the D input of receiver flip-flop 5728, 5732 does not change before its clock input. This is valid if the hold-time of RXFF is zero.

The purpose or function of Delay2 is to compensate for the hold-time of the RXFF flip-flop according to the relationship:

$$t_{PD-min(Delay2)} = t_{H(RXFF)}$$

In many systems this will be zero because the hold time is zero, and of course in that case the maximum delay of Delay2 can also be zero.

The worst-case contribution to skew in the receiver XOR stage is in the data-late/strobe-early case where Delay1 is at a maximum value and the clock output from the XOR gate comes as early as possible according to the relationship:

$$t_{SKEW-max(RXXOR)} = t_{PD-max(Delay1)} - t_{PD-min(XOR)}$$

In this situation, the data may change between two bit periods, n and n+1, very close to the time where bit n+1 is clocked into the receiver flip-flop.

The maximum data rate (minimum bit period) of an MDDI Type-I link is a function of the maximum skew encountered through all the drivers, cable, and receivers in the MDDI link plus the total data setup into the RXFF stage. The total delay skew in the link up to the output of the RXRCVR stage can be expressed as:

$$t_{SKEW-max(LINK)} = t_{SKEW-max(TXFF)} + t_{SKEW-max(TXDRVR)} + t_{SKEW-max(CABLE)} + t_{SKEW-max(RXRCVR)}$$

and the minimum bit period is given by:

$$t_{BIT-min} = t_{SKEW-max(LINK)} + t_{SKEW-max(RXXOR)} + t_{PD-max(Delay2)} + t_{SU(RXFF)}$$

In the example shown in FIG. 57, $t_{SKEW-max(LINK)} = 1.4$ nsec and the minimum bit period can be expressed as:

$$t_{BIT-min} = 1.4 + 0.3 + 0.2 + 0.5 = 2.4 \text{ nsec, or stated as approximately 416 Mbps.}$$

B. Link Timing Analysis for MDDI Type-II, III, and IV

Figure 59:
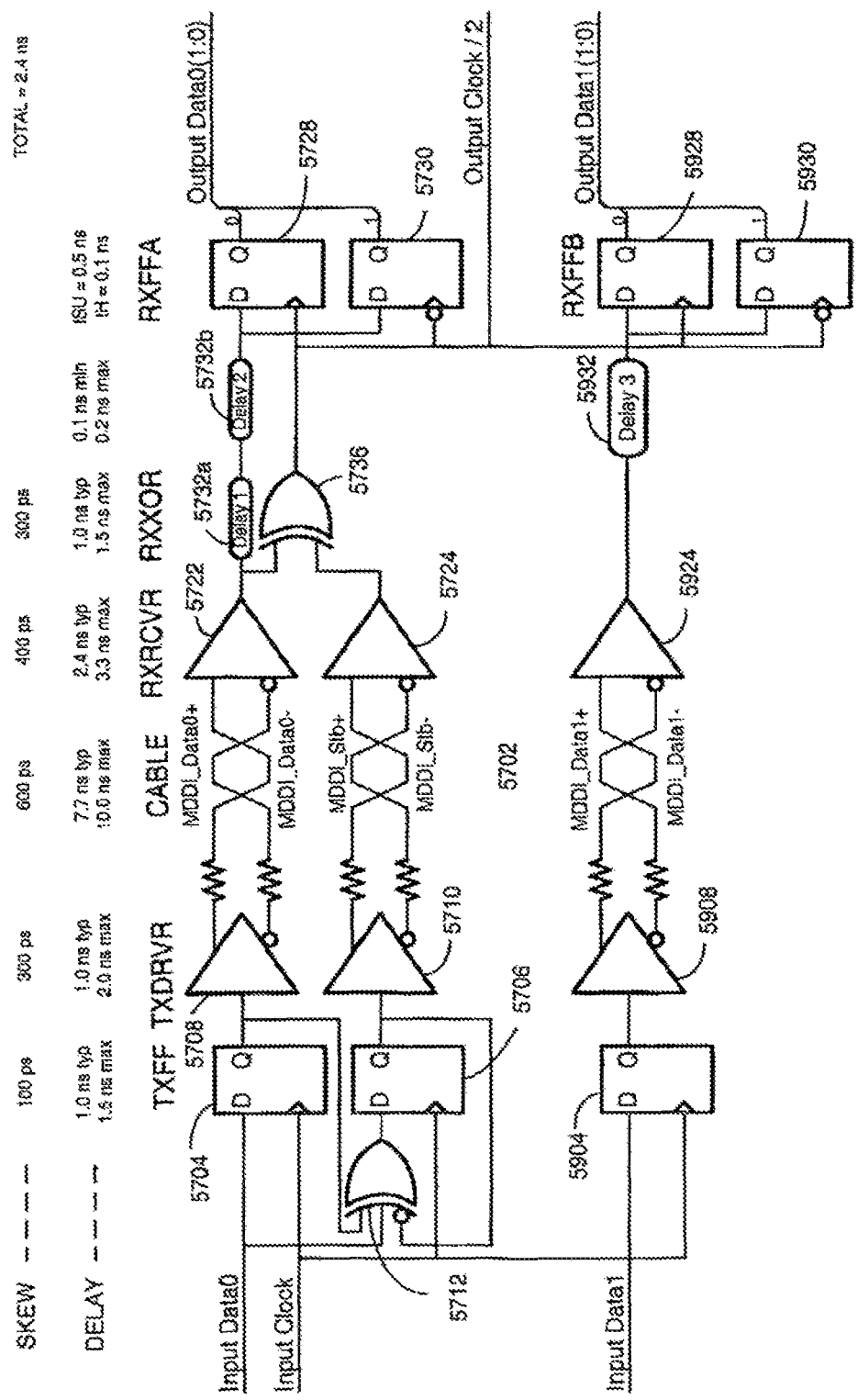
FIG. 59 illustrates typical values for propagation delay and skew in Type-II, Type-III or Type-IV Link interfaces.
Figure 60A:
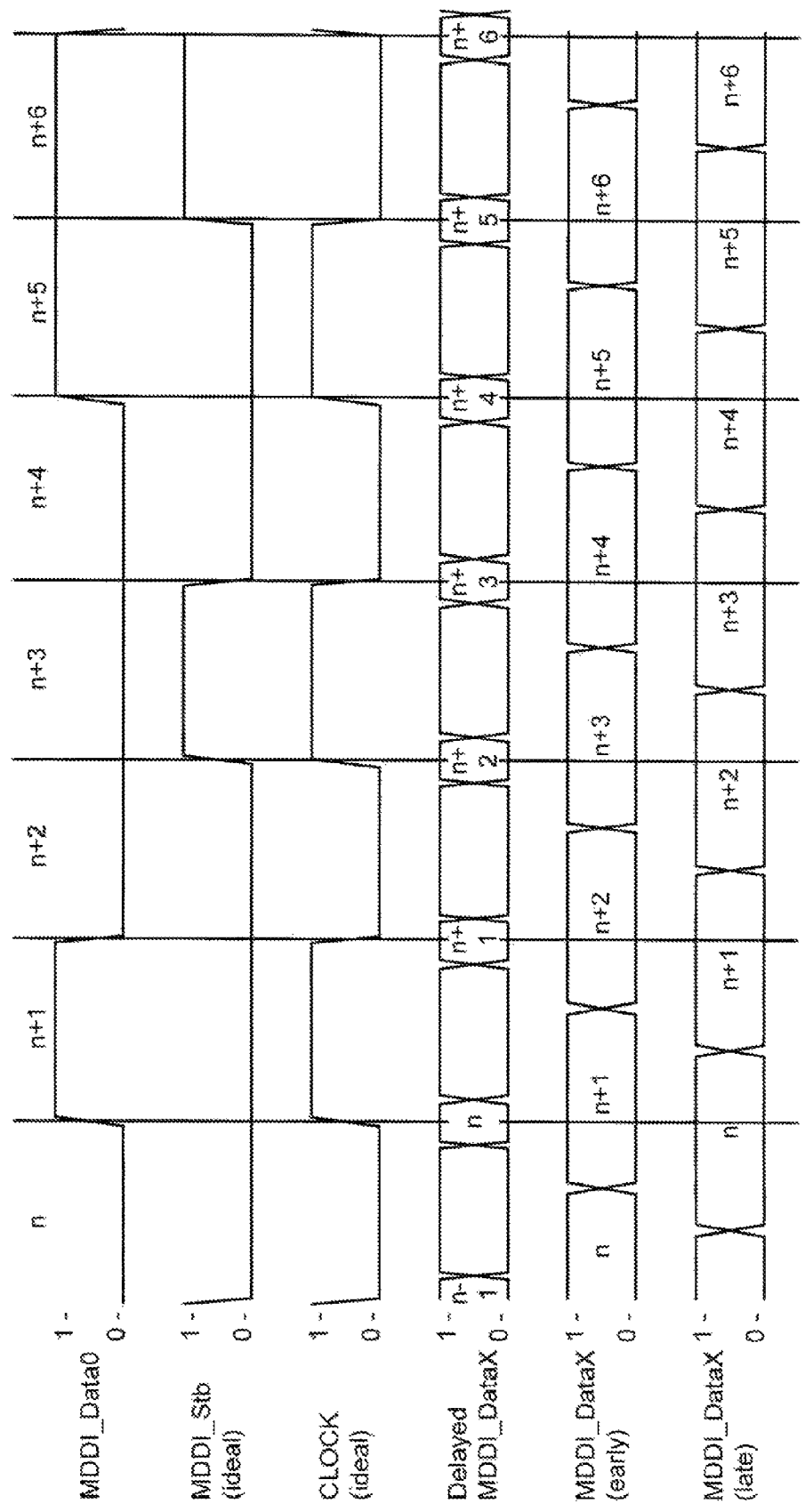
FIGS. 60a, 60b, and 60c illustrate different possibilities for the timing of two data signals and MDDI_Stb with respect to each other, being ideal, early, and late, respectively.
Figure 60B:
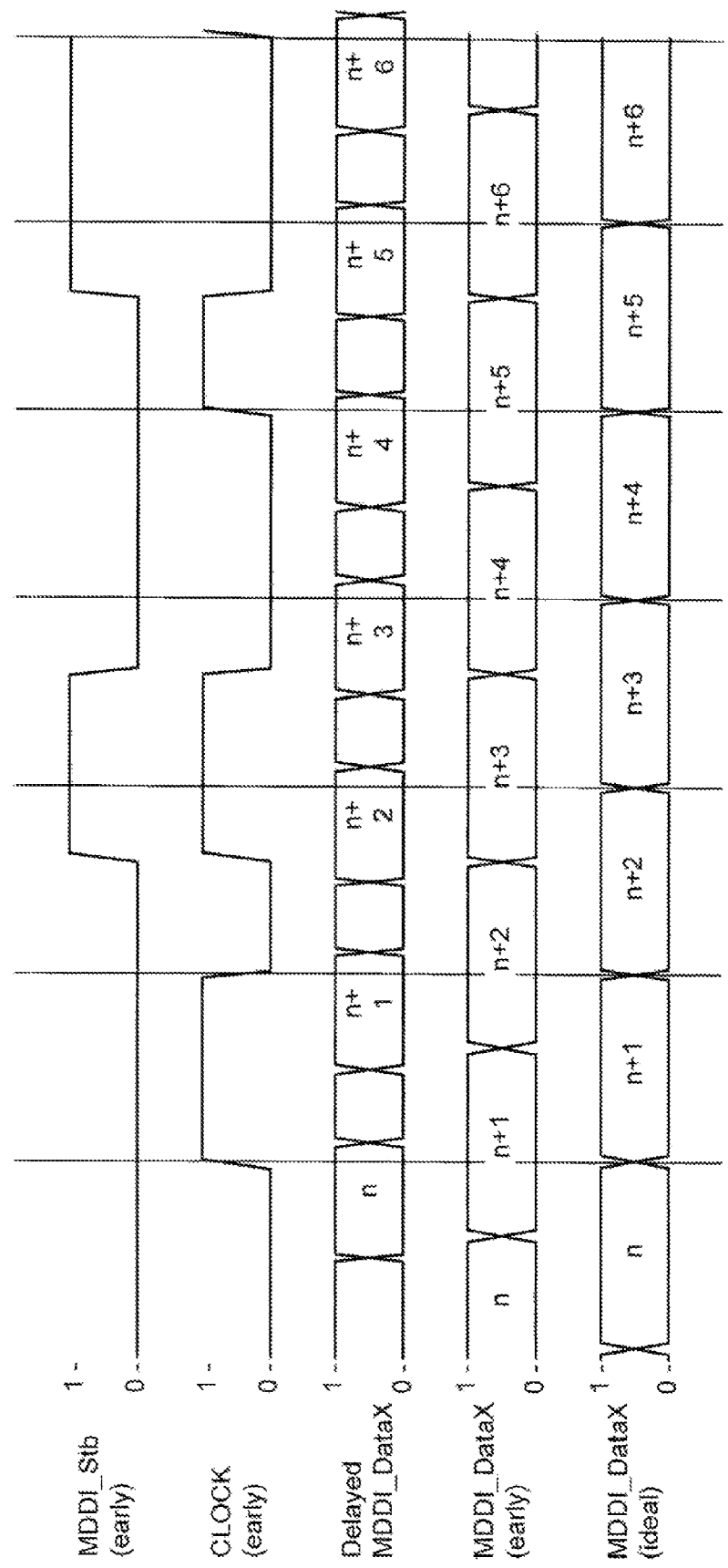
Figure 60C:
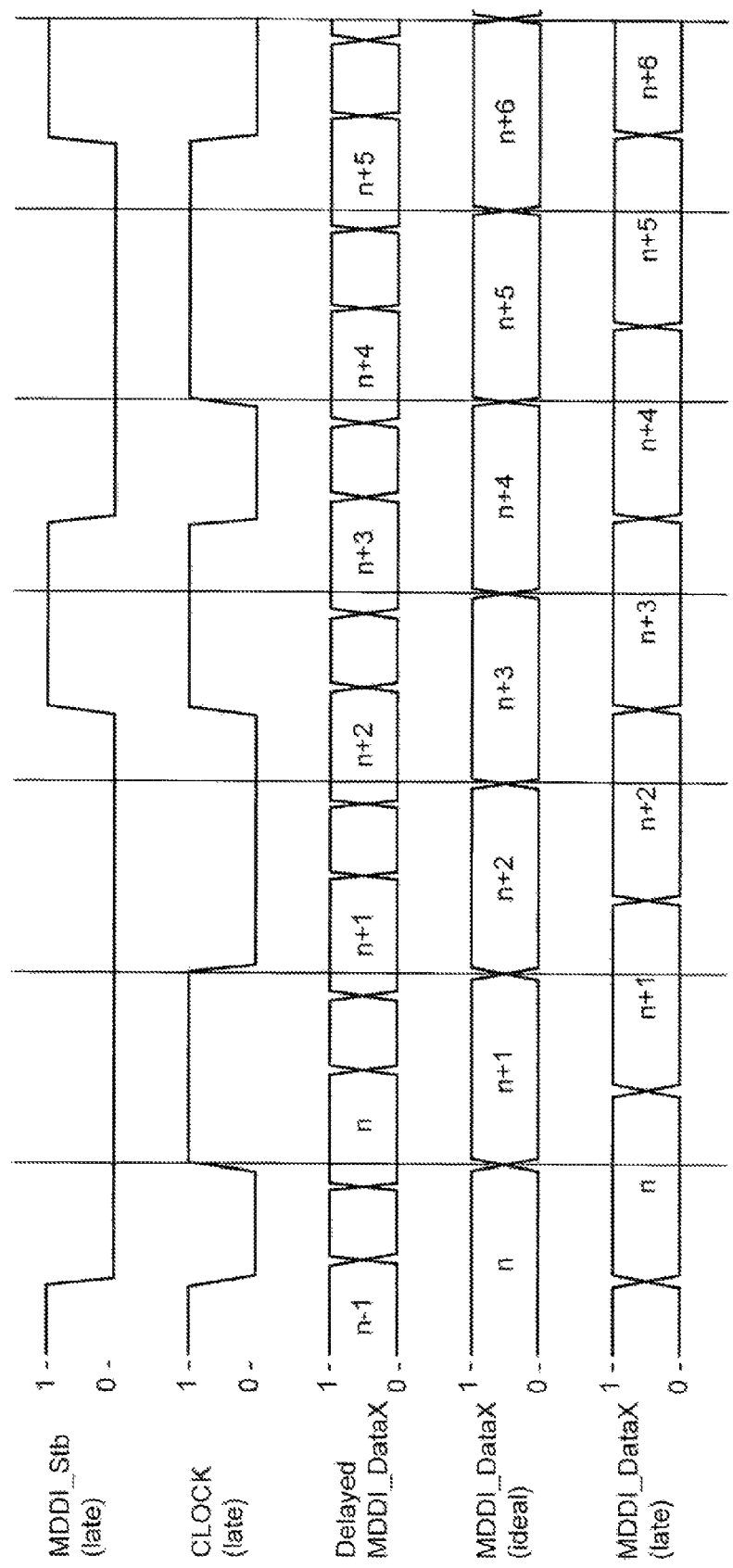

A typical interface circuit similar to that shown in FIGS. 41 and 57, is shown in FIG. 59 for accommodating Type-II, III, and IV interface links. Additional elements are used in the TXFF (5904), TXDRVR (5908), RXRCVR (5922), and RXFF (5932, 5928, 5930) stages to accommodate the additional signal processing. In FIG. 59, exemplary or typical values for propagation delay and skew are shown for each of several processing or interface stages of an MDDI Type-II forward link. In addition to skew in the delay between MDDI_Stb and MDDI_Data0 affecting the duty-cycle of the output clock, there is also skew between both of these two signals and the other MDDI_Data signals. Data at the D input of the receiver flip-flop B (RXFFB) stage consisting of flip-flops 5928 and 5930, is changed slightly after the clock edge so it can be sampled reliably. If MDDI_Data1 arrives earlier than MDDI_Stb or MDDI_Data0 then MDDI_Data1 should be delayed to be sampled by at least the amount of the delay skew. To accomplish this, data is delayed using the Delay3 delay line. If MDDI_Data1 arrives later than MDDI_Stb and MDDI_Data0 and it is also delayed by Delay3 then the point where MDDI_Data1 changes is moved closer to the next clock edge. This process determines an upper limit of the data rate of an MIDI Type-II, III, or IV link. Some exemplary different possibilities for the timing or skew relationship of two data signals and MDDI_Stb with respect to each other is illustrated in FIGS. 60*a*, 60*b*, and 60*c*.

In order to sample data reliably in RXFFB when MDDI_DataX arrives as early as possible, Delay3 is set according to the relationship:

$$t_{PD-min(Delay3)} \geq t_{SKEW-max(LINK)} + t_{H(RXFFB)} + t_{PD-max(XOR)}$$

The maximum link speed is determined by the minimum allowable bit period. This is most affected when MDDI_DataX arrives as late as possible. In that case, the minimum allowable cycle time is given by:

$$t_{BIT-min} = t_{SKEW-max(LINK)} + t_{PD-max(Delay3)} + t_{SU(RXFFB)} - t_{PD-min(XOR)}$$

The upper bound of link speed is then:

$$t_{PD-max(Delay3)} = t_{PD-min(Delay3)}$$

and given that assumption:

$$t_{BIT-min(lower-bound)} = 2 \cdot t_{SKEW-max(LINK)} + t_{PD-max(XOR)} + t_{SU(RXFFB)} + t_{H(RXFFB)}$$

In the example given above, the lower bound of the minimum bit period is given by the relationship:

$$t_{BIT-min(lower-level)} = 2 \cdot 1.4 + 1.5 + 0.5 + 0.1 = 4.8 \text{ nsec, which is approximately 208 Mbps.}$$

This is much slower than the maximum data rate that can be used with a Type-I link. The automatic delay skew compensation capability of MDDI significantly reduces the affect that delay skew has on the maximum link rate.

XIII. Physical Layer Interconnection Description

Figure 61:
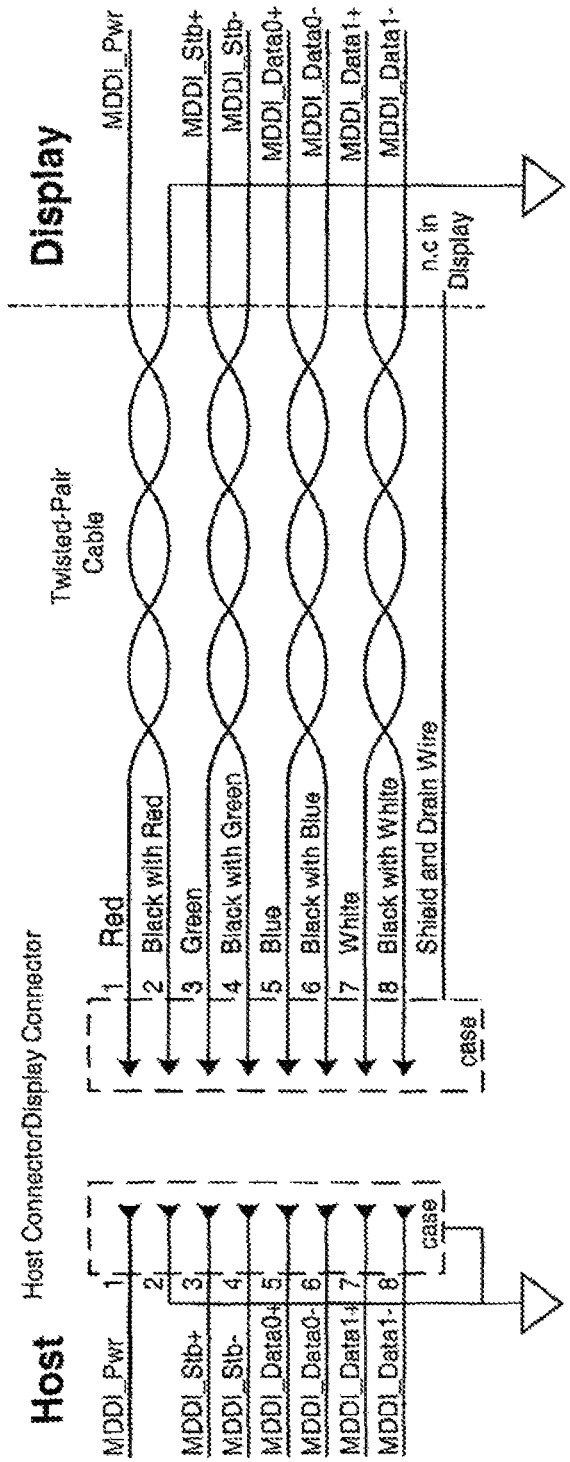
FIG. 61 illustrates interface pin assignments exemplary connectors used with a Type-I/Type-II interfaces.

Physical connections useful for implementing an interface according to the present invention can be realized using commercially available parts such as part number 3260-8S2(01) as manufactured by Hirose Electric Company Ltd. on the host side, and part number 3240-8P-C as manufactured by Hirose Electric Company Ltd. on the display device side. An exemplary interface pin assignment or "pinout" for such connectors used with a Type-I/Type-II interfaces is listed in Table XIII, and illustrated in FIG. 61.

TABLE XIII

| Signal Name | Pin Number | Color | Signal Name | Pin Number | Color |
|---|---|---|---|---|---|
| MDDI_Pwr | 1 | Red | MDDI_Gnd | 2 | Black paired w/Red |
| MDDI_Stb+ | 3 | Green | MDDI_Stb− | 4 | Black paired w/Green |
| MDDI_Data0+ | 5 | Blue | MDDI_Data0− | 6 | Black paired w/Blue |
| MDDI_Data1+ | 7 | White | MDDI_Data1− Shield | 8 | Black paired w/White |

The shield is connected to the MDDI_Gnd in the host interface, and a shield drain wire in the cable is connected to the shield of the display connector. However, the shield and drain wire are not connected to the circuit ground inside of a display.

Interconnection elements or devices are chosen or designed in order to be small enough for use with mobile communication and computing devices, such as PDAs and wireless telephones, or portable game devices, without being obtrusive or unaesthetic in comparison to relative device size. Any connectors and cabling should be durable enough for use in the typical consumer environment and allow for small size, especially for the cabling, and relatively low cost. The transfer elements should accommodate data and strobe signals that are differential NRZ data having a transfer rate up to around 450 Mbps for Type I and Type II and up to 3.6 Gbps for the 8-bit parallel Type IV version.

XIV. Operation

Figure 54A:
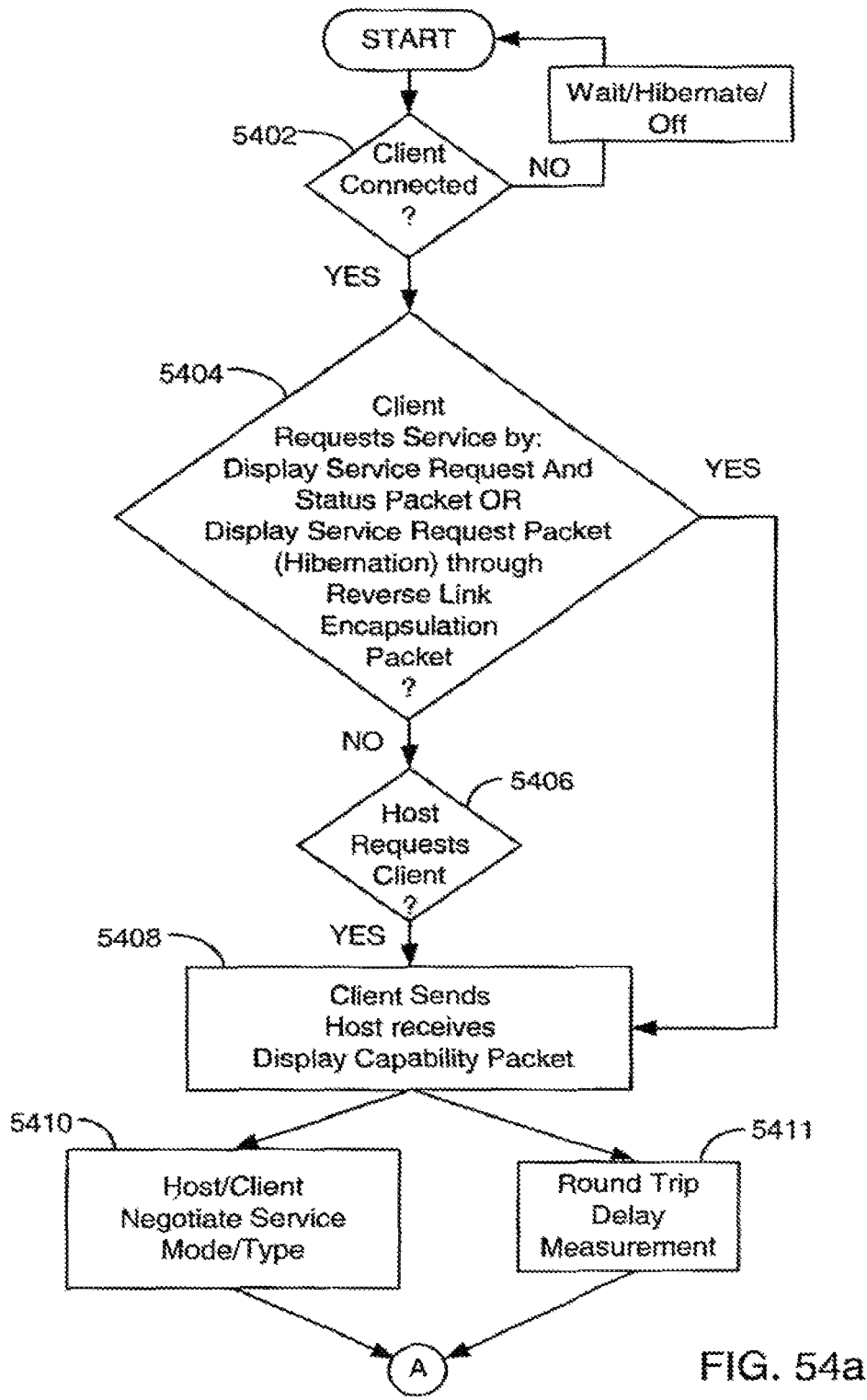
FIGS. 54a and 54b illustrate steps undertaken in the operation of an interface.
Figure 54B:
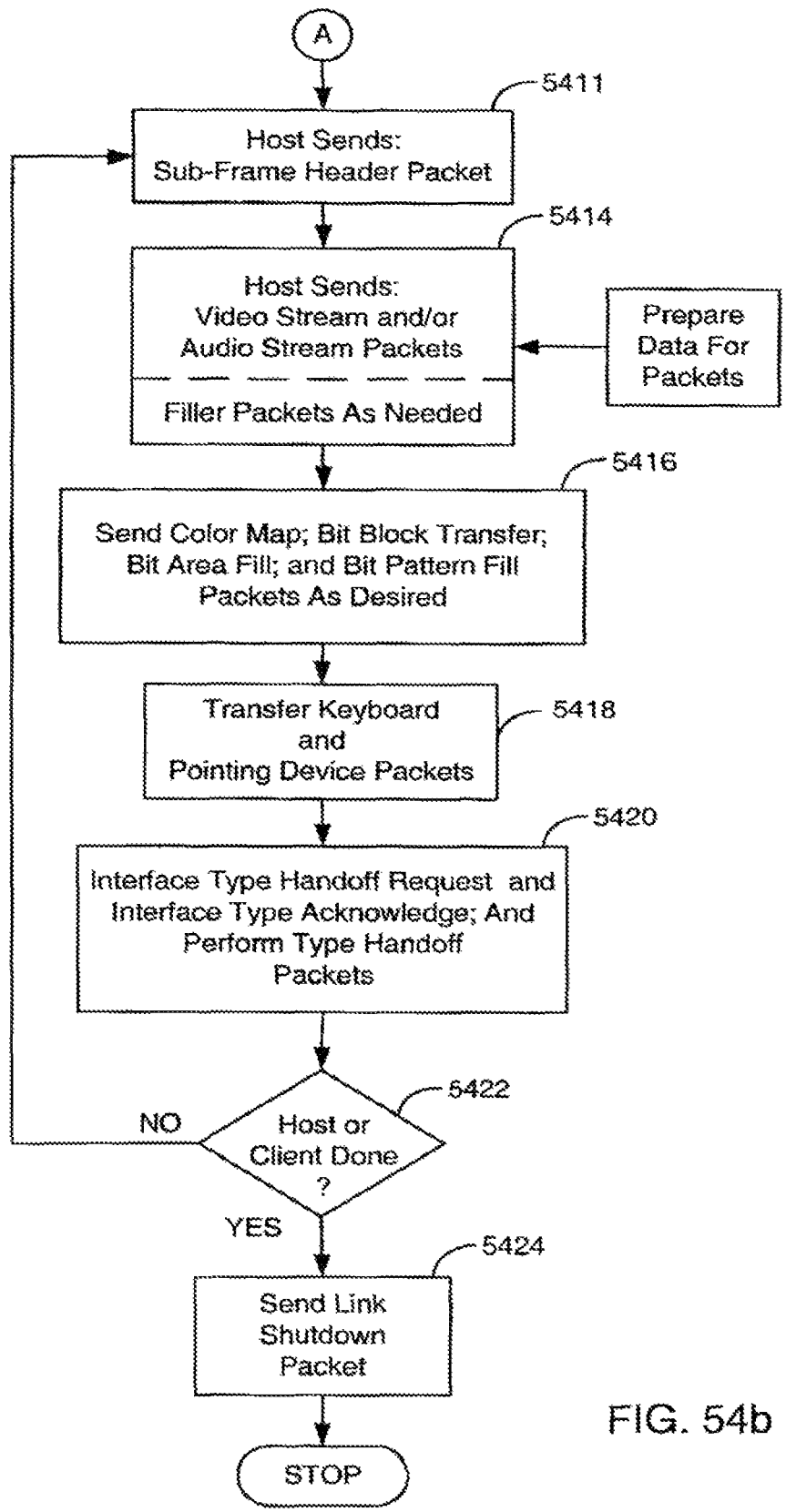
Figure 55:
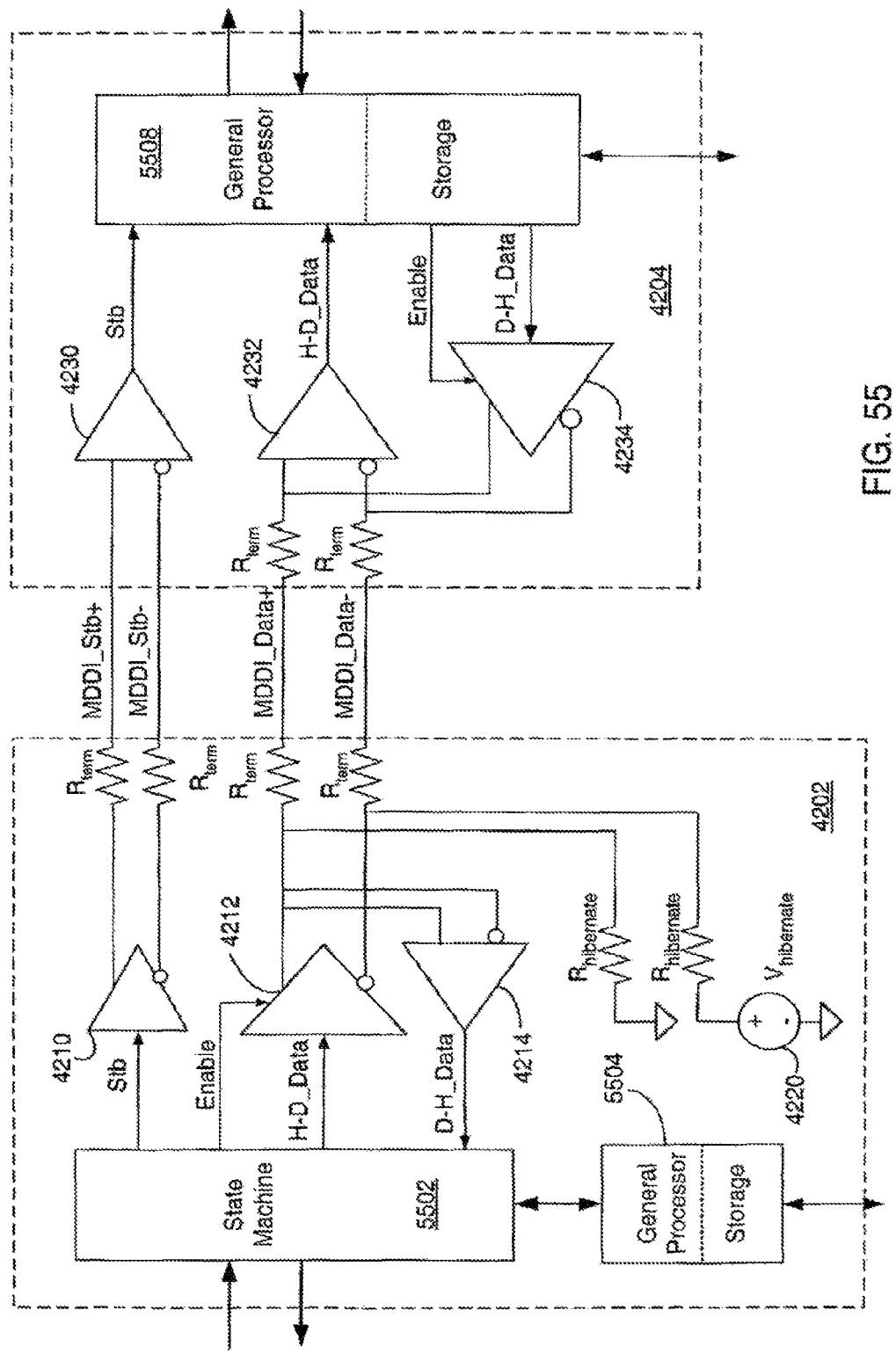
FIG. 55 illustrates an overview of the interface apparatus processing packets.

A summary of the general steps undertaken in processing data and packets during operation of an interface using embodiments of the invention is shown in FIGS. 54*a* and 54*b*, along with an overview of the interface apparatus processing the packets in FIG. 55. In these figures, the process starts in a step 5402 with a determination as to whether or not the client and host are connected using a communication path, here a cable. This can occur through the use of periodic polling by the host, software or hardware that detects the presence of connectors or cables or signals at the inputs to the host (such as is seen for USB interfaces), or other known techniques. If there is no client connected to the host, then it can simply enter a wait state of some predetermined length, depending upon the application, go into a hibernation mode, or be inactivated to await future use which might require a user to take action to reactive the host. For example, when a host resides on a computer type device, a user might have to click on an on screen icon or request a program that activates the host processing to look for the client. Again, simple plug in of a USB type connection, such as used of the Type-U interface, could activate host processing.

Once a client is connected to the host, or vice versa, or detected as present, either the client or the host sends appropriate packets requesting service in steps 5404 and 5406. The client could send either Display Service Request or Status packets in step 5404. It is noted that the link, as discussed above, could have been previously shut down or be in hibernation mode so this may not be a complete initialization of the communication link that follows. Once the communication link is synchronized and the host is trying to communicate with the client, the client also needs to provide Display Capabilities packet to the host, as in step 5408. The host can now begin to determine the type of support, including transfer rates, the client can accommodate.

Generally, the host and client also negotiate the type (rate/ speed) of service mode to be used, for example Type I, Type U, Type II, and so forth, in a step 5410. Once the service type is established the host can begin to transfer information. In addition, the host may use Round Trip Delay Measurement Packets to optimize the timing of the communication links in parallel with other signal processing, as shown in step 5411.

As stated earlier, all transfers begin with a Sub-Frame Header Packet, shown being transferred in step 5412, followed by the type of data, here video and audio stream packets, and filler packets, shown being transferred in step 5414. The audio and video data will have been previously prepared or mapped into packets, and the filler packets are inserted as needed to fill out the required number of bits for the media frames. The host can send packets such as the Forward Audio Channel Enable Packets to activate sound device, or In addition, the host can transfer commands and information using other packet types discussed above, here shown as the transfer of Color Map, Bit Block Transfer or other packets in step 5416. In addition, the host and client can exchange data relating to a keyboard or pointing devices using the appropriate packets.

During operation one of several different events can occur which lead to the host or client desiring a different data rate or type of interface mode. For example, a computer or other device communicating data could encounter loading conditions in processing data that cause a slowdown in the preparation or presentation of packets. A display receiving the data could change from a dedicated AC power source to a more limited battery power source, and either not be able to transfer in data as quickly, process commands as readily, or not be able to use the same degree of resolution or color depth under the more limited power settings. Alternatively, a restrictive condition could be abated or disappear allowing either device to transfer data at higher rates. This being more desirable, a request can be made to change to a higher transfer rate mode.

If these or other types of known conditions occur or change, either the host or client may detect them and try to renegotiate the interface mode. This is shown in step 5420, where the host sends Interface Type Handoff Request Packets to the client requesting a handoff to another mode, the client sends Interface Type Acknowledge Packets confirming a change is sought, and the host sends_Perform Type Handoff Packets to make the change to the specified mode.

Although, not requiring a particular order of processing, the client and host can also exchange packets relating to data intended for or received from pointing devices, keyboards, or other user type input devices associated primarily with the client, although such elements may also be present on the host side. These packets are typically processed using a general process or type element and not the state machine (5502). In addition, some of the commands discussed above will also be processed by the general processor. (5504, 5508)

After data and commands have been exchanged between the host and client, at some point decision is made as to whether or not additional data is to be transferred or the host or client is going to cease servicing the transfer. This is shown in step 5422. If the link is to enter either a hibernation state or be shut down completely, the host sends a Link Shutdown packet to the client, and both sides terminate the transfer of data.

The packets being transferred in the above operations processing will be transferred using the drivers and receivers previously discussed in relation to the host and client controllers. These line drivers and other logic elements are connected to the state machine and general processors discussed above, as illustrated in the overview of FIG. 55. In FIG. 55, a state machine 5502 and general processors 5504 and 5508 may further be connected to other elements not shown such as a dedicated USB interface, memory elements, or other components residing outside of the link controller with which they interact, including, but not limited to, the data source, and video control chips for viewing display devices.

The processors, and state machine provide control over the enabling and disabling of the drivers as discussed above in relation to guard times, and so forth, to assure efficient establishment or termination of the communication link, and transfer of packets.

XV. Addendum

In addition to the formats, structures, and contents discussed above for the various packets used to implement the architecture and protocol for embodiments of the invention, more detailed field contents or operations are presented here for some of the packet types. These are presented here to further clarify their respective use or operations to enable those skilled in the art to more readily understand and make use of the invention for a variety of applications. Only a few of the fields not already discussed are discussed further here.

A. For Video Stream-Packets

The Display attributes field (1 byte) has a series of bit values that are interpreted as follows. Bits 1 and 0 select how the display pixel data is routed. For bit values of '00' or '11' data is displayed for both eyes, for bit values '10', data is routed only to the left eye, and for bit values '01', data is routed only to the right eye. Bit 2 indicates whether or not the Pixel Data is presented in an interlace format, with a value of '0' meaning the pixel data is in the standard progressive format, and that the row number (pixel Y coordinate) is incremented by 1 when advancing from one row to the next. When this bit has a value of '1', the pixel data is in interlace format, and the row number is incremented by 2 when advancing from one row to the next. Bit 3 indicates that the Pixel Data is in alternate pixel format. This is similar to the standard interlace mode enabled by bit 2, but the interlacing is vertical instead of horizontal. When Bit 3 is 0 the Pixel Data is in the standard progressive format, and the column number (pixel X coordinate) is incremented by 1 as each successive pixel is received. When Bit 3 is 1 the Pixel Data is in alternate pixel format, and the column number is incremented by 2 as each pixel is received. Bits 7 through 4 are reserved for future use and are generally set as zero.

The 2-byte X Start and Y Start fields specify the absolute X and Y coordinates of the point (X Start, Y Start) for the first pixel in the Pixel Data field. The 2-byte X Left Edge and Y Top Edge fields specify the X coordinate of the left edge and Y coordinate of the top edge of the screen window filled by the Pixel Data field, while the X Right Edge and Y Bottom Edge fields specify the X coordinate of the right edge, and the Y coordinate of the bottom edge of the window being updated.

The Pixel Count field (2 bytes) specifies the number of pixels in the Pixel Data field below.

The Parameter CRC field (2 bytes) contains a CRC of all bytes from the Packet Length to the Pixel Count. If this CRC fails to check then the entire packet is discarded.

The Pixel Data field contains the raw video information that is to be displayed, and which is formatted in the manner described by the Video Data Format Descriptor field. The data is transmitted one "row" at a time as discussed elsewhere.

The Pixel Data CRC field (2 bytes) contains a 16-bit CRC of only the Pixel Data. If a CRC verification of this value fails then the Pixel Data can still be used, but the CRC error count is incremented.

B. For Audio Stream Packets

The Audio Channel ID field (1 byte) identifies a particular audio channel to which audio data is sent by the client device. The physical audio channels are specified in or mapped by this field as values of 0, 1, 2, 3, 4, 5, 6, or 7 indicate the left front, right front, left rear, right rear, front center, sub-woofer, surround left, and surround right channels, respectively. An audio channel ID value of 254 indicates that the single stream of digital audio samples is sent to both the left front and right front channels. This simplifies applications where a stereo headset is used for voice communication, productivity enhancement apps in a PDA, or any application where a simple User Interface generates warning tones. Values for the ID field ranging from 8 through 253, and 255 are currently reserved for use where new designs desire additional designations.

The Audio Sample Count field (2 bytes) specifies the number of audio samples in this packet.

The Bits Per Sample and Packing field contains 1 byte that specifies the pacing format of audio data. The format generally employed is for Bits 4 through 0 to define the number of bits per PCM audio sample. Bit 5 then specifies whether or not the Digital Audio Data samples are packed. As mentioned above, FIG. 12 illustrates the difference between packed and byte-aligned audio samples. A value of '0' for Bit 5 indicates that each PCM audio sample in the Digital Audio Data field is byte-aligned with the interface byte boundary, and a value of '1' indicates that each successive PCM audio sample is packed up against the previous audio sample. This bit is effective only when the value defined in bits 4 through 0 (the number of bits per PCM audio sample) is not a multiple of eight. Bits 7 through 6 are reserved for use where system designs desire additional designations and are generally set at a value of zero.

The Audio Sample Rate field (1 byte) specifies the audio PCM sample rate. The format employed is for a value of 0 to indicate a rate of 8,000 samples per second (sps), a value of 1 indicates 16,000 sps., value of 2 for 24,000 sps, value of 3 for 32,000 sps, value of 4 for 40,000 sps, value of 5 for 48,000 sps, value of 6 for 11,025 sps, value of 7 for 22,050 sps, and value of 8 for 44,100 sps, respectively, with values of 9 through 15 being reserved for future use, so they are currently set to zero.

The Parameter CRC field (2 bytes) contains a 16-bit CRC of all bytes from the Packet Length to the Audio Sample Rate. If this CRC fails to check appropriately, then the entire packet is discarded. The Digital Audio Data field contains the raw audio samples to be played, and is usually in the form of a linear format as unsigned integers. The Audio Data CRC field (2 bytes) contain a 16-bit CRC of only the Audio Data. If this CRC fails to check then the Audio Data can still be used, but the CRC error count is incremented.

C. For User-Defined Stream Packets

The 2-byte Stream ID Number field is used to identify a particular user defined stream. The contents of the Stream Parameters and Stream Data fields, are defined by the MDDI equipment manufacturer. The 2-byte Stream Parameter CRC field contains a 16-bit CRC of all bytes of the stream parameters starting from the Packet Length to the Audio Coding byte. If this CRC fails to check then the entire packet is discarded. The 2-byte Stream Data CRC field contains a CRC of only the Stream Data. If this CRC fails to check appropriately then use of the Stream Data is optional, depending on the requirements of the application. Use of the stream data contingent on the CRC being good generally requires that the stream data be buffered until the CRC is confirmed good. The CRC error count is incremented if the CRC does not check.

D. For Color Map Packets

The Color Map Data Size field (2 bytes) specifies the total number of color map table entries that exist in the Color Map Data in this packet. The number of bytes in the Color Map Data is 3 times the Color Map Size. The Color Map Size is set to zero to send no color map data. If the Color Map Size is zero, then a Color Map Offset value is still sent, but it is ignored by the display. The Color Map Offset field (2 bytes) specifies the offset of the Color Map Data in this packet from the beginning of the color map table in the display device.

A 2-byte Parameter CRC field contains a CRC of all bytes from the Packet Length to the Audio Coding byte. If this CRC fails to check then the entire packet is discarded.

For the Color Map Data field, each color map location is a 3-byte value, where the first byte specifies the magnitude of blue, the second byte specifies the magnitude of green, and the third byte specifies the magnitude of red. The Color Map Size field specifies the number of 3-byte color map table items that exist in the Color Map Data field. If a single color map cannot fit into one Video Data Format and Color Map Packet, then the entire color map may be specified by sending multiple packets with different Color Map Data and Color Map Offsets in each packet.

A 2-byte Color Map Data CRC field contains a CRC of only the Color Map Data. If this CRC fails to check then the Color Map Data can still be used but the CRC error count is incremented.

E. For Reverse Link Encapsulation Packets

The Reverse Link Flags field (1 byte) contains a set of flags to request information from the display. If a bit (here Bit 0) is set to one then the host requests the specified information from the display using the Display Capability Packet. If the bit is zero then the host does not need the information from the display. The remaining bits (here Bits 1 through 7) are reserved for future use and are set to zero.

The Reverse Rate Divisor field (1 byte) specifies the number of MDDI_Stb cycles that occur in relation to the reverse link data clock. The reverse link data clock is equal to the forward link data clock divided by two times the Reverse Rate Divisor. The reverse link data rate is related to the reverse link data clock and the Interface Type on the reverse link. For a Type I interface the reverse data rate equals the reverse link data clock, for Type II, Type III, sand Type IV interfaces the reverse data rates equal two times, four times, and eight times the reverse link data clock, respectively.

The Turn-Around 1 Length field (1 byte) specifies the total number of bytes that are allocated for Turn-Around 1. The recommended length of Turn-Around 1 is the number of bytes required for the MDDI_Data drivers in a host to have the outputs disabled. This is based on the output disable time discussed above, the forward link data rate, and the forward link Interface Type selection being used. A more complete description of the setting of Turn-Around 1 is given above.

The Turn-Around 2 Length field (1 byte) specifies the total number of bytes that are allocated for Turn-Around. The recommended length of Turn-Around 2 is the number of bytes required for the MDDI_Data drivers in the Display to disable their outputs plus the round-trip delay. A description of the setting of Turn-Around 2 is given above.

The Parameter CRC field (2 bytes) contain a 16-bit CRC of all bytes from the Packet Length to the Turn-Around Length. If this CRC fails to check then the entire packet is discarded.

The All Zero field (1 byte) is set equal to zero, and is used to ensure that all MDDI_Data signals are in the zero state prior to disabling the line drivers during the first Guard Time period.

The Turn-Around 1 field is used for establishing the first turn-around period. The number of bytes specified by the Turn-Around Length parameter are allocated by this field to allow the MDDI_Data line drivers in the host to disable before the line drivers in the client (display) are enabled. The host disables its MDDI_Data line drivers during bit 0 of Turn-Around 1 and the client (display) enables its line drivers immediately after the last bit of Turn-Around 1. The MDDI_Stb signal behaves as though the Turn Around period were all zeros.

The Reverse Data Packets field contains a series of data packets being transferred from the client to a host. As stated earlier, Filler packets are sent to fill the remaining space that is not used by other packet types.

Turn-Around 2 field is used for establishing the second turn-around period. The number of bytes specified by the Turn-Around Length parameter are allocated by this field.

The Driver Re-enable field uses 1 byte that is equal to zero to ensure that all MDDI_Data signals are re-enabled prior to the Packet Length Field of the next packet.

F. For Display Capability Packets

The Protocol Version field uses 2 bytes to specify a protocol version used by the client. The initial version is set equal to zero, while the Minimum Protocol Version field uses 2 bytes to specify the minimum protocol version that the client can employ or interpret. The Display Data Rate Capability field (2 bytes) specifies the maximum data rate the display can receive on the forward link of the interface, and is specified in the form of megabits per second (Mbps). The Interface Type Capability field (1 byte) specifies the interface types that are supported on the forward and reverse links. This is currently indicated by selecting Bit 0, Bit 1, or Bit 2 to select either a Type-II, Type-III or Type-IV mode on the forward link, respectively, and Bit 3, Bit 4, or Bit 5 to select either a Type-II, Type-III, or Type-IV mode on the reverse link, respectively; with Bits 6 and 7 being reserved and set to zero. The Bitmap Width and Height fields (2 bytes) specify the width and height of the bitmap in pixels.

The Monochrome Capability field (1 byte) is used to specify the number of bits of resolution that can be displayed in a monochrome format. If a display cannot use a monochrome format then this value is set at zero. Bits 7 through 4 are reserved for future use and are, thus, set as zero. Bits 3 through 0 define the maximum number of bits of grayscale that can exist for each pixel. These four bits make it possible to specify values of 1 to 15 for each pixel. If the value is zero then monochrome format is not supported by the display.

The Colormap Capability field (3 bytes) specifies the maximum number of table items that exist in the colormap table in the display. If the display cannot use the colormap format then this value is zero.

The RGB Capability field (2 bytes) specifies the number of bits of resolution that can be displayed in RGB format. If the display cannot use the RGB format then this value is zero. The RGB Capability word is composed of three separate unsigned values where: Bits 3 through 0 define the maximum number of bits of blue, Bits 7 through 4 define the maximum number of bits of green, and Bits 11 through 8 define the maximum number of bits of red in each pixel. Currently, Bits 15 through 12 are reserved for future use and are generally set to zero.

The Y Cr Cb Capability field (2 bytes) specifies the number of bits of resolution that can be displayed in Y Cr Cb format. If the display cannot use the Y Cr Cb format then this value is zero. The Y Cr Cb Capability word is composed of three separate unsigned values where: Bits 3 through 0 define the maximum number of bits in the Cb sample, Bits 7 through 4 define the maximum number of bits in the Cr sample, Bits 11 through 8 define the maximum number of bits in the Y sample, and Bits 15 through 12 are currently reserved for future use and are set to zero.

The Display Feature Capability Indicators field uses 4 bytes that contain a set of flags that indicate specific features in the display that are supported. A bit set to one indicates the capability is supported, and a bit set to zero indicates the capability is not supported. The value for Bit 0 indicates whether or not Bitmap Block Transfer Packet (packet type 71) is supported. The value for Bits 1, 2, and 3 indicate whether or not Bitmap Area Fill Packet (packet type 72), Bitmap Pattern Fill Packet (packet type 73), or Communication Link Data Channel Packet (packet type 74), respectively, are supported. The value for Bit 4 indicates whether or not the display has the capability to make one color transparent, while values for bits Bit 5 and 6 indicate if the display can accept video data or audio data in packed format, respectively, and the value for Bit 7 indicates if the display can send a reverse-link video stream from a camera. The value for Bits 11 and 12 indicate when the client is communicating either with a pointing device and can send and receive Pointing Device Data Packets, or with a keyboard and can send and receive Keyboard Data Packets, respectively. Bits 13 through 31 are currently reserved for future use or alternative designations useful for system designers and are generally set equal to zero.

The Display Video Frame Rate Capability field (1 byte) specifies the maximum video frame update capability of the display in frames per second. A host may choose to update the image at a slower rate than the value specified in this field.

The Audio Buffer Depth field (2 bytes) specifies the depth of the elastic buffer in a Display which is dedicated to each audio stream.

The Audio Channel Capability field (2 bytes) contains a group of flags that indicate which audio channels are supported by the display (client). A bit set to one indicates the channel is supported, and a bit set to zero indicates that channel is not supported. The Bit positions are assigned to the different channels such that Bit positions 0, 1, 2, 3, 4, 5, 6, and 7 indicate the left front, right front, left rear, right rear, front center, sub-woofer, surround left, and surround right channels, respectively. Bits 8 through 15 are currently reserved for future use, and are generally set to zero.

A 2-byte Audio Sample Rate Capability field, for the forward link, contains a set of flags to indicate the audio sample rate capability of the client device. Bit positions are assigned to the different rates accordingly as Bits 0, 1, 2, 3, 4, 5, 6, 7, and 8 are assigned to 8,000, 16,000, 24,000, 32,000, 40,000, 48,000, 11,025, 22,050, and 44,100 samples per second (SPS), respectively, with Bits 9 through 15 being reserved for future or alternative rate uses, as desired, so they are currently set to '0'. Setting a bit value for one of these bits to '1' indicates that that particular sample rate is supported, and setting the bit to '0' indicates that that sample rate is not supported.

The Minimum Sub-frame Rate field (2 bytes) specifies the minimum sub-frame rate in frames per second. The minimum sub-frame rate keeps the display status update rate sufficient to read certain sensors or pointing devices in the display.

A 2-byte Mic Sample Rate Capability field, for the reverse link, that contains a set of flags that indicate the audio sample rate capability of a microphone in the client device. For purposes of the MDDI, a client device microphone is configured to minimally support at least an 8,000 sample per second rate. Bit positions for this field are assigned to the different rates with bit positions 0, 1, 2, 3, 4, 5, 6, 7, and 8 are used to represent 8,000, 16,000, 24,000, 32,000, 40,000, 48,000, 11,025, 22,050, and 44,100 samples per second (SPS), respectively, with Bits 9 through 15 being reserved for future or alternative rate uses, as desired, so they are currently set to '0'. Setting a bit value for one of these bits to '1' indicates that that particular sample rate is supported, and setting the bit to '0' indicates that that sample rate is not supported. If no microphone is connected then each of the Mic Sample Rate Capability bits are set equal to zero.

The Content Protection Type field (2 bytes) contains a set of flags that indicate the type of digital content protection that is supported by the Display. Currently, bit position 0 is used to indicate when DTCP is supported and bit position 1 is used to indicate when HDCP is supported, with bit positions 2 through 15 being reserved for use with other protection schemes as desired or available, so they are currently set to zero.

G. For Display Request and Status Packets

The Reverse Link Request field (3 byte) specifies the number of bytes the display needs in the reverse link in the next sub-frame to send information to the host.

The CRC Error Count field (1 byte) indicates how many CRC errors have occurred since the beginning of the media-frame. The CRC count is reset when a sub-frame header packet with a Sub-frame Count of zero is sent. If the actual number of CRC errors exceeds 255 then this value saturates at 255.

The Capability Change field uses 1 byte to indicate a change in the capability of the display. This could occur if a user connects a peripheral device such as a microphone, keyboard, or display, or for some other reason. When Bits[7:0] are equal to 0, then the capability has not changed since the last Display Capability Packet was sent. However, when Bits [7:0] are equal to 1 to 255, the capability has changed. The Display Capability Packet is examined to determine the new display characteristics.

H. For Bit Block Transfer Packets

The Window Upper Left Coordinate X Value and Y Value fields use 2 bytes each to specify the X and Y value of the coordinates of the upper left corner of the window to be moved. The Window Width and Height fields use 2 bytes each to specify the width and height of the window to be moved.

The Window X Movement and Y Movement fields use 2 bytes each to specify the number of pixels that the window shall be moved horizontally and vertically, respectively. Positive values for X cause the window to be moved to the right, and negative values cause movement to the left, while positive values for Y cause the window to be moved down, and negative values cause upward movement.

I. For Bitmap Area Fill Packets

Window Upper Left Coordinate X Value and Y Value fields use 2 bytes each to specify the X and Y value of the coordinates of the upper left corner of the window to be filled. The Window Width and Height fields (2 bytes each) specify the width and height of the window to be filled. The Video Data Format Descriptor field (2 bytes) specifies the format of the Pixel Area Fill Value. The format is the same as the same field in the Video Stream Packet. The Pixel Area Fill Value field (4 bytes) contains the pixel value to be filled into the window specified by the fields discussed above. The format of this pixel is specified in the Video Data Format Descriptor field.

J. For Bitmap Pattern Fill Packets

Window Upper Left Coordinate X Value and Y Value fields use 2 bytes each to specify the X and Y value of the coordinates of the upper left corner of the window to be filled. The Window Width and Height fields (2 bytes each) specify the width and height of the window to be filled. The Pattern Width and Pattern Height fields (2 bytes each) specify the width and height, respectively, of the fill pattern. The 2-byte Video Data Format Descriptor field specifies the format of the Pixel Area Fill Value. FIG. 11 illustrates how the Video Data Format Descriptor is coded. The format is the same as the same field in the Video Stream Packet.

The Parameter CRC field (2 bytes) contains a CRC of all bytes from the Packet Length to the Video Format Descriptor. If this CRC fails to check then the entire packet is discarded. The Pattern Pixel Data field contains raw video information that specifies the fill pattern in the format specified by the Video Data Format Descriptor. Data is packed into bytes, and the first pixel of each row must be byte-aligned. The fill pattern data is transmitted a row at a time. The Pattern Pixel Data CRC field (2 bytes) contains a CRC of only the Pattern Pixel Data. If this CRC fails to check then the Pattern Pixel Data shall still be used but the CRC error count shall be incremented.

K. Communication Link Data Channel Packets

The Parameter CRC field (2 bytes) contain a 16-bit CRC of all bytes from the Packet Length to the Packet Type. If this CRC fails to check then the entire packet is discarded.

The Communication Link Data field contains the raw data from the communication channel. This data is simply passed on to the computing device in the display.

The Communication Link Data CRC field (2 bytes) contains a 16-bit CRC of only the Communication Link Data. If this CRC fails to check then the Communication Link Data is still used or useful, but the CRC error count is incremented.

L. For Interface Type Handoff Request Packets

The Interface Type field (1 byte) specifies the new interface type to use. The value in this field specifies the interface type in the following manner. If the value in Bit 7 is equal to 0 the Type handoff request is for the forward link, if it is equal to 1, then the Type handoff request is for the reverse link. Bits 6 through 3 are reserved for future use, and are generally set to zero. Bits 2 through 0 are used to define the interface Type to be used, with a value of 1 meaning a handoff to Type-I mode, value of 2 a handoff to Type-II mode, a value of 3 a handoff to Type-III mode, and a value of 4 a handoff to Type-IV mode. The values of 0 and 5 through 7 are reserved for future designation of alternative modes or combinations of modes.

M. For Interface Type Acknowledge Packets

The Interface Type field (1 byte) has a value that confirms the new interface type to use. The value in this field specifies the interface type in the following manner. If Bit 7 is equal to 0 the Type handoff request is for the forward link, alternatively, if it is equal to 1 the Type handoff request is for the reverse link. Bit positions 6 through 3 are currently reserved for use in designating other handoff types, as desired, and are generally set to zero. However, bit positions 2 through 0 are used to define the interface Type to be used with a value of 0 indicating a negative acknowledge, or that the requested handoff cannot be performed, values of 1, 2, 3, and 4 indicating handoff to Type-I, Type-II, Type-III, and Type-IV modes, respectively. Values of 5 through 7 are reserved for use with alternative designations of modes, as desired.

N. For Perform Type Handoff Packets

The 1-byte Interface Type field indicates the new interface type to use. The value present in this field specifies the interface type by first using the value of Bit 7 to determine whether or not the Type handoff is for the forward or reverse links. A value of '0' indicates the Type handoff request is for the forward link, and a value of '1' the reverse link. Bits 6 through 3 are reserved for future use, and as such are generally set to a value of zero. However, Bits 2 through 0 are used to define the interface Type to be used, with the values 1, 2, 3, and 4 specifying the use of handoff to Type-I, Type-II, Type-III, and Type-IV modes, respectively. The use of values 0 and 5 through 7 for these bits is reserved for future use.

O. For Forward Audio Channel Enable Packets

The Audio Channel Enable Mask field (1 byte) contains a group of flags that indicate which audio channels are to be enabled in a client. A bit set to one enables the corresponding channel, and a bit set to zero disables the corresponding channel. Bits 0 through 5 designate channels 0 through 5 which address left front, right front, left rear, right rear, front center, and sub-woofer channels, respectively. Bits 6 and 7 are reserved for future use, and in the mean time may be set to zero.

P. For Reverse Audio Sample Rate Packets

The Audio Sample Rate field (1 byte) specifies the digital audio sample rate. The values for this field are assigned to the different rates with values of 0, 1, 2, 3, 4, 5, 6, 7, and 8 being used to designate 8,000, 16,000, 24,000, 32,000, 40,000, 48,000, 11,025, 22,050, and 44,100 samples per second (SPS), respectively, with values of 9 through 254 being reserved for use with alternative rates, as desired, so they are currently set to '0'. A value of 255 is used to disable the reverse-link audio stream.

The Sample Format field (1 byte) specifies the format of the digital audio samples. When Bits[1:0] are equal to 0, the digital audio samples are in linear format, when they are equal to 1, the digital audio samples are in µ-Law format, and when they are equal to 2, the digital audio samples are in A-Law format. Bits[7:2] are reserved for alternate use in designating audio formats, as desired, and are generally set equal to zero.

Q. For the Digital Content Protection Overhead Packets

The Content Protection Type field (1 byte) specifies the digital content protection method that is used. A value of 0 indicates Digital Transmission Content Protection (DTCP) while a value of 1 indicates High-bandwidth Digital Content Protection System (HDCP). The value range of 2 through 255 is not currently specified but is reserved for use with alternative protection schemes as desired. The Content Protection Overhead Messages field is a variable length field containing content protection messages sent between the host and client.

R. For the Transparent Color Enable Packets

The Transparent Color Enable field (1 byte) specifies when transparent color mode is enabled or disabled. If Bit 0 is equal to 0 then transparent color mode is disabled, if it is equal to 1 then transparent color mode is enabled and the transparent color is specified by the following two parameters. Bits 1 through 7 of this byte are reserved for future use and are set to zero.

The Video Data Format Descriptor field (2 bytes) specifies the format of the Pixel Area Fill Value. FIG. 11 illustrates how the Video Data Format Descriptor is coded. The format is generally the same as the same field in the Video Stream Packet.

The Pixel Area Fill Value field uses 4 bytes allocated for the pixel value to be filled into the window specified above. The format of this pixel is specified in the Video Data Format Descriptor field.

S. For the Round Trip Delay Measurement Packets

The Parameter CRC field (2 bytes) contains a 16-bit CRC of all bytes from the Packet Length to the Packet Type. If this CRC fails to check then the entire packet is discarded.

The All Zero field (1 byte) contains zeroes to ensure that all MDDI_Data signals are in the zero state prior to disabling the line drivers during the first Guard Time period.

The Guard Time 1 field (8 bytes) is used to allow the MDDI_Data line drivers in the host to disable before the line drivers in the client (display) are enabled. The host disables its MDDI_Data line drivers during bit 0 of Guard Time 1 and the Display enables its line drivers immediately after the last bit of Guard Time 1.

The Measurement Period field is a 512 byte window used to allow the Display to respond with a 0xff, 0xff, 0x0 at half the data rate used on the forward link. This rate corresponds to a Reverse Link Rate Divisor of 1. The Display returns this response immediately at the beginning of the Measurement Period. This response will be received at a host at precisely the round trip delay of the link after the beginning of the first bit of the Measurement Period at the host. The MDDI_Data line drivers in the Display are disabled immediately before and immediately after the 0xff, 0xff, 0x00 response from the Display.

The value in the Guard Time 2 field (8 bytes) allows Client MDDI_Data line drivers to disable before line drivers in the Host are enabled. Guard Time 2 is always present but is only required when the round trip delay is at the maximum amount that can be measured in the Measurement Period. The Client disables its line drivers during bit 0 of Guard Time 2 and the Host enables its line drivers immediately after the last bit of Guard Time 2.

The Driver Re-enable field (1 byte) is set equal to zero, to ensure that all MDDI_Data signals are re-enabled prior to the Packet Length Field of the next packet.

T. For the Forward Link Skew Calibration Packets

The Parameter CRC field (2 bytes) contains a 16-bit CRC of all bytes from the Packet Length to the Packet Type. If this CRC fails to check then the entire packet is discarded.

Calibration Data Sequence field contains a 512 byte data sequence that causes the MDDI_Data signals to toggle at every data period. During the processing of the Calibration Data Sequence, the MDDI host controller sets all MDDI_Data signals equal to the strobe signal. The display clock recovery circuit should use only MDDI_Stb rather than MDDI_Stb xor MDDI_Data0 to recover the data clock while the Calibration Data Sequence field is being received by the client Display. Depending on the exact phase of the MDDI_Stb signal at the beginning of the Calibration Data Sequence field, the Calibration Data Sequence will generally be one of the following based on the interface Type being used when this packet is sent:

Type I—0xaa, 0xaa . . . or 0x55, 0x55 . . .
Type II—0xcc, 0xcc . . . or 0x33, 0x33 . . .
Type III—0xf0, 0xf0 . . . or 0x0f, 0x0f . . .
Type IV—0xff, 0x00, 0xff, 0x00 . . . or 0x00, 0xff, 0x00, 0xff . . .

Figure 62A:
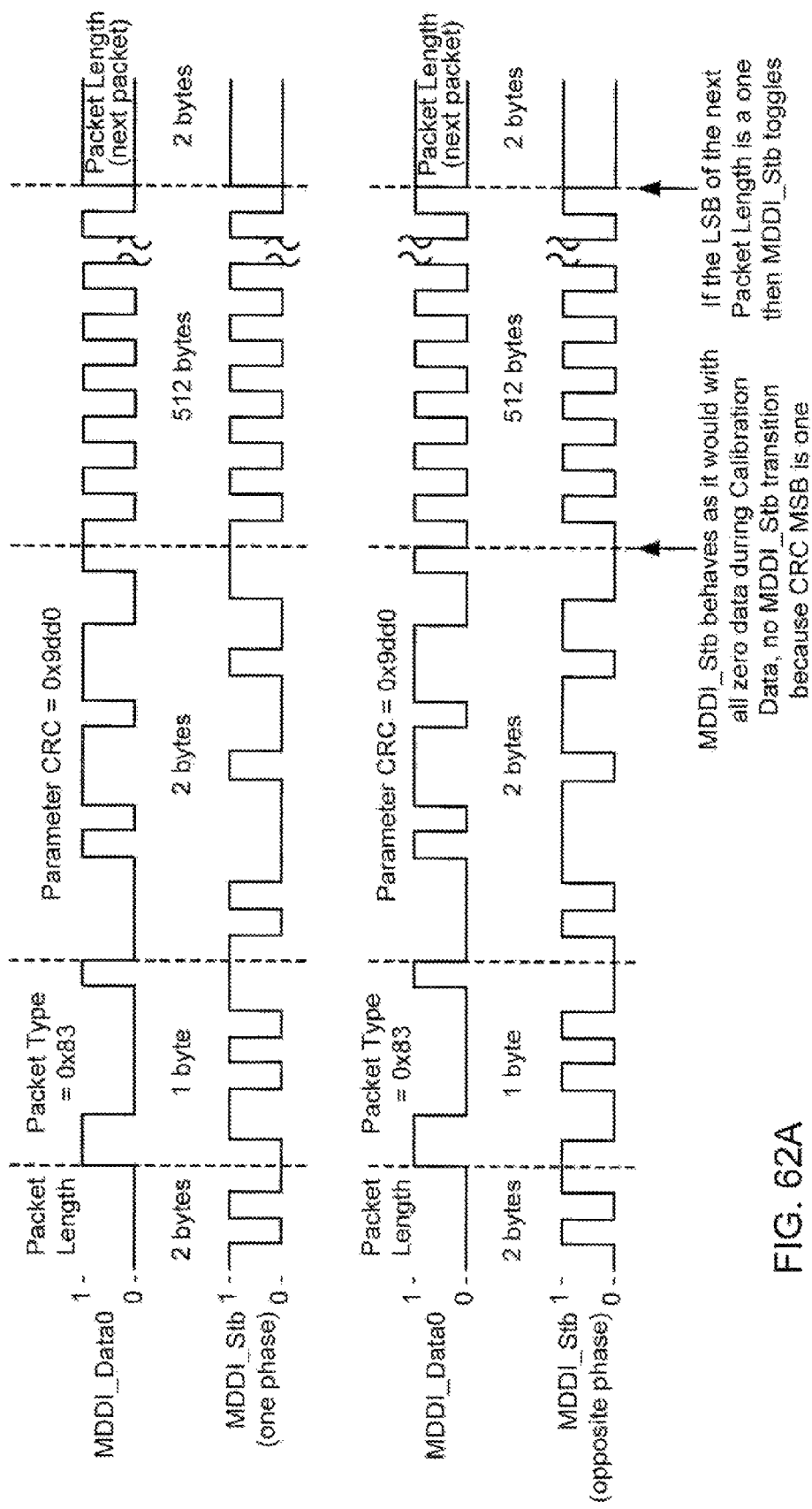
FIGS. 62a and 62b illustrate possible MDDI_Data and MDDI_Stb waveforms for both Type-I and Type-II Interfaces, respectively.
Figure 62B:
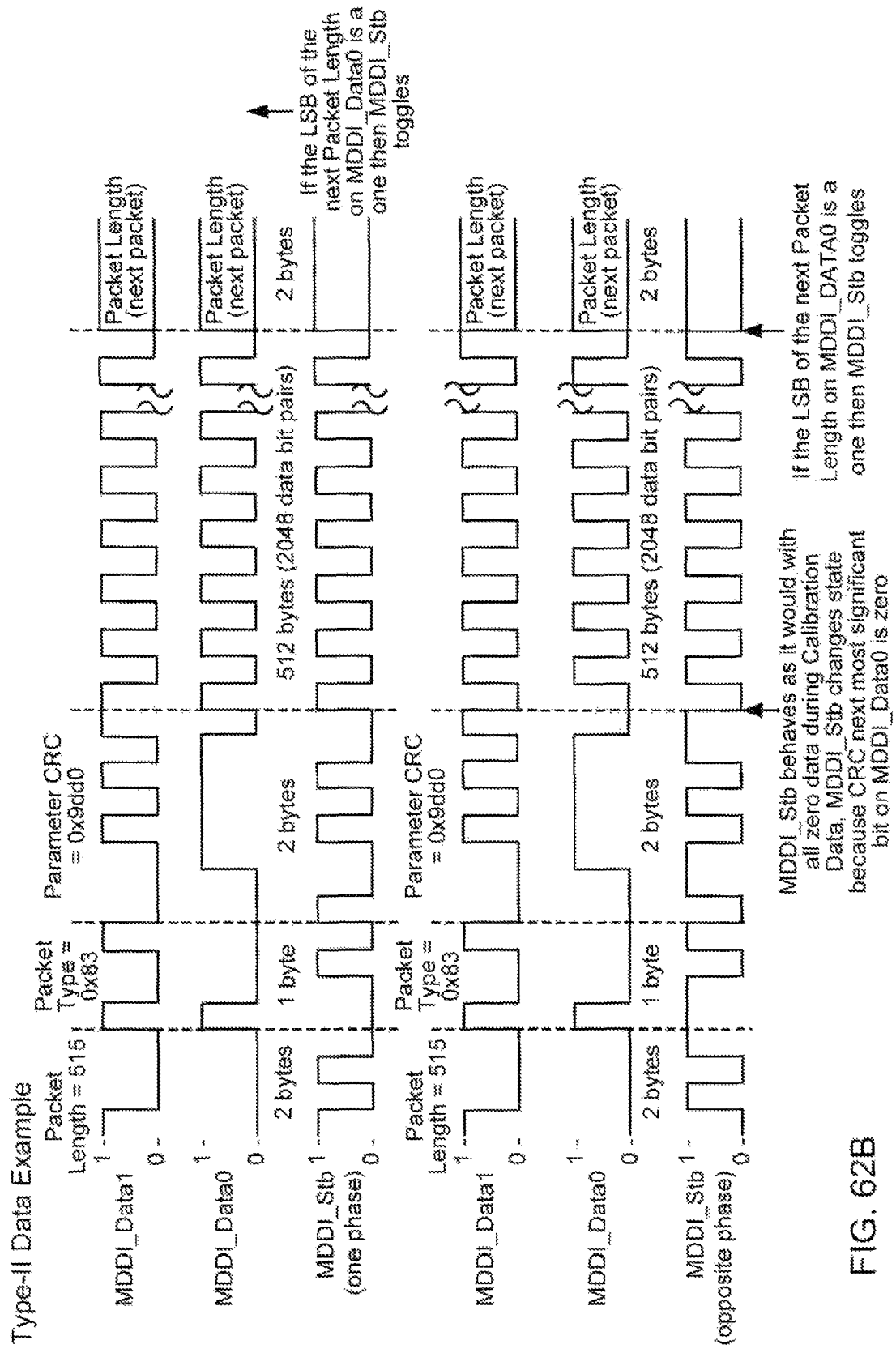

An example of the possible MDDI_Data and MDDI_Stb waveforms for both the Type-I and Type-II Interfaces are shown in FIG. 62, respectively.

XVI. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What we claim as our invention is:

1. Apparatus for transferring digital data at a high rate between a host device and a client device over a communication path for presentation to a user, comprising:
   means for generating one or more of a plurality of pre-defined packet structures and linking them together to form a pre-defined communication protocol;
   means for communicating a pre-selected set of digital control and presentation data between said host and said client devices over said communication path using said communication protocol;
   means for coupling at least two link controllers together through said communications path, one in each of said host and client and each being configured to generate, transmit, and receive packets forming said communications protocol, and to form digital presentation data into one or more types of data packets;
   means for transferring data in the form of packets over said communications path using said link controllers; and
   means for compensating mismatched delays in at least two signals of the transferred digital data by substantially aligning an arrival time of the at least two signals.

2. A method executed on hardware for transferring digital data at a high rate between a host device and a client device over a communication path for presentation to a user, the method comprising the steps of:
   generating one or more of a plurality of pre-defined packet structures and linking them together to form a pre-defined communication protocol;
   communicating a pre-selected set of digital control and presentation data between the host and the client devices over the communication path using the communication protocol;
   coupling at least two link controllers together through the communications path, one in each of the host and client and each being configured to generate, transmit, and receive packets forming the communications protocol, and to form digital presentation data into one or more types of data packets;
   transferring data in the form of packets over the communications path using the link controllers; and
   compensating mismatched delays in at least two signals of the transferred digital data by substantially aligning an arrival time of the at least two signals.

3. A non-transitory computer readable storage medium comprising program instructions which are hardware computer-executable to implement a transfer of digital data at a high rate between a host device and a client device over a communication path for presentation to a user, the storage medium comprising:
   program instructions to generate one or more of a plurality of pre-defined packet structures and linking them together to form a pre-defined communication protocol;
   program instructions to communicate a pre-selected set of digital control and presentation data between the host and the client devices over the communication path using the communication protocol;
   program instructions to couple at least two link controllers together through the communications path, one in each of the host and client and each being configured to generate, transmit, and receive packets forming the communications protocol, and to form digital presentation data into one or more types of data packets;
   program instructions to transfer data in the form of packets over the communications path using the link controllers; and
   program instructions to compensate mismatched delays in at least two signals of the transferred digital data by substantially aligning an arrival time of the at least two signals.

* * * * *